United States Patent
Katayama

(10) Patent No.: US 7,414,951 B2
(45) Date of Patent: Aug. 19, 2008

(54) OPTICAL HEAD DEVICE AND OPTICAL RECORDING AND REPRODUCING APPARATUS

(75) Inventor: Ryuichi Katayama, Tokyo (JP)

(73) Assignee: NEC Corporation (JP)

( * ) Notice: Subject to any disclaimer, the term of this patent is extended or adjusted under 35 U.S.C. 154(b) by 397 days.

(21) Appl. No.: 11/321,492

(22) Filed: Dec. 28, 2005

(65) Prior Publication Data

US 2006/0104187 A1 May 18, 2006

Related U.S. Application Data

(63) Continuation of application No. 10/156,163, filed on May 28, 2002, now abandoned.

(30) Foreign Application Priority Data

May 29, 2001 (JP) .............................. 2001-160798
May 17, 2002 (JP) .............................. 2002-143705

(51) Int. Cl.
*G11B 7/00* (2006.01)

(52) U.S. Cl. ........................... 369/112.22; 369/112.23; 369/53.2

(58) Field of Classification Search ............ 369/112.22, 369/112.23, 112.02, 112.05, 94, 44.23, 44.37; 359/53.2
See application file for complete search history.

(56) References Cited

U.S. PATENT DOCUMENTS

| | | | | |
|---|---|---|---|---|
| 5,724,335 A | * | 3/1998 | Kobayashi | 369/112.08 |
| 5,875,167 A | * | 2/1999 | Katayama | 369/112.07 |
| 6,067,283 A | * | 5/2000 | Muramatsu | 369/112.1 |
| 6,084,845 A | * | 7/2000 | Mizuno | 369/112.28 |
| 6,201,780 B1 | * | 3/2001 | Katayama | 369/112.19 |
| 6,480,455 B2 | * | 11/2002 | Takahashi | 369/112.22 |
| 6,545,823 B2 | * | 4/2003 | Kitahara | 359/738 |
| 6,556,534 B2 | * | 4/2003 | Shimozono | 369/112.26 |
| 6,650,612 B1 | * | 11/2003 | Matsuzaki et al. | 369/112.05 |
| 6,760,295 B1 | * | 7/2004 | Maruyama | 369/112.05 |

(Continued)

FOREIGN PATENT DOCUMENTS

JP 09-27430 * 10/1997

(Continued)

*Primary Examiner*—Thang V. Tran
(74) *Attorney, Agent, or Firm*—Hayes Soloway P.C.

(57) ABSTRACT

An optical head device and an optical recording and reproducing apparatus using this optical head device, which can record information and reproduce the recorded information at any of optical recording media, such as a next generation optical recording medium, in which the wavelength of the light source is made to be shorter, the numerical aperture of the objective lens is made to be higher, and the thickness of the recording medium is made to be thinner, and conventional recording media of DVD and CD standards, are provided. A light having wavelength of 405 nm, emitted from one of optics, is inputted to an objective lens as a collimated light, and is focused on a disk having thickness of 0.1 mm. A light having wavelength of 650 nm, emitted from the other of optics, is inputted to the objective lens as a diverged light, and is focused on a disk having thickness of 0.6 nm. A spherical aberration, which remains for the light having wavelength of 650 nm, is decreased by the change of the magnification of the objective lens, further the decreased spherical aberration is debased by using a wavelength selective filter.

96 Claims, 29 Drawing Sheets

U.S. PATENT DOCUMENTS

| | | | | |
|---|---|---|---|---|
| 6,791,933 B1 * | 9/2004 | Yoo et al. | ............... | 369/112.01 |
| 6,807,139 B2 * | 10/2004 | Sakamoto | ............... | 369/112.07 |
| 6,853,614 B2 * | 2/2005 | Kim et al. | ............... | 369/112.01 |
| 6,870,805 B1 * | 3/2005 | Arai et al. | ............... | 369/112.07 |
| 6,898,168 B2 * | 5/2005 | Kimura et al. | ......... | 369/112.01 |
| 2004/0136309 A1 * | 7/2004 | Arai et al. | ............... | 369/112.08 |

FOREIGN PATENT DOCUMENTS

| | | | |
|---|---|---|---|
| JP | 10-149571 | * | 6/1998 |
| JP | 10-208267 | * | 8/1998 |
| JP | 10-334504 | * | 12/1998 |
| JP | 11-259891 | | 9/1999 |
| JP | 11-328719 | | 11/1999 |
| JP | 2000-99983 | | 4/2000 |
| JP | 2000-231057 | * | 8/2000 |
| JP | 2001-6203 | * | 1/2001 |
| JP | 2002-533957 | * | 10/2002 |
| WO | WO 02/21881 | * | 4/2001 |

* cited by examiner

FIG. 2
PRIOR ART
(a)
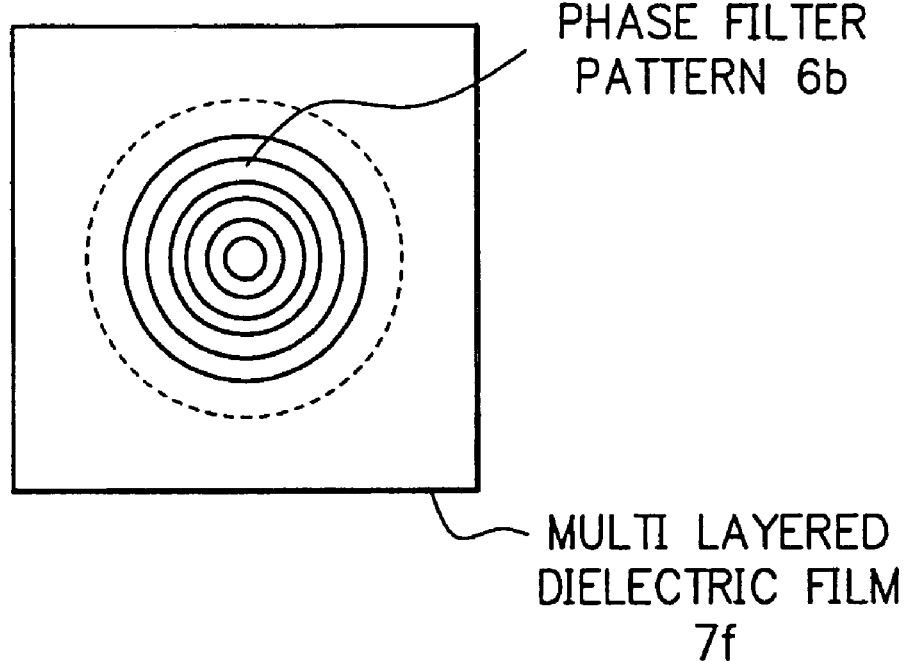
(b)
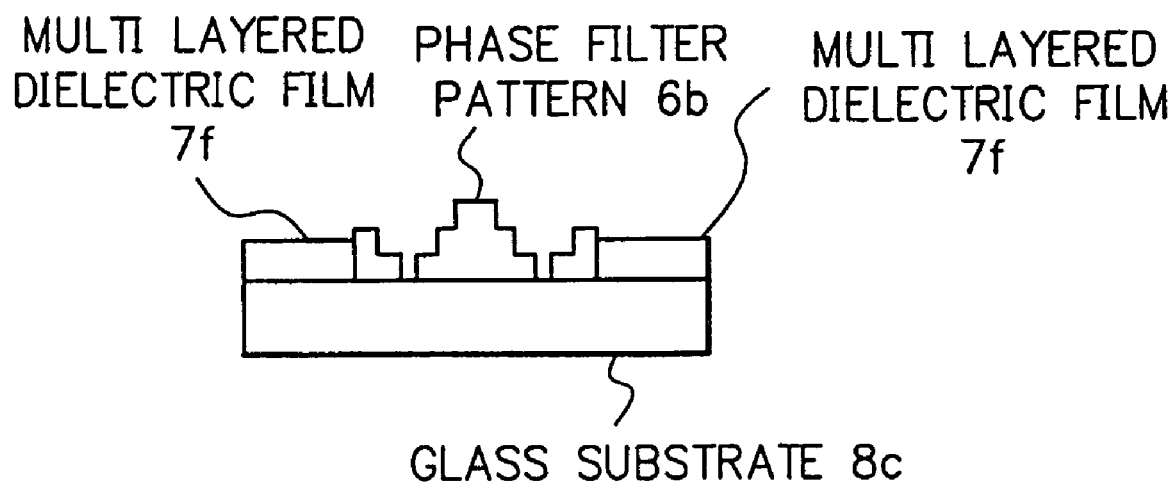

FIG. 4
PRIOR ART
(a)
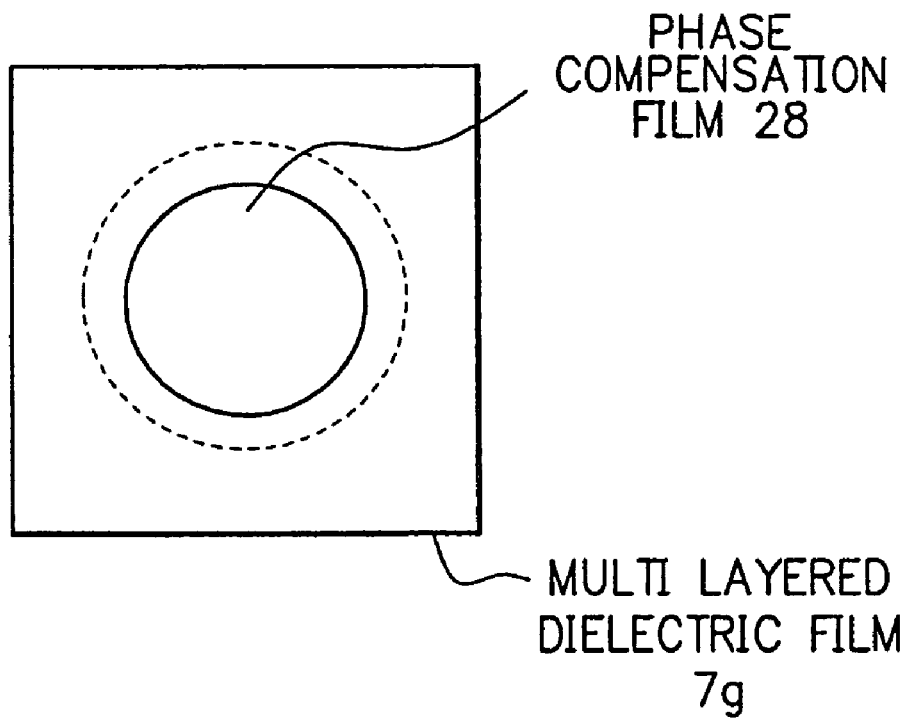
(b)
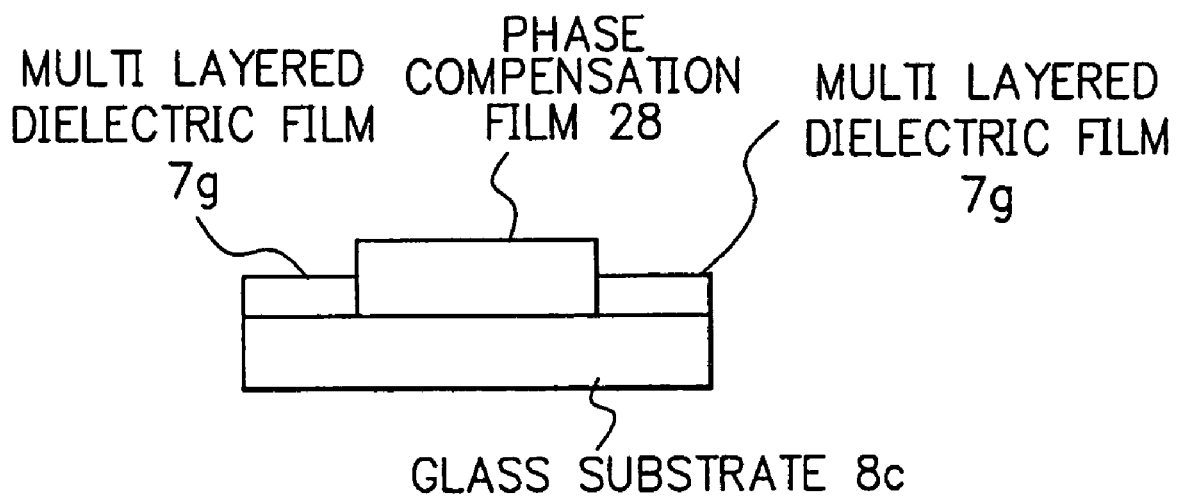

FIG. 5
PRIOR ART

| HEIGHT OF INPUTTED LIGHT/ FOCAL DISTANCE | PHASE FILTER PATTERN |
|---|---|
| 0.000~0.070 | 4 STEPS |
| 0.070~0.132 | 1 STEP |
| 0.132~0.175 | 3 STEPS |
| 0.175~0.213 | 0 STEP |
| 0.213~0.254 | 2 STEPS |
| 0.254~0.288 | 4 STEPS |
| 0.288~0.325 | 1 STEP |
| 0.325~0.370 | 3 STEPS |
| 0.370~0.475 | 0 STEP |
| 0.475~0.503 | 3 STEPS |
| 0.503~0.522 | 1 STEP |
| 0.522~0.537 | 4 STEPS |
| 0.537~0.552 | 2 STEPS |
| 0.552~0.562 | 0 STEP |
| 0.562~0.571 | 3 STEPS |
| 0.571~0.580 | 1 STEP |
| 0.580~0.588 | 4 STEPS |
| 0.587~0.597 | 2 STEPS |
| 0.597~0.600 | 0 STEP |

FIG. 6 PRIOR ART
(a) WAVELENGTH SELECTIVE FILTER WAS NOT USED
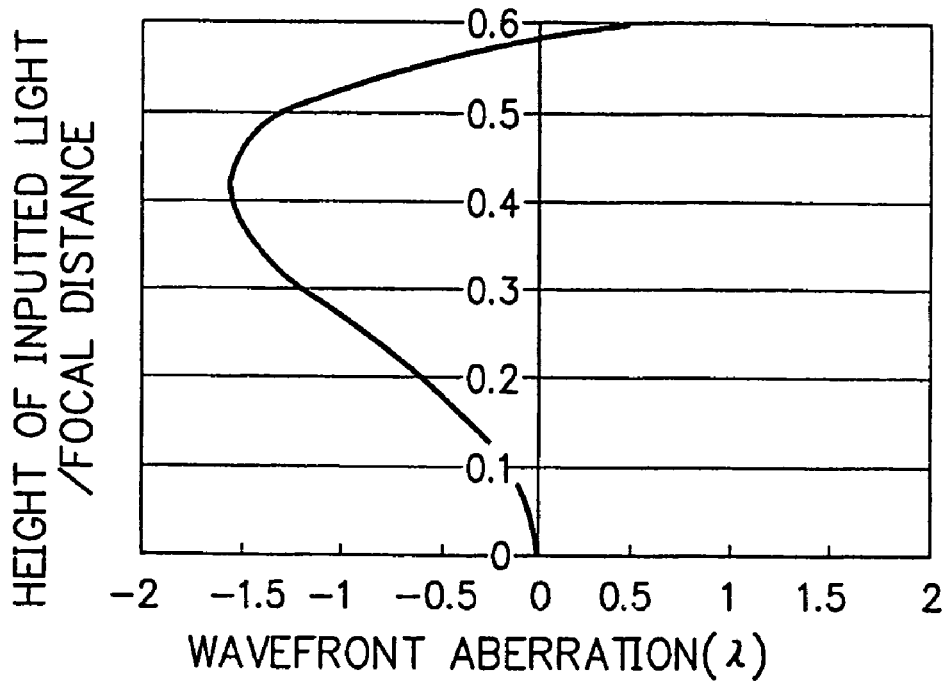
(b) WAVELENGTH SELECTIVE FILTER WAS USED
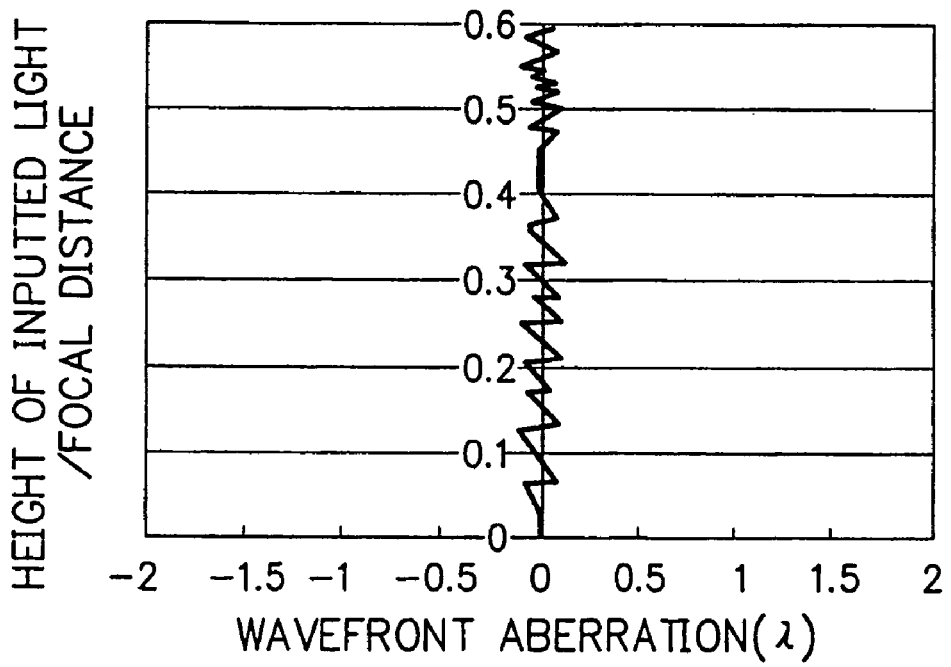

FIG. 9
(a)
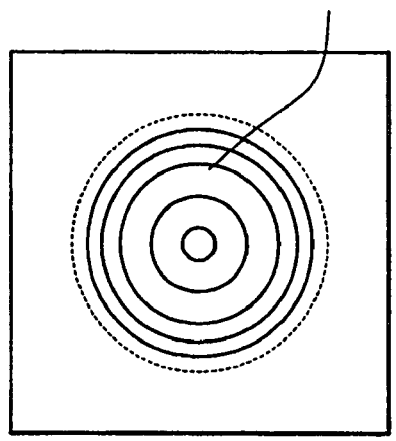
PHASE FILTER PATTERN 6a
(b)
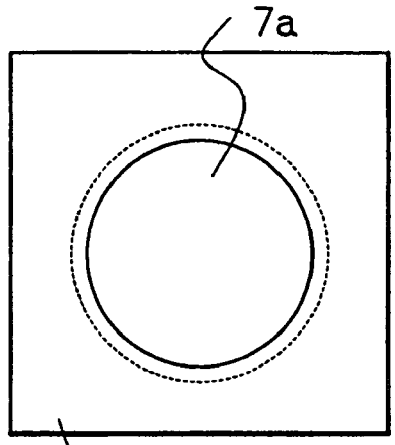
MULTI LAYERED DIELECTRIC FILM 7a
MULTI LAYERED DIELECTRIC FILM 7b
(c)
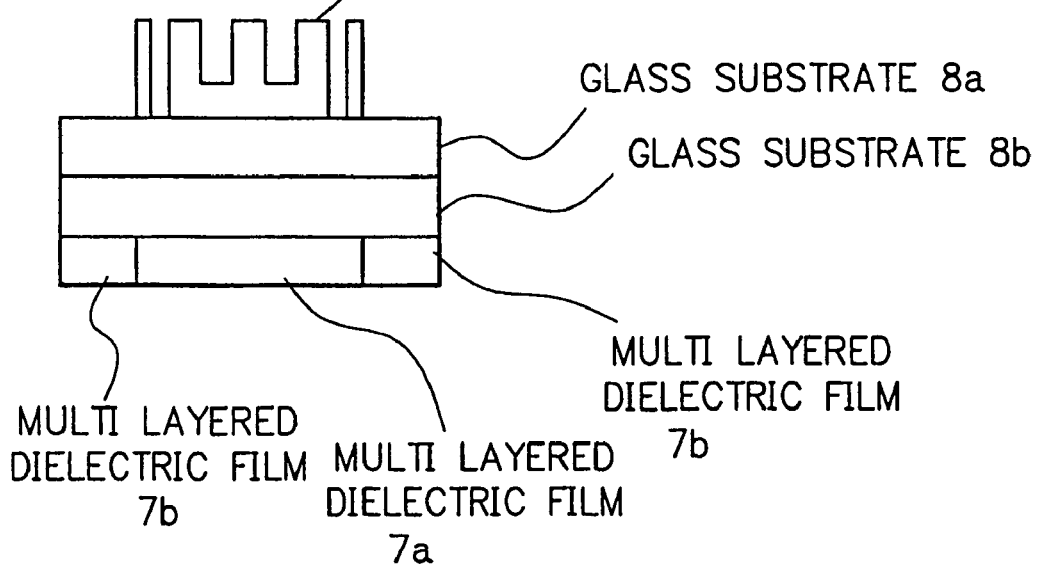
PHASE FILTER PATTERN 6a
GLASS SUBSTRATE 8a
GLASS SUBSTRATE 8b
MULTI LAYERED DIELECTRIC FILM 7b
MULTI LAYERED DIELECTRIC FILM 7a
MULTI LAYERED DIELECTRIC FILM 7b FIG. 11A
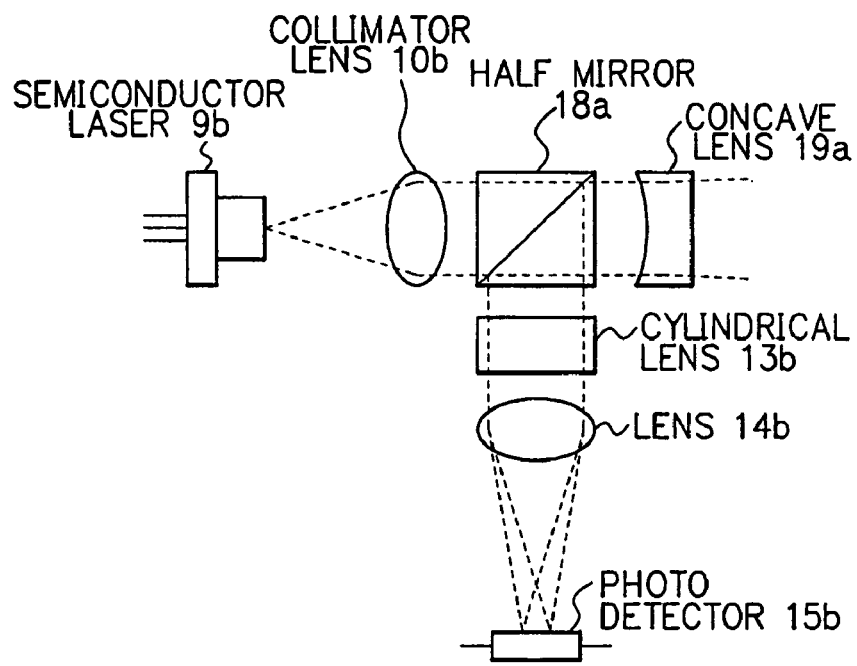
FIG. 11B
FIG. 12
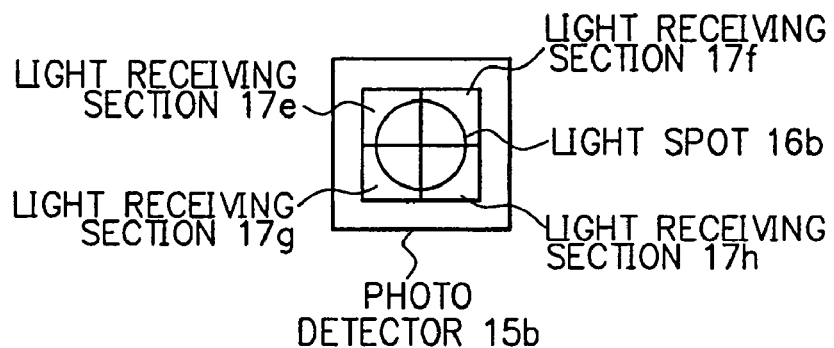

FIG. 13
(a) WAVELENGTH SELECTIVE FILTER WAS NOT USED
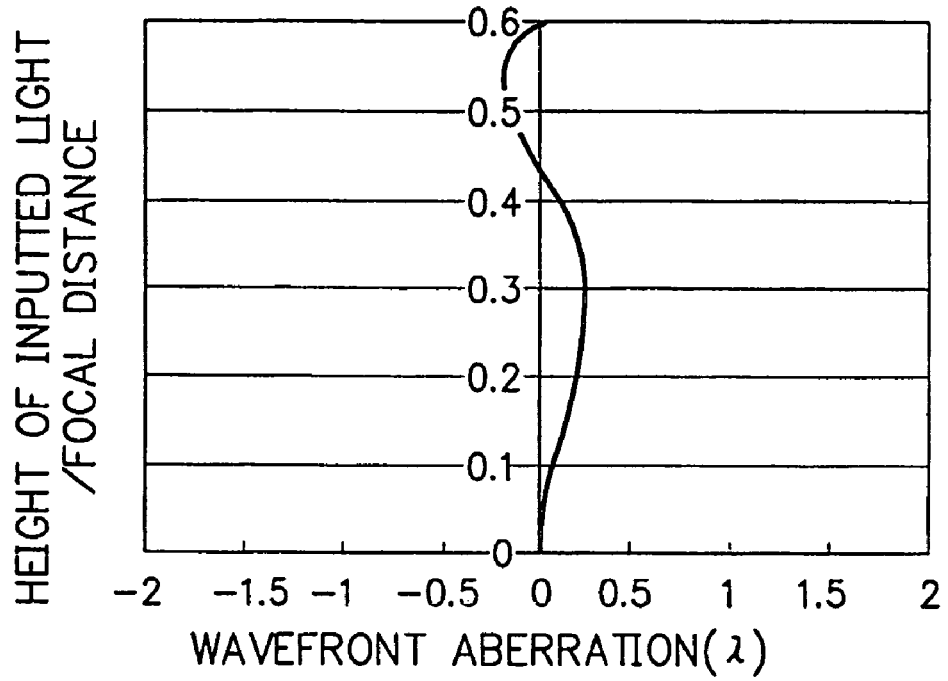
(b) WAVELENGTH SELECTIVE FILTER WAS USED
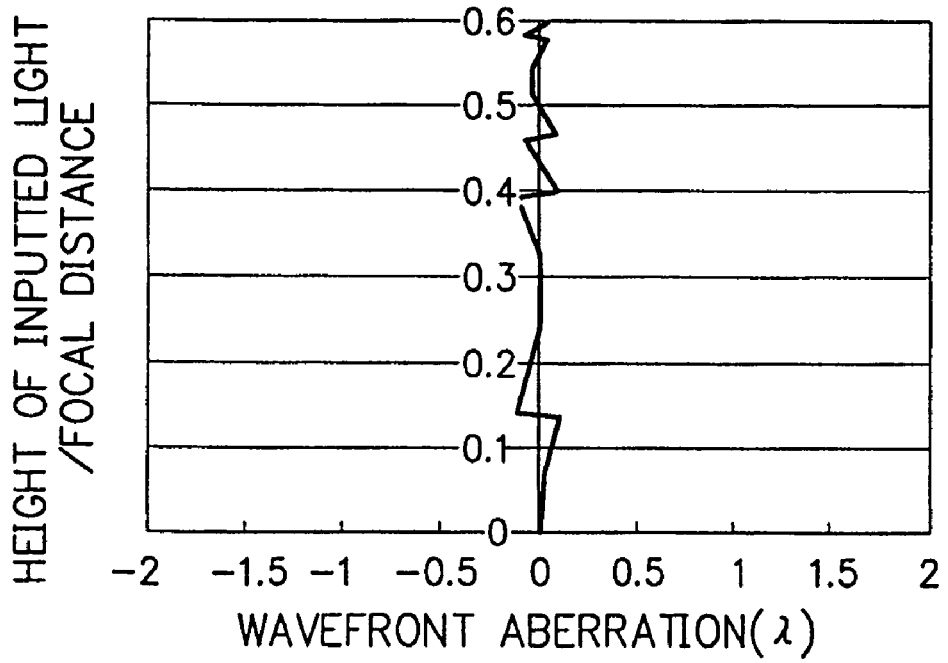

F I G. 15
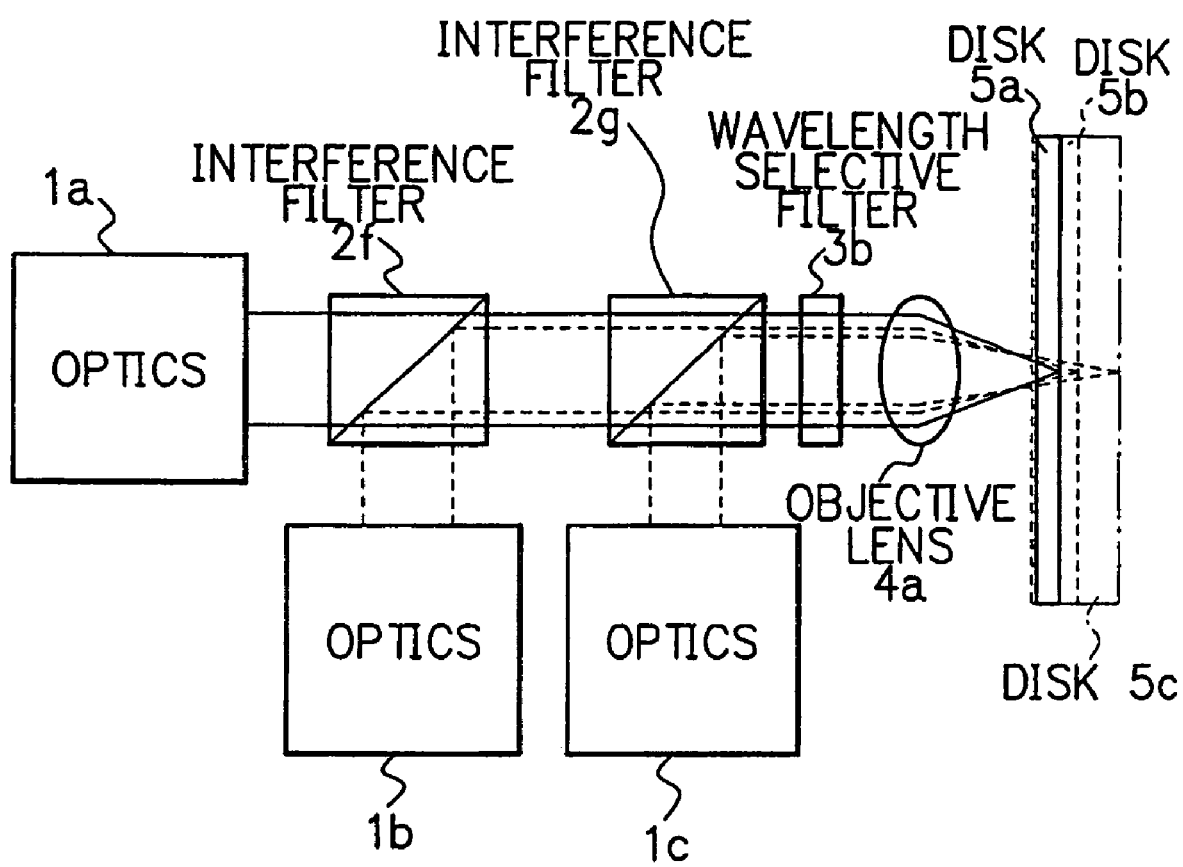

FIG. 16
(a)
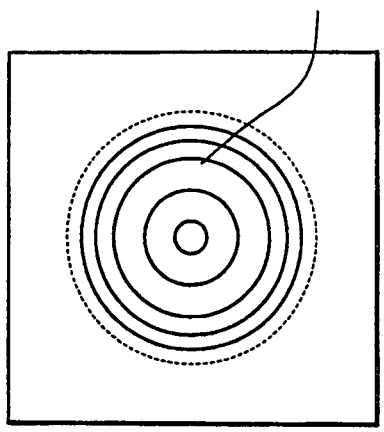
PHASE FILTER PATTERN 6a
(b)
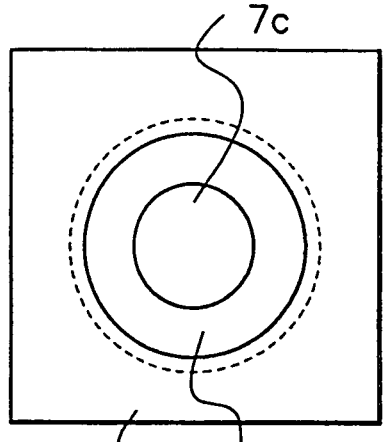
MULTI LAYERED DIELECTRIC FILM 7c
MULTI LAYERED DIELECTRIC FILM 7e
MULTI LAYERED DIELECTRIC FILM 7d
(c)
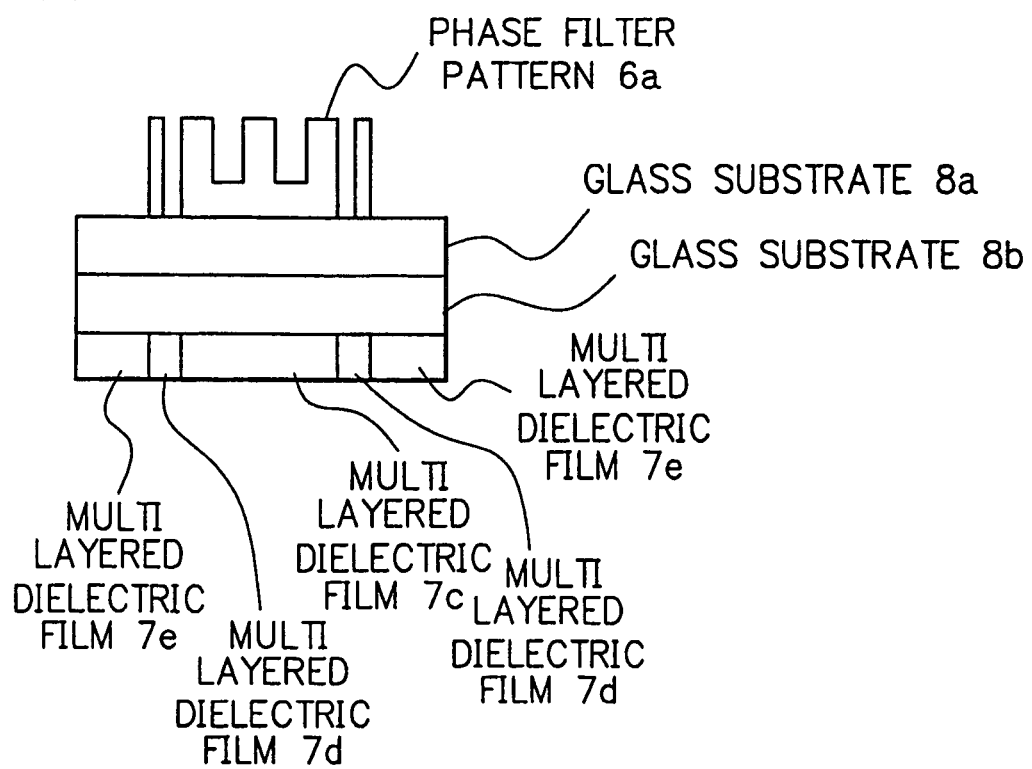
PHASE FILTER PATTERN 6a
GLASS SUBSTRATE 8a
GLASS SUBSTRATE 8b
MULTI LAYERED DIELECTRIC FILM 7e
MULTI LAYERED DIELECTRIC FILM 7e
MULTI LAYERED DIELECTRIC FILM 7d
MULTI LAYERED DIELECTRIC FILM 7c
MULTI LAYERED DIELECTRIC FILM 7d

FIG. 18
(a) WAVELENGTH SELECTIVE FILTER WAS NOT USED
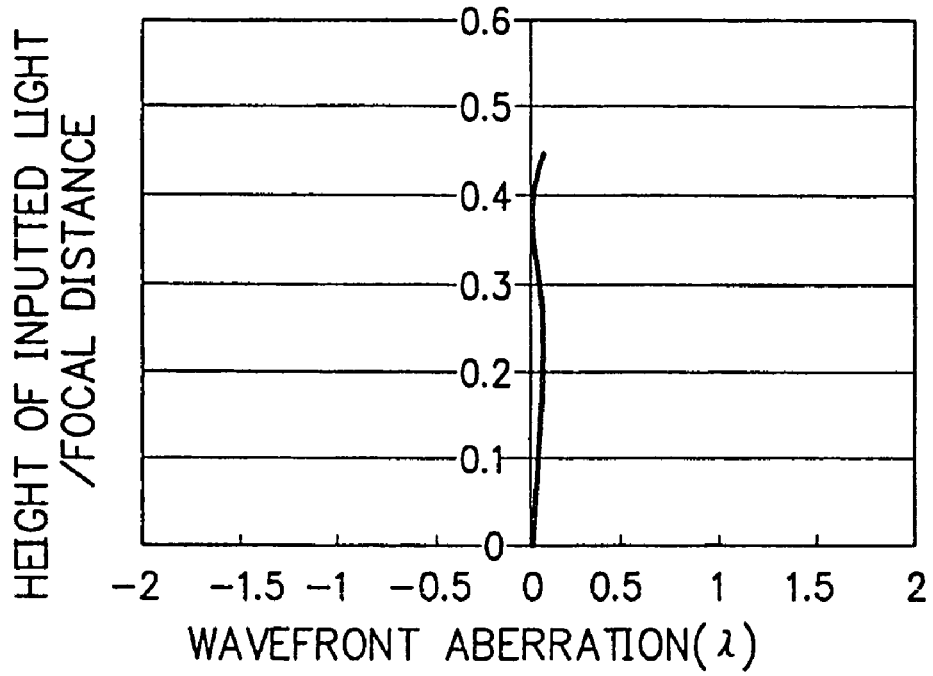
(b) WAVELENGTH SELECTIVE FILTER WAS USED
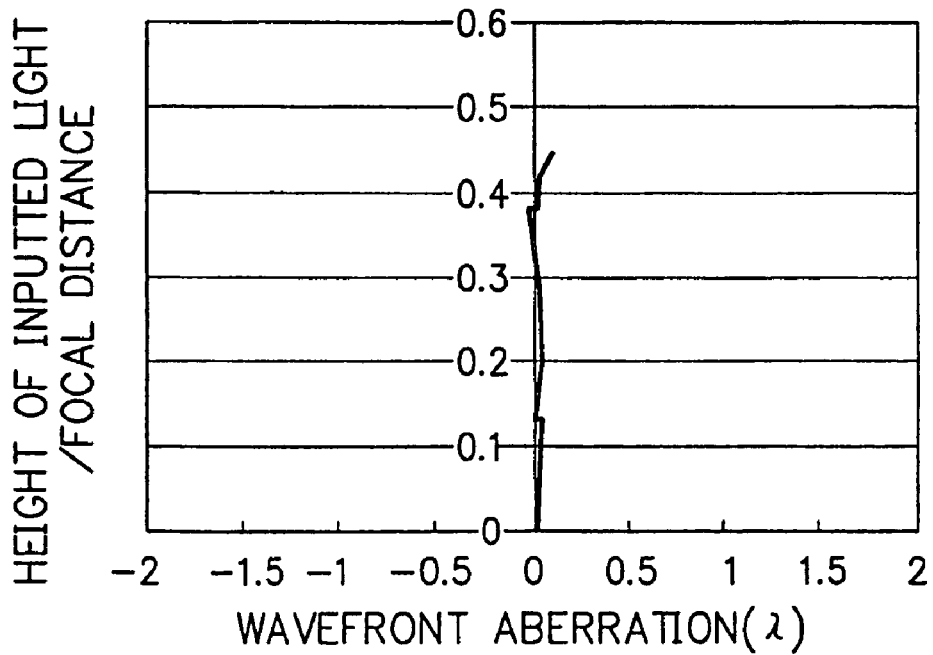

FIG. 20
(a)
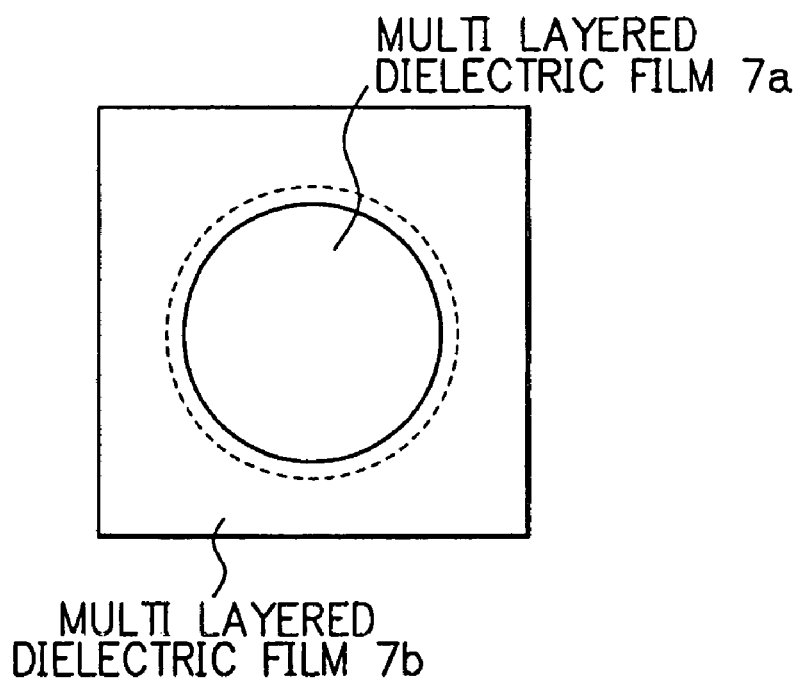
MULTI LAYERED DIELECTRIC FILM 7a
MULTI LAYERED DIELECTRIC FILM 7b
(b)
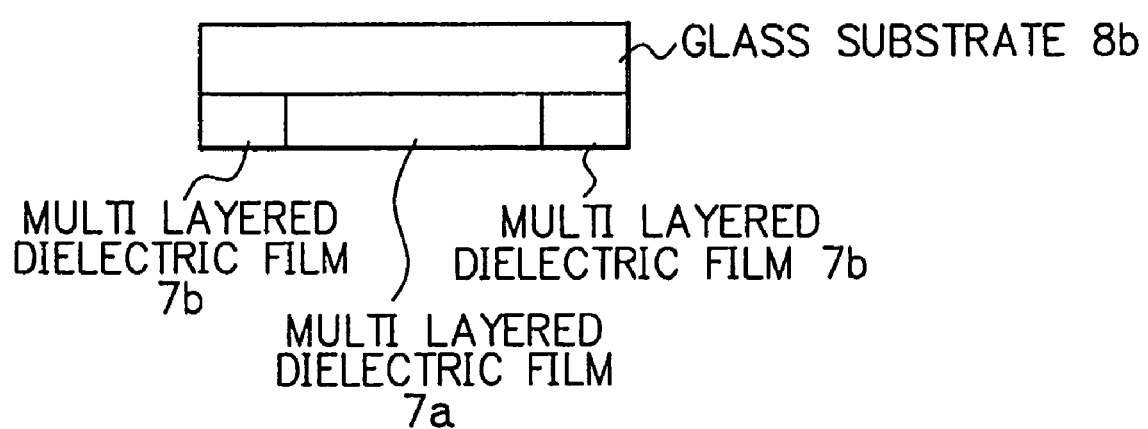
GLASS SUBSTRATE 8b
MULTI LAYERED DIELECTRIC FILM 7b
MULTI LAYERED DIELECTRIC FILM 7b
MULTI LAYERED DIELECTRIC FILM 7a F I G. 22
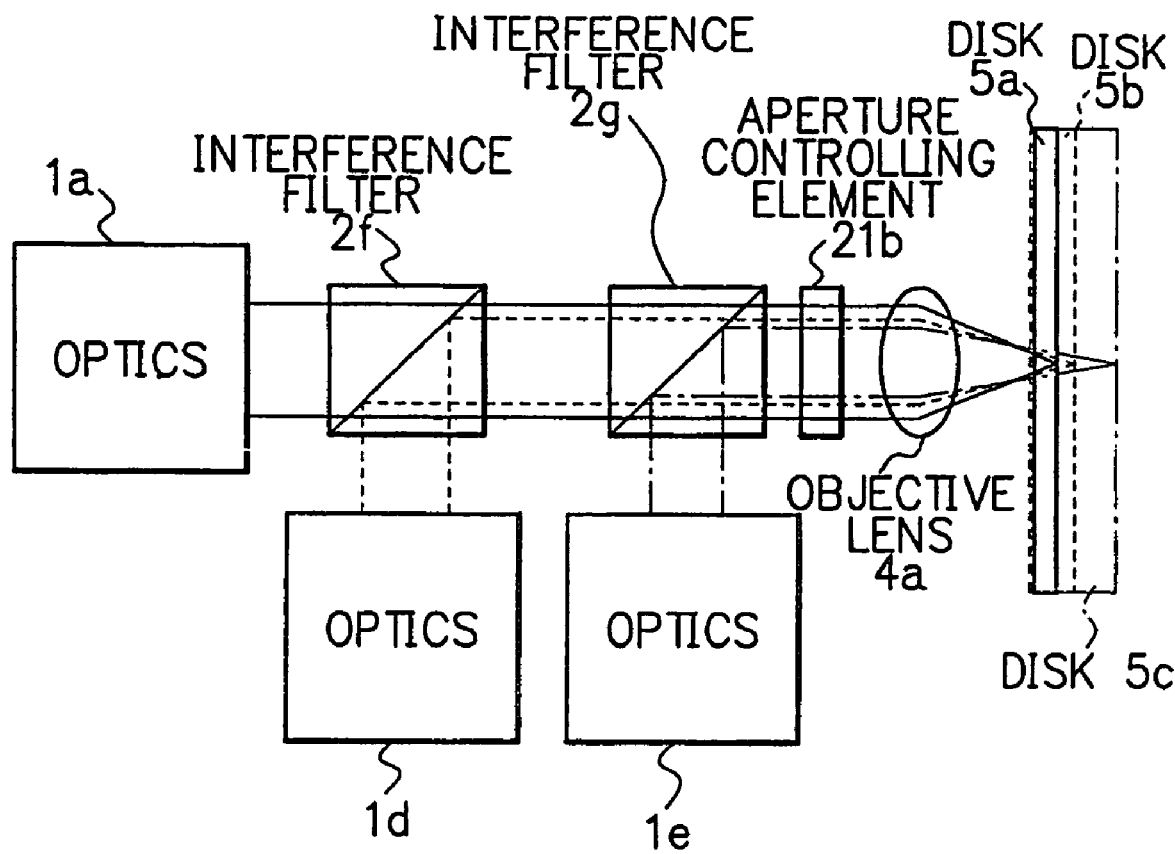

FIG. 23
(a)
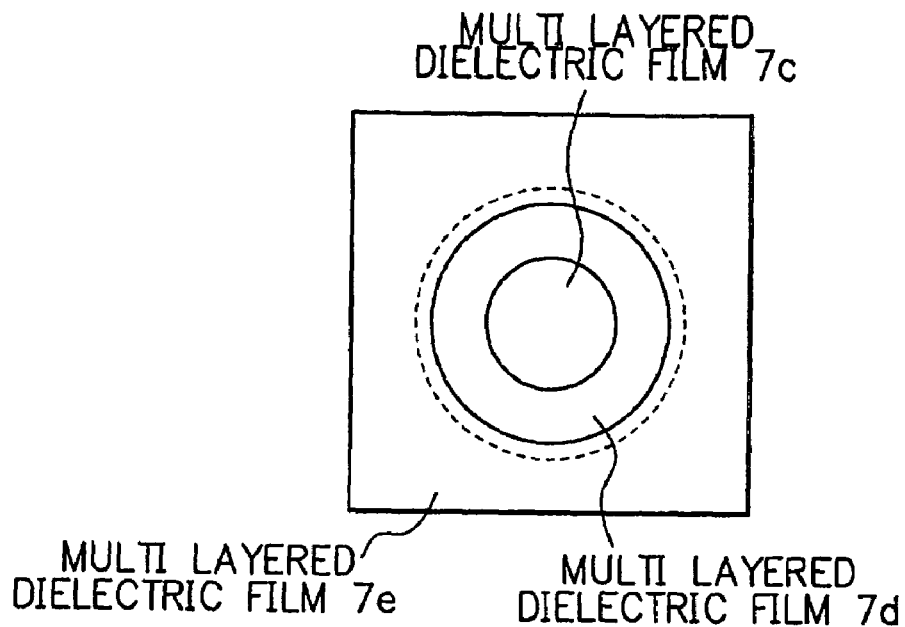
(b)
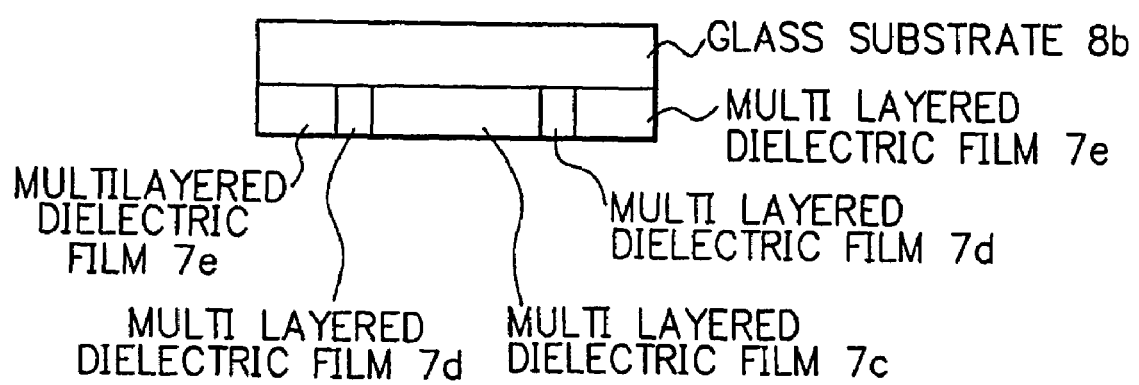

F I G. 25
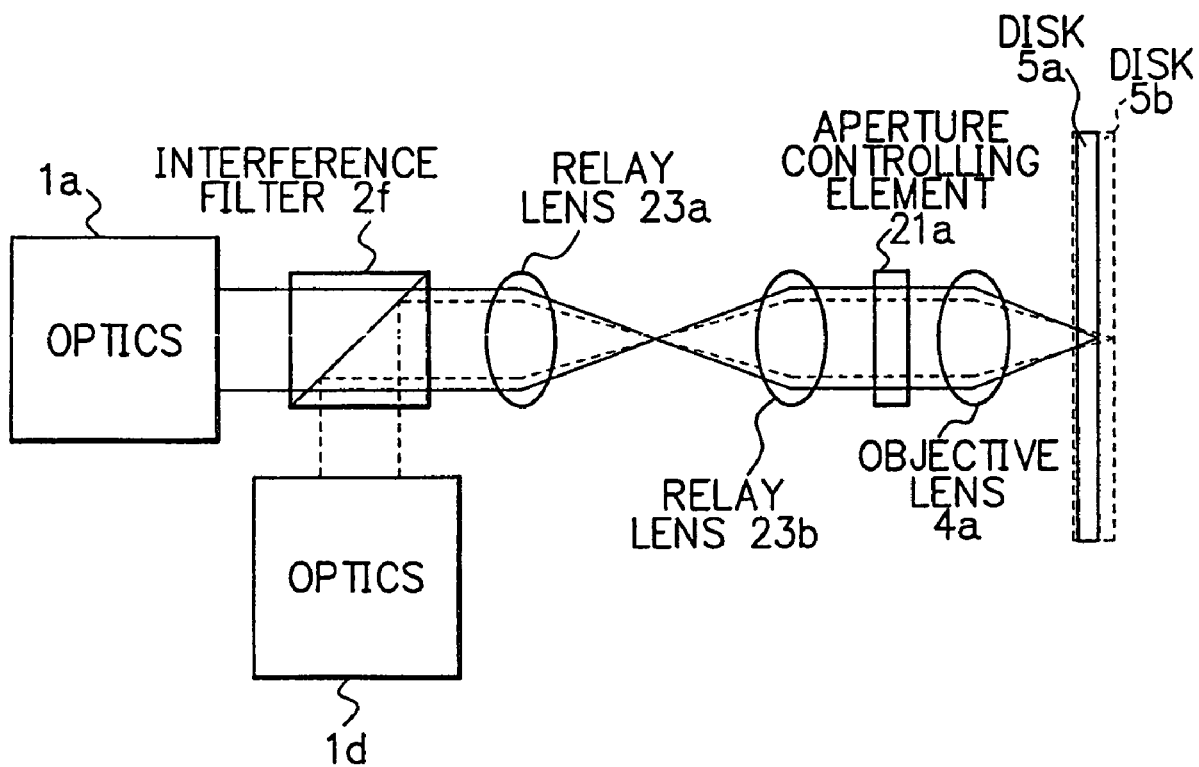

OPTICAL HEAD DEVICE AND OPTICAL RECORDING AND REPRODUCING APPARATUS

CROSS REFERENCE TO RELATED APPLICATION

This application is a continuation of U.S. Pat. application Ser. No. 10/156,163, filed May 28, 2002, now abandoned.

BACKGROUND OF THE INVENTION

The present invention relates to an optical head device and an optical recording and reproducing apparatus using this optical head device, which records information and reproduces the recorded information at plural types of optical recording media in which the thickness of substrates of the optical recording media is different from one another.

DESCRIPTION OF THE RELATED ART

The recording density at the optical recording and reproducing apparatus is in inverse proportion to the second power of the diameter of a focused light spot firmed on an optical recording medium by an optical head device. That is, the smaller the diameter of the focused light spot becomes, the higher the recording density becomes. The diameter of the focused light spot is in proportion to the wavelength of the light source at the optical head device, and is in inverse proportion to the numerical aperture of the objective lens. Therefore, the shorter the wavelength of the light source is and the higher the numerical aperture of the objective lens is, the smaller the diameter of the focused light spot becomes.

On the other hand, when the optical recording medium inclines for the objective lens, the shape of the focused light spot is changed by the coma aberration, and the recording and reproducing characteristics deteriorate. The coma aberration is in inverse proportion to the wavelength of the light source, and is in proportion to the third power of the numerical aperture of the objective lens and the thickness of the substrate of the optical recording medium. Consequently, in case that optical recording media whose substrate thickness is the same are used, when the wavelength of the light source is short and the numerical aperture of the objective lens is high, the margin in the recording and reproducing characteristics for the incline of the optical recording media becomes small.

Therefore, for making the recording density high, at an optical recording and reproducing apparatus, in which the wavelength of the light source is short and the numerical aperture of the objective lens is high, in order to obtain a sufficient margin for the incline of the optical recording medium, the thickness of the substrate of the optical recording medium is made to be thin.

At the standard of the compact disk (CD) whose capacity is 650 MB, the wavelength of the light source is 780 nm, the numerical aperture of the objective lens is 0.45, and the thickness of the substrate is 1.2 mm. And at the standard of the digital versatile disk (DVD) whose capacity is 4.7 GB, the wavelength of the light source is 650 nm, the numerical aperture of the objective lens is 0.6, and the thickness of the substrate is 0.6 mm.

At a general use optical head device, its objective lens is designed so that the spherical aberration is cancelled for a disk whose substrate has designated thickness. Therefore, when the optical head device records and reproduces information for a disk whose substrate has different thickness, the spherical aberration remains, and normal recording and reproducing cannot be executed. In order to solve this problem, an optical recording and reproducing apparatus, which has an interchangeable function that can record and reproduce information at both disks of the CD standard and the DVD standard, has been proposed.

As a first conventional optical head device, which can record and reproduce information at both disks of the CD standard and the DVD standard, there is an optical head device, which has been disclosed in Japanese Patent Application Laid-Open No. HEI 10-334504. FIG. 1 is a block diagram showing a structure of the optical head device at the Japanese Patent Application Laid-Open No. HEI 10-334604.

In FIG. 1, each of optics 1f and 1g provides a semiconductor laser and a photo detector that receives a light reflected from one of disks. The wavelength of the semiconductor laser in the optics 1f is 650 nm, and the wavelength of the semiconductor laser in the optics 1g is 780 nm. An interference filter 2h transmits a light ha in wavelength of 650 nm, and reflects a light having wavelength of 780 nm.

A light emitted from the semiconductor laser in the optics if transmits the interference filter 2h and a wavelength selective filter 3c. And the transmitted light is inputted to an objective lens 4b as a collimated light and is focused on a disk 5b, whose thickness is 0.6 mm, of the DVD standard. A light reflected from the disk 5b transmits the objective lens 4b, the wavelength selective filter 3c, and the interference filter 2h in the inverse direction, and the photo detector in the optics If receives the transmitted light.

A light emitted from the semiconductor laser in the optics 1g is reflected at the interference filter 2h and transmits the wavelength selective filter 5c. And the transmitted light is inputted to the objective lens 4b as a collimated light and is focused on a disk 5c, whose thickness is 1.2 mm, of the CD standard. A light reflected from the disk 5c transmits the objective lens 4b, the wavelength selective filter 3c in the inverse direction, and is reflected at the interference filter 2h, and the photo detector in the optics 1g receives the transmitted light. The objective lens 4b has a spherical aberration, which cancels a spherical aberration generated at the time when the light, whose wavelength is 650 nm, transmits through the disk 5b whose thickness is 0.6 mm.

FIG. 2 is a diagram showing the wavelength selective filter 3c shown in FIG. 1. In FIG. 2(a), the plane view of the wavelength selective filter 3c is shown, and in FIG. 2(b), the sectional view of the wavelength selective filter 3c is shown. As shown in FIG. 2, the wavelength selective filter 3c is composed of a glass substrate 8c, a phase filter pattern 6b having concentric circle shapes formed on the glass substrate 8c, and a multi layered dielectric film 7f formed on the glass substrate 8c. When the effective diameter of the objective lens 4b, shown as a dotted line in FIG. 2(a), is defined as 2d, the phase filter pattern 6b is formed only within the circular region of the diameter 2e, which is smaller than the diameter 2d.

As shown in FIG. 2(b), the cross-section of the phase filter pattern 6b has a four level step shape. The height of each step of the phase filter pattern 6b is set to be a value so that the phase difference of light transmitting between a part with a pattern and a part without a pattern at each step becomes $2\pi$ (equivalent to 0) for the wavelength 650 n. At this time, this phase difference becomes $1.67\pi$ (equivalent to $-0.33\pi$) for the wavelength 780 nm.

Therefore, the phase filter pattern 6b does not change the phase distribution for the light having wavelength of 650 nm, and changes the phase distribution for the light having wavelength of 780 nm. In case that the wavelength selective filter 3c is not used, when the light having wavelength of 780 nm, inputted to the objective lens 4b as a collimated light, was transmitted through the substrate having thickness of 1.2 mm, a spherical aberration remains. However, the phase filter pattern 6b is designed so that the change of the phase distribution for the light having wavelength of 780 nm decreases the remaining spherical aberration.

The multi layered dielectric film 7f is formed at only the region outside the circle of the diameter 2e. The multi layered dielectric film 7f transmits all of the light having wavelength of 650 nm and reflects all of the light having wavelength of 780 nm. And also the multi layered dielectric film 7f makes the phase difference of light, transmitting through between within the circle of the diameter 2e and outside the circle of the diameter 2e for the light having wavelength of 650 nm, adjust to be integer times the value of $2\pi$. That is, at the wavelength selective filter 3c, the light having wavelength of 650 nm is all transmitted, and the light having the wavelength of 780 nm is all transmitted within the region of the circle of the diameter 2e and is all reflected outside the region of the circle of the diameter 2e. Therefore, when the focal distance of the objective lens 4b is decided as "fb", the effective numerical aperture for the light having wavelength of 650 nm is given as "d/fb", and the effective numerical aperture for the light having wavelength of 780 nm is given as "e/b". For example, it is set to be that the "d/fb"=0.6, and the "e/fb"=0.45.

As a second conventional optical head device, which can record and reproduce information at both disks of the CD standard and the DVD standard, there is an optical head device, which has been disclosed in Japanese Patent Application Laid-Open No. HEI 9-274730. FIG. 3 is a block diagram showing a structure of the optical head device at the Japanese Patent Application Laid-Open No. HEI 9-274730.

In FIG. 3, each of modules 27a and 27b provides a semiconductor laser and a photo detector that receives a light reflected from one of disks. The wavelength of the semiconductor laser in the module 27a is 650 nm, and the wavelength of the semiconductor laser in the module 27b is 780 nm. An interference filter 2h transmits a light having wavelength of 650 nm, and reflects a light having wavelength of 780 nm.

A light emitted from the semiconductor laser in the module 27a transmits the interference filter 2h, a collimator lens 10d, and an aperture controlling element 21c. And the transmitted light is inputted to an objective lens 4b as a collimated light and is focused on a disk 5b, whose thickness is 0.6 mm, of the DVD standard. A light reflected from the disk 5b transmits the objective leas 4b, the aperture controlling element 21c, the collimator lens 10d, and the interference filter 2h in the inverse direction, and the photo detector in the module 27a receives the transmitted light.

A light emitted from the semiconductor laser in the module 27b is reflected at the interference filter 2h, and the reflected light is transmitted through the collimator lens 10d and the aperture controlling element 21c. And the transmitted light is inputted to the objective lens 4b as a diverged light and is focused on a disk 5c, whose thickness is 1.2 mm, of the CD standard. A light reflected from the disk 5c transmits 10 the objective lens 4b, the aperture controlling element 21c, the collimator lens 10d in the inverse direction, and is reflected at the interference filter 2h, and the photo detector in the module 27b receives the transmitted light.

The objective lens 4b has a spherical aberration, which cancels a spherical aberration generated at the time when the light, whose wavelength is 650 nm, transmits through the disk 5b whose thickness is 0.6 mm. A spherical aberration remains when the light whose wavelength is 780 nm, inputted to the objective lens 4b as a collimated light, transmits through the disk 5c whose thickness is 1.2 mm. However, when a light, whose wavelength is 780 nm, is inputted to the objective lens 4b as a diverged light, a new aberration is generated by the change of the magnification of the objective lens 4b, and this works to decrease the remaining spherical aberration.

FIG. 4 is a diagram showing the aperture controlling element 21c shown in FIG. 3. In FIG. 4(a), the plane view of the aperture controlling element 21c is shown, and in FIG. 4(b), the sectional view of the aperture controlling element 21c is shown. As shown in FIG. 4, the aperture controlling element 21c is composed of a glass substrate 8c, and a phase compensation film 28 formed on the glass substrate 8c and a multi layered dielectric film 7g formed on the glass substrate 8c. When the effective diameter of the objective lens 4b, shown as a dotted line in FIG. 4(a), is defined as 2d, the multi layered dielectric film 7g is formed only at the region outside the diameter 2e, which is smaller than the diameter 2d. The multi layered dielectric film 7g transmits all the light having wavelength of 650 nm, and reflects all the light having wavelength of 780 nm.

That is, at the aperture controlling element 21c, the light hat wavelength of 650 nm is all transmitted, and the light having wavelength of 780 nm is all transmitted within the region of the circle of the diameter 2e and is all reflected outside the region of the circle of the diameter 2e. Therefore, when the focal distance of the objective lens 4b is decided as "fb", the effective numerical aperture for the light having wavelength of 650 nm is given as "d/fb", and the effective numerical aperture for the light having wavelength of 780 nm is given as "e/fb". For example, it is set as the "d/fb"=0.6, and the "e/fb"=0.45.

The phase compensation film 28 is formed at only inside the circular region of the diameter 2e. The phase compensation film 28 works to adjust the phase difference of light, transmitting through between the inside of the circular region of the diameter 2e and the outside of that, to integer times the value of $2\pi$.

Recently, in order to make the recording density much higher, a next generation standard, in which the wavelength of the light source is made to be shorter, the numerical aperture of the objective lens is made to be higher, and the thickness of the substrate of the optical recording medium is made to be thinner, has been proposed. For example, in Technical Digest, pp. 24-25, at International Symposium on Optical Memory 2000, a next generation standard, in which the wavelength of the light source is 405 nm, the numerical aperture of the objective lens is 0.7, the thickness of the disk substrate is 0.12 mm, and the information capacity is 17 GB, has been proposed. In this case, an optical head device, which has an interchangeable function being able to record and reproduce information at all of the next generation standard and the conventional DVD and CD standards, is required.

As a first example, the wavelength selective filter 3c at the first conventional optical head device shown in FIG. 1 is studied. In this case, the interchangeability between a next generation standard, in which the wavelength of the light source is 405 nm, the numerical aperture of the objective lens is 0.7, and the thickness of the disk substrate is 0.1 mm, and the conventional DVD standard is studied. A semiconductor laser having wavelength of 405 nm is used to record and reproduce information for the disk having thickness of 0.1 mm of the next generation standard. And a semiconductor laser having wavelength of 650 nm is used to record and reproduce information for the disk having thickness of 0.6 mm of the DVD standards The objective lens 4b has a spherical aberration, which cancels a spherical aberration generating at the time when a light having wavelength of 405 nm, inputted to the objective lens 4b as a collimated light, transmits through the substrate having thickness of 0.1 mm.

The cross-section of the phase filter pattern 6b in the wavelength selective filter 3c is a five level step shape. The height of each step of the phase filter pattern 6b is set to be a value so that the phase difference of light transmitting between a part with a pattern and a part without a pattern at each step becomes $2\pi$ (equivalent to 0) for the wavelength 405 nm. At this time, this phase difference becomes $1.25\pi$ (equivalent to $-0.75\pi$) for the wavelength 650 nm.

Therefore, the phase filter pattern 6b does not change the phase distribution for the light having wavelength of 405 nm, and changes the phase distribution for the light having wavelength of 650 nm. In case that the wavelength selective filter 3c is not used, when the light having wavelength of 650 nm, inputted to the objective lens 4b as a collimated light, was transmitted through the substrate having thickness of 0.6 mm, a spherical aberration remains. The phase filter pattern 6b is designed so that the change of the phase distribution for the light having wavelength of 650 nm decreases the remaining spherical aberration.

FIG. 5 is a table showing the designed result of the phase filter pattern 6b when the phase filter pattern 6b of the first conventional optical head device was used at the interchangeability between the next generation standard and the conventional DVD standard In FIG. 5, the left row shows the height of a light inputted to the objective lens divided by the focal distance of the objective lens. And the right row shows the number of steps of the phase filter pattern 6b corresponding to the left row.

The multi layered dielectric film 7f works to transmit all of the light having wavelength of 405 nm and reflect all of the light having wavelength of 650 nm. And also the multi layered dielectric film 7f works to make the phase difference of light, transmitting through between within the circle of the diameter 2e and outside the circle of the diameter 2e, adjust to be integer times the value of $2\pi$. That is, at the wavelength selective filter 3c, the light hanging wavelength of 405 nm is all transmitted, and the light having wavelength of 650 nm is all transmitted within the region of the circle of the diameter 2e and is all reflected outside the region of the circle of the diameter 2e. The effective numerical aperture for the light having wavelength of 405 nm is set to be 0.7, and the effective numerical aperture for the light having wavelength of 650 nm is set to be 0.6.

FIG. 6 is a graph showing the calculated result of the wavefront aberration for the light having wavelength of 650 nm when the first conventional optical head device was used at the interchangeability between the next generation standard and the conventional DVD standard. In FIG. 6(a), a relation between the height of a light inputted to the objective lens divided by the focal distance of the objective lens and the wavefront aberration, at the beat image position where the standard deviation of the wavefront aberration becomes minimum, is shown, in a case that the wavelength selective filter 3c was not used And in FIG. 6(b), a relation between the height of a light inputted to the objective lens divided by the focal distance of the objective lens and the wavefront aberration, at the best image position where the standard deviation of the wavefront aberration becomes minimum, is shown, in a case that the wavelength selective filter 3c was used. As shown in FIG. 6(b), the standard deviation of the wavefront aberration is decreased to be $0.054\lambda$, by using the wavelength selective filter 3c. This value is lower than $0.07\lambda$ that is the allowable value of the standard deviation of the wavefront aberrations known as Marechel's criterion.

However, as shown in FIG. 5, the number of regions of concentric circle shapes, of which the phase filter pattern 6b is composed, is as many as 19, and the width of each region becomes narrow. For example, when the focal distance of the objective lens 4b is decided to be 2.57 mm, the width of the most outside region becomes about 7.7 μm. Generally, an element, whose cross-section has multi leveled step shapes, is formed by a photo lithography method, by using plural photo masks, however, when the plural photo masks are aligned with one another, there is an error of 2 to 3 μm at each region. Therefore, it is very difficult to manufacture such a wavelength selective filter having a phase filter pattern whose each region is very narrow mentioned above in desiring preciseness.

As a second example, the change of the magnification of the objective lens at the second conventional optical head device shown in FIG. 3 is studied. In this case, the interchangeability between a next generation standard, in which the wavelength of the light source is 405 nm, the numerical aperture of the objective lens is 0.7, and the thickness of the disk substrate is 0.1 mm, and the conventional DVD standard is studied A semiconductor laser having wavelength of 405 nm is used to record and reproduce information for the disk having thickness of 0.1 mm of the next generation standard. The semiconductor laser having wavelength of 650 nm is used to record and reproduce information for the disk having thickness of 0.6 mm of the DVD standard. The objective lens 4b has a spherical aberration, which cancels a spherical aberration generated at the time when a light having wavelength of 405 nm, inputted to the objective lens 4b as a collimated light, transmits through the substrate having thickness of 0.1 mm.

The light having wavelength of 405 nm is inputted to the objective lens 4b as a collimated light, therefore, the magnification of the objective lens 4b for the light having wavelength of 405 nm is 0. On the other hand, when the light having wavelength of 650 nm, inputted to the objective lens 4b as a collimated light, was transmitted through the substrate having thickness of 0.6 mm, a spherical aberration remains. When the light hang wavelength of 650 nm is inputted to the objective lens 4b as a diverged light, a new spherical aberration occurs corresponding to the change of the magnification of the objective lens 4b, and this new spherical aberration works to decrease the remaining spherical aberration. The magnification of the objective lens 4b for the light having wavelength of 650 nm is set to be 0.076.

The multi layered dielectric film 7g at the aperture controlling element 21c works to transmit all of the light having wavelength of 405 nm and reflect all of the light having wavelength of 650 nm. That is, at the aperture controlling element 21c, the light having wavelength of 405 nm is all transmitted, and the light having wavelength of 650 nm is all transmitted within the region of the circle of the diameter 2e and is all reflected outside the region of the circle of the diameter 2e. The effective numerical aperture or the light having wavelength of 405 nm is set to be 0.7, and the effective numerical aperture for the light having wavelength of 650 nm is set to be 0.6. On the other hand, for the wavelength of 405 nm, the phase compensation film 28 works to adjust the phase difference of light transmitting through between within the circular region and without the circular region to integer times the value of $2\pi$.

FIG. 7 is a graph showing the calculated result of the wavefront aberration for the light having wavelength of 650 nm when the second conventional optical head device was used at the interchangeability between the next generation standard and the conventional DVD standard. In FIG. 7, a relation between the height of a light inputted to the objective lens divided by the focal distance of the objective lens and the wavefront aberration, at the best image position where the standard deviation of the wavefront aberration becomes minimum for the light having wavelength of 650 nm, is shown. The standard deviation of the wavefront aberration is decreased to be 0.095λ, by using the change of the magnification of the objective lens. However, this value is higher than 0.07λ that is the allowable value of the standard deviation of the wavefront aberration, known as Marechel's criterion.

It can be considered to combine the wavelength selective filter at the first conventional optical head device shown in FIG. 1 with the change of the magnification of the objective lens at the second conventional optical head device shown in FIG. 3, in order to meet the interchangeability between the next generation standard and the conventional DVD standard.

However, at this combined case, in the phase filter pattern at the wavelength selective filter, it is designed that the change of the phase distribution for the light having wavelength of 650 nm decreases the spherical aberration that remains at the time when the light having wavelength of 650 nm, inputted to the objective lens as a collimated light, transmits through the substrate having thickness of 0.6 mm. Consequently, the spherical aberration, which remains at the time when the light having wavelength of 650 nm, inputted to the objective lens as a diverged light, transmits through the substrate having thickness of 0.6 mm, is not decreased by using the wavelength selective filter, and on the contrary, is increased.

As mentioned above, when the wavelength of the light source is short and the numerical aperture of the objective lens becomes high, there are problems that the wavelength selective filter at the first conventional optical head device shown in FIG. 1 and the change of the magnification of the objective lens at the second conventional optical head device shown in FIG. 3 can not be used for the interchangeability.

SUMMARY OF THE INVENTION

It is therefore an object of the present invention to provide an optical head device and an optical recording and reproducing apparatus using this optical head device, which records information and reproduces the recorded information at plural types of optical recording media in which the thickness of substrates of the optical recording media is different from one another. Further, an optical head device and an optical recording and reproducing apparatus using this optical head device, which has the interchangeability between a next generation optical recording medium, in which the wavelength of the light source is made to be much shorter, the numerical aperture of the objective lens is made to be much higher, and the thickness of the optical recording medium is made to be much thinner, in order to make the recording density high, and the conventional recording media of the DVD and CD standards, are provided.

According to a first aspect of the present invention, for achieving the object mentioned above, there is provided an optical head device. The optical head device provides a first light source for emitting a light having a first wavelength, a second light source for emitting a light having a second wavelength, a photo detector, a wavelength selective filter, and an objective lens. And an optical system is formed by that a light emitted form the first light source is transmitted to a Ant optical recording medium containing a first substrate having a first thickness through the wavelength selective filter and the objective lens, a light emitted form the second light source is transmitted to a second optical recording medium containing a second substrate having a second thickness through the wavelength selective filter and the objective lens, a light reflected from the first optical recording medium is transmitted to the photo detector through the objective lens and the wavelength selective filter, and a light reflected from the second optical recording medium is transmitted to the photo detector through the objective lens and the wavelength selective filter. And recording and reproducing information is executed for the first optical recording medium by using the light having the first wavelength, and recording and reproducing information is executed for the second optical recording medium by using the light having the second wavelength. Aid the magnification of the objective lens for the light having the first wavelength is different from the magnification of the objective lens for the light having the second wavelength, and the wavelength selective filter changes the phase distribution so that a spherical aberration remaining for the light having the first wavelength or the light having the second wavelength at corresponding the magnification of the objective lens is decreased.

According to a second aspect of the present invention, in the first aspect, the first wavelength is shorter than the second wavelength.

According to a third aspect of the present invention, in the first aspect, the first thickness of the first substrate is thinner than the second thickness of the second substrate, According to a fourth aspect of the present invention, in the first aspect, the objective lens has a spherical aberration that cancels a spherical aberration generated at the time when the light having the first wavelength, inputted to the objective lens as a collimated light, transmits through the first substrate having the first thickness.

According to a fifth aspect of the present invention, in the first aspect, the light emitted from the first light source is inputted to the objective lens as an almost collimated light so that the magnification of the objective lens for the light having the first wavelength becomes about 0, and the light emitted from the second light source is inputted to the objective lens as a diverged light so that the magnification of the objective lens for the light having the second wavelength becomes a first designated value.

According to a sixth aspect of the present invention, in the first aspect, the wavelength selective filter provides a phase filter pattern having concentric circle shapes, and first and second multi layered dielectric films.

According to a seventh aspect of the present invention, in the sixth aspect, the phase filter pattern hardly changes the phase distribution for the light having the first wavelength, and changes the phase distribution for the light having the second wavelength.

According to eighth aspect of the present invention, in the sixth aspect, the phase filter pattern is designed so that the change of the phase distribution for the light having the second wavelength decreases a spherical aberration at the magnification of the first designated value of the objective lens.

According to a ninth aspect of the present invention, in the sixth aspect, the phase filter pattern is formed only within a circular region having a first diameter that is smaller than the effective diameter of the objective lens.

According to a tenth aspect of the present invention, in the sixth aspect, the crows-section of the phase filter pattern has a multi level step shape.

According to an eleventh aspect of the present invention, in the tenth aspect, the height of each step of the phase filter pattern is set to be a value so that the phase difference of light transmitting through between a part with a pattern and a part without a pattern at each step becomes about $2\pi$ for the first wavelength.

According to a twelfth aspect of the present invention, in the ninth aspect, the first multi layered dielectric film is formed only within the circular region having the first diameter, and the second multi layered dielectric film is armed only outside the circular region having the first diameter.

According to a thirteenth aspect of the present invention, in the twelfth aspect, the first multi layered dielectric film transmits almost all the light having the first wavelength and almost all the light having the second wavelength, and the second multi layered dielectric film transmits almost all the light having the first wavelength and reflects almost all the light having the second wavelength.

According to a fourteenth aspect of the present invention, in the twelfth aspect, the phase difference of the light having the first wavelength transmitting through between the first multi layered dielectric film and the second multi layered dielectric film is adjusted to be about integer times the value of $2\pi$.

According to a fifteenth aspect of the present invention, in the sixth aspect, each of the first and second multi layered dielectric films has a structure in which a high refractive index layer and a low refractive index layer are layered alternately.

According to a sixteenth aspect of the present invention, in the fifteenth aspect, the thickness of each layer of the first multi layered dielectric film is different from the thickness of each layer of the second multi layered dielectric film.

According to a seventeenth aspect of the present invention, in the sixth aspect, the phase filter pattern is formed on a first glass substrate, and the first and second multi layered dielectric film are formed on a second glass substrate.

According to an eighteenth aspect of the present invention, in the seventeenth aspect, a surface, where the phase filter pattern was not formed, of the first glass substrate, and a surface, where the first and second multi layered dielectric films were not formed, of the second glass substrate, are adhered by an adhesive.

According to a nineteenth aspect of the present invention, in the seventeenth aspect, the phase filter pattern is formed by being unified with the first glass substrate by glass forming, or by using a plastic for the first glass substrate instead of glass, and the phase filter pattern is formed by being unified with a plastic substrate by plastic molding.

According to a twentieth aspect of the present intention, in the sixth aspect, the phase filter pattern and/or the first and second multi layered dielectric films are formed on the objective lens.

According to a twenty-first aspect of the present invention, in the first aspect, the optical head device further provides a third light source for emitting a light having a third wavelength. And further an additional optical system is formed by that a light emitted form the third light source is transmitted to a third optical recording medium containing a third substrate having a third thickness through the wavelength selective filter and the objective lens, a light reflected from the third optical recording medium is transmitted to the photo detector through the objective lens and the wavelength selective filter. And recording and reproducing information is executed for the third optical recording medium by using the light having the third wavelength, and the magnification of the objective lens for the light having the third wavelength is different from the magnification of the objective lens for the light having the first wavelength.

According to a twenty-second aspect of the present invention, in the twenty-first aspect, the first wavelength is shorter than the second wavelength, and the second wavelength is shorter than the third wavelength.

According to a twenty-third aspect of the present invention, in the twenty-first aspect, the first thickness of the first substrate is thinner than the second thickness of the second substrate, and the second thickness of the second substrate is thinner than the third thickness of the third substrate.

According to a twenty-fourth aspect of the present invention, in the twenty first aspect, the objective lens has a spherical aberration that cancels a spherical aberration generated at the time when the light having the first wavelength, inputted to the objective lens as a collimated light, transmits through the first substrate having the first thickness.

According to a twenty-fifth aspect of the present invention, in the twenty-first aspect, the light emitted from the first light source is inputted to the objective lens as an almost collimated light so that the magnification of the objective lens for the light having the first wavelength becomes about 0, the light emitted from the second light source is inputted to the objective lens as a diverged light so that the magnification of the objective lens for the light having the second wavelength becomes a first designated value, and the light emitted from the third light source is inputted to the objective lens as a diverged light so that the magnification of the objective lens for the light having the third wavelength becomes a second designated value.

According to a twenty-sixth aspect-of the present invention, in the twenty-first aspect, the wavelength selective filter provides a phase filter pattern having concentric circle shape, and first, second, and third multi layered dielectric films.

According to a twenty-seventh aspect of the present invention, in the twenty-sixth aspect, the phase filter pattern hardly changes the phase distribution for the light having the first wavelength, and changes the phase distribution for the light having the second wavelength and the third wavelength.

According to a twenty-eighth aspect of the present invention, in the twenty-sixth aspect, the phase filter pattern is designed so that the change of the phase distribution or the light having the second wavelength deceases a spherical aberration at the magnification of the first designated value of the objective lens.

According to a twenty-ninth aspect of the present invention, in the twenty-sixth aspect, the phase filter pattern is formed only within a circular region having a first diameter that is smaller than the effective diameter of the objective lens.

According to a thirtieth aspect of the present invention, in the twenty-sixth aspect, the cross-section of the phase filter pattern has a multi level step shape.

According to a thirty-first aspect of the present invention, in the thirtieth aspect, the height of each step of the phase filter pattern is set to be a value so that the phase difference of light transmitting through between a part with a pattern and a, part without a pattern at each step becomes about $2\pi$ for the first wavelength.

According to a thirty-second aspect of the present invention, in the twenty-ninth aspect, the first multi layered dielectric film is formed only within a circular region having a second diameter which is smaller to than the first diameter, the second multi layered dielectric film is formed only outside the circular region having the second diameter and also within the circular region having the first diameter, and the third multi layered dielectric film is formed only outside the circular region having the first diameter.

According to a thirty-third aspect of the present invention, in the thirty-second aspect, the first multi layered dielectric film transmits almost all the light having the first wavelength, almost all the light having the second wavelength, and almost all the light having the third wavelength, the second multi layered dielectric film transmits almost all the light having the first wavelength and almost all the light having the second wavelength, and reflects almost all the light having the third wavelength, and the third multi layered dielectric film transmits almost all the light having the first wavelength, and reflects Almost all the light having the second wavelength and almost all the light having the third wavelength.

According to a thirty-fourth aspect of the present invention, in the thirty-second aspect, the phase difference of the light having the first wavelength transmitting through between the first multi layered dielectric film and the second multi layered dielectric film is adjusted to be about integer times the value of $2\pi$, the phase difference of the light having the first wavelength transmitting through between the second multi layered dielectric film and the third multi layered dielectric is adjusted to be about integer times the value of $2\pi$, and the phase difference of the light having the second wavelength transmitting through between the first multi layered dielectric film and the second multi layered dielectric film is adjusted to be about integer times the value of $2\pi$.

According to a thirty-fifth aspect of the present invention, in the twenty-sixth aspect, each of the first, second, and third multi layered dielectric films has a structure in which a high refractive index layer and a low refractive index layer are layered alternately.

According to a thirty-sixth aspect of the present invention, in the thirty-fifth aspect, the thickness of each layer and the number of layers of the first multi layered dielectric film are different from the thickness of each layer and the number of layers of the second multi layered dielectric film, and the thinness of each layer of the second multi layered dielectric film is different from the thickness of each layer of the third multi layered dielectric film.

According to a thirty-seventh aspect of the present invention, in the twenty-sixth aspect, the phase filter pattern is formed on a first glass substrate, and the first, second, and third multi layered dielectric films are formed on a second glass substrate.

According to a thirty-eighth aspect of the present invention, in the thirty-seventh aspect, a surface, where the phase filter pattern was not formed, of the first glass substrate, and a surface, where the first, second, and third multi layered dielectric films were not formed, of the second glass substrate, are adhered by an adhesive.

According to a thirty-ninth aspect of the present invention, in the thirty-seventh aspect, the phase filter pattern is formed by being unified with the first glass substrate by glass forming, or by using a plastic for the first glass substrate instead of gas, and the phase filter pattern is formed by being unified with a plastic substrate by plastic molding.

According to a fortieth aspect of the present invention, in the twenty-sixth aspect, the phase filter pattern, and/or the first, second, and third multi layered dielectric films are formed on the objective lens.

According to a forty-first aspect of the present invention, there is provided an optical head device. The optical head device provides a first light source for emitting a light having a first wavelength, a second light source for emitting a light having a second wavelength, a photo detector, an aperture controlling element, and an objective lens. And an optical system is armed by that a light emitted form the first light source is transmitted to a first optical recording medium containing a first substrate having a first thickness through the aperture controlling element and the objective lens, a light emitted form the second light source is transmitted to a second optical recording medium containing a second substrate having a second thickness through the aperture controlling element and the objective lens, a light refracted from the first optical recording medium is transmitted to the photo detector though the objective lens and the aperture controlling element, and a light reflected from the second optical recording medium is transmitted to the photo detector through the objective lens and the aperture controlling element. And recording and reproducing information is executed for the first optical recording medium by using the light having the first wavelength, and recording and reproducing information is executed for the second optical recording medium by using the light having the second wavelength. And the magnification of the objective lens for the light having the first wavelength is different from the magnification of the objective lens for the light having the second wavelength. And the optical head device further provides a first spherical aberration correcting element disposed between the objective lens and the first light source or the second light source. And the first spherical aberration correcting element changes the phase distribution so that a spherical aberration remaining for the light having the first wavelength or the light having the second wavelength at corresponding the magnification of the objective lens is corrected.

According to a forty-second aspect of the present invention, in the forty-first aspect, the first wavelength is shorter than the second wavelength.

According to a forty-third aspect of the present invention, in the forty-first aspect, the first thickness of the first substrate is thinner than the second thickness of the second substrate.

According to a forty-fourth aspect of the present invention, in the forty-first aspects the objective lens has a spherical aberration that cancels a spherical aberration generated at the time when the light having the first wavelength, inputted to the objective lens as a collimated light, transmits through the first substrate having the first thickness.

According to a forty-fifth aspect of the present invention, in the forty-first aspect, the light emitted from the first light source is inputted to the objective lens as an almost collimated light so that the magnification of the objective lens for the light having the first wavelength becomes about 0, and the light emitted from the second light source is inputted to the objective lens as a diverged light so that the magnification of the objective lens for the light having the second wavelength becomes a first designated value.

According to a forty-sixth aspect of the present invention, in the forty-first aspect, the aperture controlling element provides first and second multi layered dielectric films.

According to a forty-seventh aspect of the present invention, in the forty-sixth aspect, the first multi layered dielectric film is formed only within a circular region having a first diameter that is smaller than the effective diameter of the objective lens, and the second multi layered dielectric film is formed only outside the circular region having the first diameter.

According to a forty-eighth aspect of the present invention, in the forty-seventh aspect, the first multi layered dielectric film transmits almost all the light having the first wavelength and almost all the light having the second wavelength, and the second multi layered dielectric film transmits almost all the light having the first wavelength and reflects almost all the light having the second wavelength.

According to a forty-ninth aspect of the present invention, in the forty-eighth aspect, the phase difference of the light having the first wavelength transmitting through between the first multi layered dielectric film and the second multi layered dielectric film is adjusted to be about integer times the value of $2\pi$.

According to a fiftieth aspect of the present invention, in the forty-sixth aspect, each of the first and second multi layered dielectric films has a structure in which a high refractive index layer and a low refractive index layer are layered alternately.

According to a first aspect of the present invention, in the forty-sixth aspect, the first and second multi layered dielectric films are formed on a glass substrate.

According to a fifty-second aspect of the present invention, in the forty-sixth aspect, the first and second multi layered dielectric films are formed on the objective lens.

According to a fifty-third aspect of the present invention, in the forty-first aspect, the first spherical aberration correcting element is disposed between the aperture controlling element and the second light source, and changes the phase distribution for the light having the second wavelength.

According to a fifty-fourth aspect of the present invention, in the fifty-third aspect, the first spherical aberration correcting element is designed so that the change of the phase distribution for the light having the second wavelength corrects a spherical aberration at the magnification of the first designated value of the objective lens.

According to a fifty-fifth aspect of the present invention, in the fifty-third aspect, one of surfaces of the first spherical aberration correcting element is a plane and the other of the surfaces is an aspherical surface.

According to a fifty-sixth aspect of the present invention, in the fifty-third aspect, the first spherical aberration correcting element is unified with a first lens.

According to a fifty-seventh aspect of be present invention, in the forty-first aspect, a coma aberration caused by that the center of the objective lens deviates from the center of the first spherical aberration correcting element is corrected by inclosing the objective lens in the radial direction of the second optical recording medium.

According to a fifty-eighth aspect of the present invention, in the forty-first aspect, first and second relay lenses are disposed between the first and second light sources and the aperture controlling element.

According to a fifty-ninth aspect of the present invention, in the fifty-eighth aspect, a spherical aberration caused by the deviation of the first thickness of the first substrate of the first optical recording medium is corrected by moving one of the first and second relay lenses in the optical axis direction.

According to a sixtieth aspect of the present invention, in the fifty-eighth aspect, a coma aberration caused by that the center of the objective lens deviates from the center of the first spherical aberration correcting element is corrected by inclining or moving one of the first and second relay lenses in the radial direction of the second optical recording medium.

According to a sixty-first aspect of the present invention, in the sixtieth aspect, one of the first and second relay lenses is designed not to satisfy the sine condition.

According to a sixty-second aspect of the present invention, in the forty-first aspect, the optical head device further provides a third light source for emitting a light having a third wavelength. And further an additional optical system is formed by that a light emitted form the third light source is transmitted to a third optical recording medium containing a third substrate having a third thickness through the aperture controlling element and the objective lens, and a light reflected from the third optical recording medium is transmitted to the photo detector through the objective lens and the aperture controlling element. And recording and reproducing information is executed for the third optical recording medium by using the light having the third wavelength. And the magnification of the objective lens for the light having the third wavelength is different from the magnification of the objective lens for the light having the first wavelength. And optical head device further provides a second spherical aberration correcting element disposed between the aperture controlling element and the first light source or the third light source. And the second spherical aberration correcting element changes the phase distribution so that a spherical aberration remaining for the light having the first wavelength or the light having the third wavelength at corresponding the magnification of the objective lens is corrected.

According to a sixty-third aspect of the present invention, in the sixty-second aspect, the first wavelength is shorter than the second wavelength, and the second wavelength is shorter than the third wavelength.

According to a sixty-fourth aspect of the present invention, in the sixty-second aspect, the first thickness of the first substrate is thinner than the second thickness of the second substrate, and the second thickness of the second substrate is thinner than the third thickness of the third substrate.

According to a sixty-fifth, aspect of the present invention, in the sixty-second aspect, the objective lens has a spherical aberration that cancels a spherical aberration generated at the time when the light having the first wavelength inputted to the objective lens as a collimated light, transmits through the first substrate having the first thickness.

According to a sixty-sixth aspect of the present invention, in the sixty-second aspect, the light emitted from the first light source is inputted to the objective lens as an almost collimated light so that the magnification of the objective lens for the light having the first wavelength becomes about 0, the light emitted from the second light source is inputted to the objective lens as a diverged light so that the magnification of the objective lens for the light having the second wavelength becomes a first designated value, and the light emitted from the third light source is inputted to the objective lens as a diverged light so that the magnification of the objective lens of the light having the third wavelength becomes a second designated value.

According to a sixty-seventh aspect of the present invention, in the sixty-second aspect, the aperture controlling element provides first, second, and third multi layered dielectric films.

According to a sixty-eighth aspect of the present invention, in the sixty-seventh aspect, the first multi layered dielectric film is formed only within a circular region having a second diameter which is smaller than a first diameter being smaller than the effective diameter of the objective lens) the second multi layered dielectric film is formed only outside the circular region having the second diameter and also within the circular region having the first diameter, and the third multi layered dielectric film is formed only outside the circular region having the first diameter.

According to a sixty-ninth aspect of the present invention, in the sixty-seventh aspect, the first multi layered dielectric film transmits almost all the light having the first wavelength, almost all the light having the second wavelength, and almost all the light having the third wavelength, the second multi layered dielectric film transmits almost all the light having the first wavelength and almost all the light having the second wavelength, and reflects almost all the light having the third wavelength, and the third multi layered dielectric film transmits almost all the light having the first wavelength, and reflects almost all the light having the second wavelength and almost all the light having the third wavelength.

According to a seventieth aspect of the present invention, in the sixty-seventh aspect, the phase difference of the light having the first wavelength transmitting through between the first multi layered dielectric film and the second multi layered dielectric film is adjusted to be about integer times the value of $2\pi$, the phase difference of the light having the first wavelength transmitting through between the second multi layered dielectric film and the third multi layered dielectric film is adjusted to be about integer times the value of $2\pi$, and the phase difference of the light having the second wavelength transmitting through between the first multi layered dielectric ally and the second multi layered dielectric film is adjusted to be about integer times the value of $2\pi$.

According to a seventy-first aspect of the present invention, in the sixty-seventh aspect, each of the first, second, and third multi layered dielectric films has a structure in which a high refractive index layer and a low refractive index layer are layered alternately.

According to a seventy-second aspect of the present invention, in the sixty-seventh aspect, the first, second, and third multi layered dielectric film are formed on a glass substrate.

According to a seventy-third aspect of the present invention, in the sixty-seventh aspect, the first, second, and third multi layered dielectric films are formed on the objective lens.

According to a seventy-fourth aspect of the present invention, in the sixty sixth aspect, the first spherical aberration correcting element is disposed between the aperture controlling element and the second light source, and changes the phase distribution for the light having the second wavelength, and the second spherical aberration correcting element is disposed between, the aperture controlling element and the third light source, and changes the phase distribution for the light having the third wavelength.

According to a seventy-fifth aspect of the present invention, in the seventy-fourth aspect, the first spherical aberration correcting element is designed so that the change of the phase distribution for the light having the second wavelength corrects a spherical aberration at the magnification of the first designated value of the objective tens, and the second spherical aberration correcting element is designed so that the change of the phase distribution for the light having the third wavelength corrects a spherical aberration at the magnification of the second designated value of the objective lens.

According to a seventy-sixth aspect of the present invention, in the seventy-fourth aspect, one of surfaces of the first and second spherical aberration correcting elements is a plane and the other of the surfaces is an aspherical surface.

According to a seventy-seventh aspect of the present invention, in the seventy-fourth aspect, the first spherical aberration correcting element is unified with a first lens, and the second spherical aberration correcting element is unified with a second lens.

According to a seventy-eighth aspect of the present invention, in the sixty-second aspect, a coma aberration caused by that the center of the objective lens deviates from the center of the first spherical aberration correcting element is corrected by inclining the objective lens in the radial direction of the second optical recording medium, and a coma aberration caused by that the center of the objective lens deviates from the center of the second spherical aberration correcting element is corrected by inclining the objective lens in the radial direction of the third optical recording medium.

According to a seventy-ninth aspect of the present invention, in the sixty-second aspect, first and second relay lenses are disposed between the first, second, and third light sources and the aperture controlling element.

According to an eightieth aspect of the present invention, in the seventy-ninth aspect, a spherical aberration caused by the deviation of the first thickness of the first substrate of the first optical recording medium is corrected by moving one of the first and second relay lenses in the optical axis direction.

According to an eighty-first aspect of the present invention, in the seventy-ninth aspect, a coma aberration caused by that the center of the objective lens deviates from the center of the first spherical aberration correcting element is corrected by inclining or moving one of the first and second relay lenses in the radial direction of the second optical recording medium, and a coma aberration caused by that the center of the objective lens deviates from the center of the second spherical aberration correcting element is corrected by in lining or moving one of the first and second relay lenses in the radial direction of the third optical recording medium.

According to an eighty-second aspect of the present invention, in the eighty-first aspect, one of the first and second relay lenses is designed not to satisfy the sine condition.

According to an eighty-third aspect of the present invention, there is provided an optical recording and reproducing apparatus. The optical recording and reproducing apparatus provides an optical head device claimed in the claims 1 to 20 or claims 41 to 61, a recording and reproducing circuit, which generates input signals to light sources based on recording signals to optical recording media and also generates reproducing signals from the optical recording media based on output signals from a photo detector, a switching circuit, which switches transmission routes of the input signals to one of the transmission routes, and a controlling circuit, which controls the operation of the switching circuit corresponding to the kinds of optical recording media.

According to an eighty-fourth aspect of the present invention, in the eighty-third aspect, the recording and reproducing circuit provides a first recording and reproducing circuit, which generates a first input signal to a first light source based on a recording signal to a first optical recording medium and also generates a reproducing signal from the first optical recording medium based on an output signal from a photo detector, and a second recording and reproducing circuit, which generates a second input signal to a second light source based on a recording signal to a second optical recording medium and also generates a reproducing signal from the second optical recording medium based on an output signal from a photo detector. And the switching circuit switches the transmission routes to one of the transmission routes which are a transmission route of the first input signal from the first recording and reproducing circuit to the first light source and a transmission route of the second input signal from the second recording and reproducing circuit to the second light source, and the controlling circuit controls the operation of the switching circuit so that the first input signal is transmitted from the first recording and reproducing circuit to the first light source when the first optical recording medium was inserted, and the second input signal is transmitted from the second recording and reproducing circuit to the second light source when the second optical recording medium was inserted.

According to an eighty-fifth aspect of the present invention, in the eighty-third aspect, the recording and reproducing circuit is a single recording and reproducing circuit, the single recording and reproducing circuit generates first and second input signals to first and second light sources based on recording signals to first and second optical recording media respectively, and also generates reproducing signals from the first and second optical recording media based on output signals from a photo detector, the switching circuit switches the transmission routes to one of the transmission routes which are a transmission route of the first input signal from the single recording and reproducing circuit to the first light source and a transmission route of the second input signal from the single recording and reproducing circuit to the second light source, and the controlling circuit controls the operation of the switching circuit so that the first input signal is transmitted from the single recording and reproducing circuit to the first light source when the first optical recording medium was inserted, and the second input signal is transmitted from the angle recording and reproducing circuit to the second light source when the second optical recording medium was inserted.

According to an eighty-sixth aspect of the present invention, there is provided au optical recording and reproducing apparatus. The optical recording and reproducing apparatus provides an optical head device claimed in the claims 21 to 40 or claims 62 to 82, a recording and reproducing circuit, which generates input signals to light sources based on recording signals to optical recording media and also generates reproducing signals from the optical recording media based on output signals from a photo detector, a switching circuit, which switches transmission routes of the input signals to one of the transmission routes, and a controlling circuit, which controls the operation of the switching circuit corresponding to the kinds of optical recording media.

According to an eighty-seventh aspect of the present invention, in the eighty-sixth aspect, the recording and reproducing circuit provides a first recording and reproducing circuit, which generates a first input signal to a first light source based on a recording signal to a first optical recording medium and also generates a reproducing signal from the first optical recording medium based on an output signal from a photo detector, a second recording and reproducing circuit, which generates a second input signal to a second light source based on a recording signal to a second optical recording medium and also generates a reproducing signal from the second optical recording medium based on at output signal from a photo detector, and a third recording and reproducing circuit, which generates a third input signal to a third light source based on a recording signal to a third optical recording medium and also generates a reproducing signal from the third optical recording medium based on an output signal from a photo detector. And the switching circuit switches the transmission routes to one of the transmission routes which are a transmission route of the first input signal from the first recording and reproducing circuit to the first light source, a transmission route of the second input signal from the second recording and reproducing circuit to the second light source, and a transmission route of the third input signal from the third recording and reproducing circuit to the third light source, the controlling circuit controls the operation of the switching circuit so that the first input signal is transmitted from the first recording and reproducing circuit to the first light source when the first optical recording medium was inserted, and the second input signal is transmitted from the second recording and reproducing circuit to the second light source when the second optical recording medium was inserted, and the third input signal is transmitted from the third recording and reproducing circuit to the third light source when the third optical recording medium was inserted.

According to an eighty-eighth aspect of the present invention, in the eighty-sixth aspect, the recording and reproducing circuit is a single recording and reproducing circuit, the single recording and reproducing circuit generates first, second, and third input signal to first, second, and third light sources based on recording signals to first, second, and third optical recording media respectively, and also generates reproducing signals from the first, second, and third optical recording media based on output signals from a photo detector, the switching circuit switches the transmission routes to one of the transmission routes which are a transmission route of the first input signal from the single recording and reproducing circuit to the first light source, a transmission route of the second input signal from the single recording and reproducing circuit to the second light source, and a transmission route of the third input signal from the single recording and reproducing circuit to the third light source, and the controlling circuit controls the operation of the switching circuit so that the first input signal is transmitted from the single recording and reproducing circuit to the fast light source when the first optical recording medium was inserted, and the second input signal is transmitted from the single recording and reproducing circuit to the second light source when the second optical recording medium was inserted, and the third input signal is transmitted from the single recording aid reproducing circuit to the third light source when the third optical recording medium was inserted.

BRIEF DESCRIPTION OF THE DRAWINGS

The objects and features of the present invention will become more apparent from the consideration of the following detailed description taken in conjunction with the accompanying drawings in which:

FIG. 2 is a diagram showing a wavelength selective filter shown in FIG. 1;

FIG. 4 is a diagram showing an aperture controlling element shown in FIG. 3;

FIG. 5 is a table showing a designed result of a phase filter pattern when the phase filter pattern of a first conventional optical head device was used at the interchangeability between a next generation standard and the conventional DVD standard;

FIG. 6 is a graph showing a calculated result of the wavefront aberration for the light having wavelength of 650 nm when the first conventional optical bead device was used at the interchangeability between the next generation standard and the conventional DVD standard;

FIG. 9 is a diagram showing a wavelength selective filter shown in FIG. 8;

FIG. 11A is a diagram showing a structure of the other optics shown in FIG. 8;

FIG. 11B is a diagram showing a structure of a photo detector in the other optics shown in FIG. 11A;

FIG. 12 is a table showing a designed result of a phase filter pattern in the wavelength selective filter shown in FIG. 8;

FIG. 13 is a graph showing a calculated result of the wavefront aberration for the light having wavelength of 650 nm at the first embodiment of the optical head device of the present invention;

FIG. 15 is a block diagram showing a structure of a second embodiment of the optical head device of the present invention;

FIG. 16 is a diagram showing a wavelength selective filter shown in FIG. 15;

FIG. 18 is a graph showing a calculated result of the wavefront aberration for the light having wavelength of 780 nm at the second embodiment of the optical head device of the present invention;

FIG. 20 is a diagram showing an aperture controlling element shown in FIG. 19;

FIG. 22 is a block diagram showing a structure of a fourth embodiment of the optical head device of the present invention;

FIG. 23 is a diagram showing an aperture controlling element shown in FIG. 22;

FIG. 25 is a block diagram showing a structure of a fifth embodiment of tile optical head device of the present invention;

DESCRIPTION OF THE PREFERRED EMBODIMENTS

Figure 1:
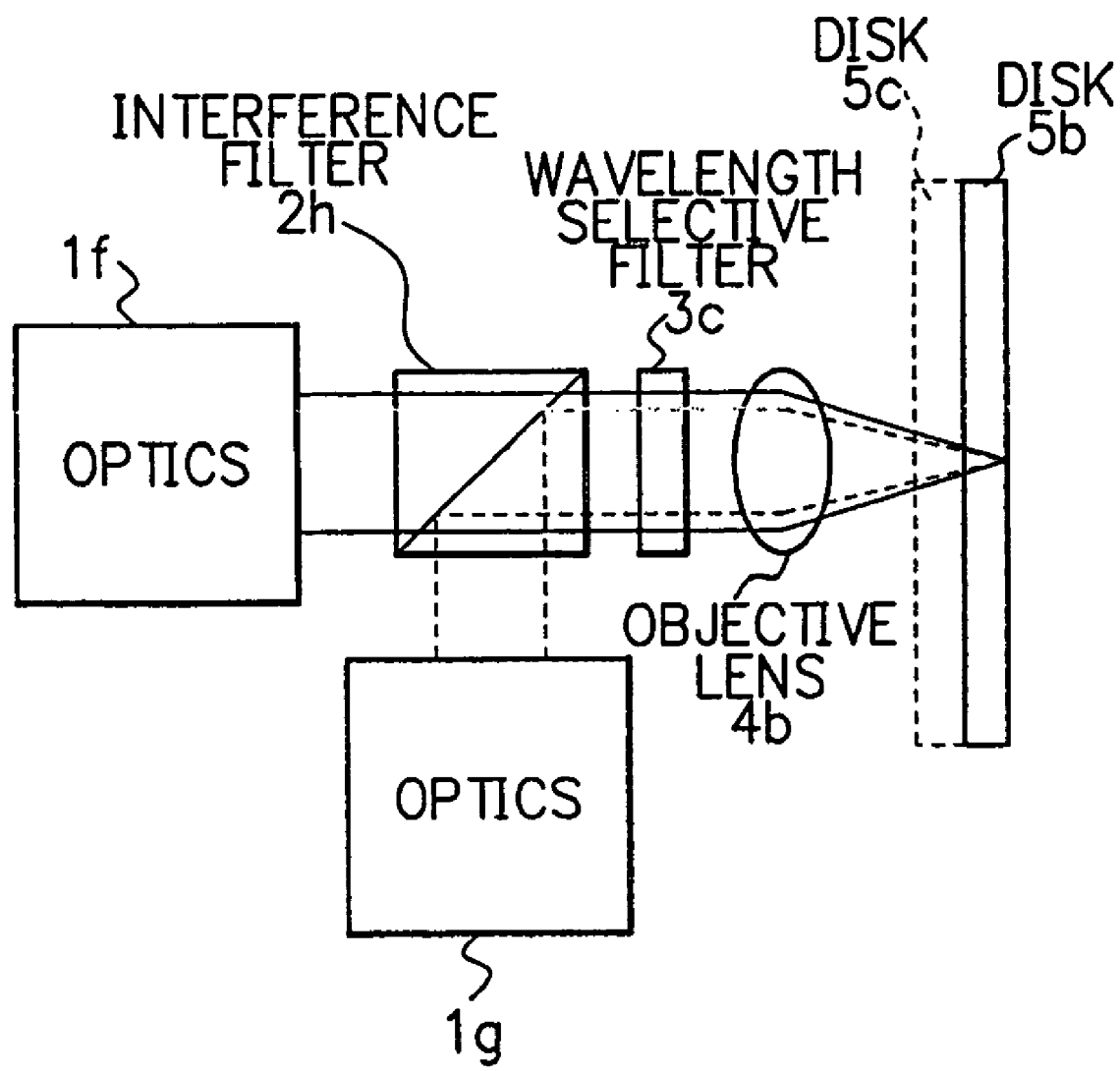
FIG. 1 is a block diagram showing a structure of an optical head device at Japanese Patent Application Laid-Open No. 10-334504.
Figure 3:
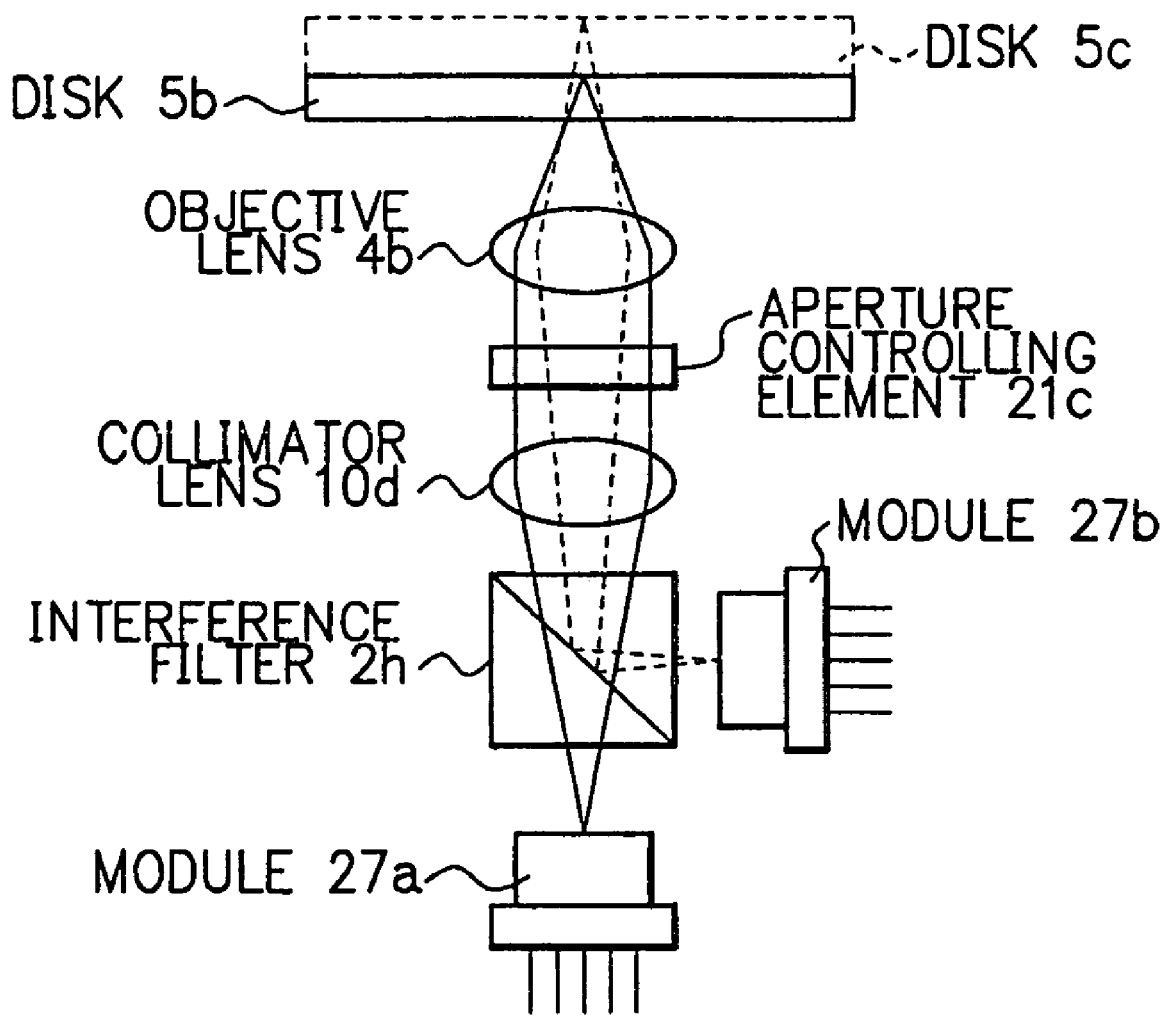
FIG. 3 is a block diagram showing a structure of an optical head device at Japanese Patent Application Laid-Open No. HEI 9-274780.
Figure 7:
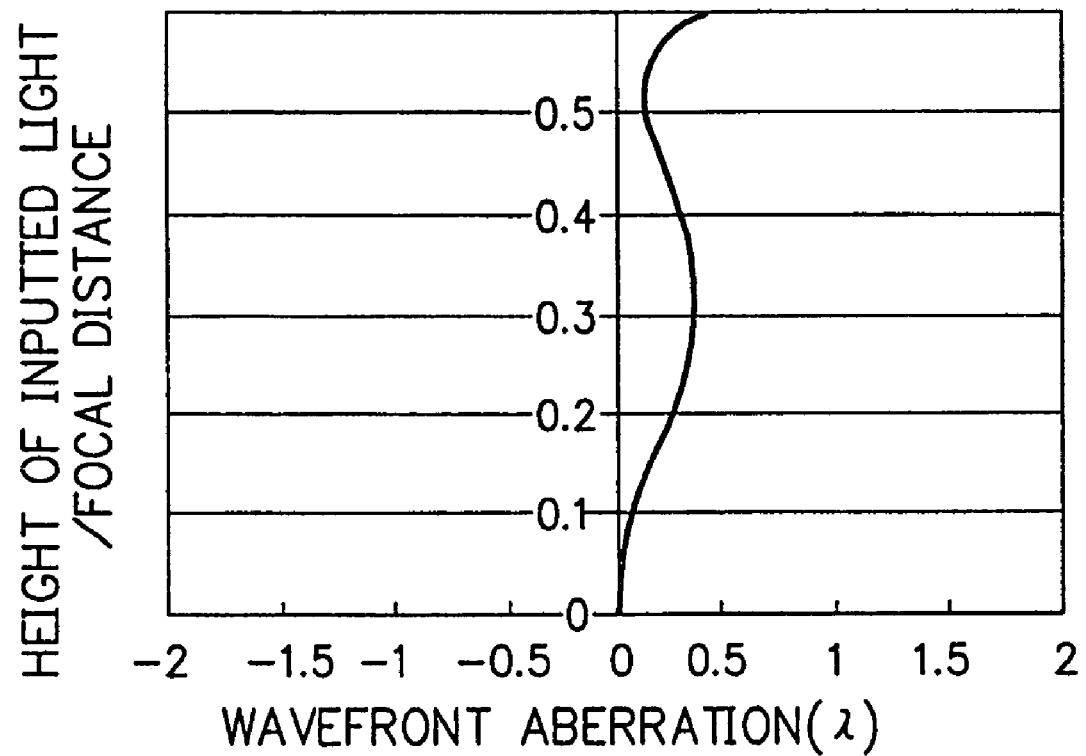
FIG. 7 is a graph showing a calculated result of the wavefront aberration or the light having wavelength of 650 nm when a second conventional optical head device was used at the interchangeability between the next generation standard and the conventional DVD standard.

Referring now to the drawings, embodiments of the present invention are explained in detail. First, a first embodiment of an optical head device of the present invention is explained.

Figure 8:
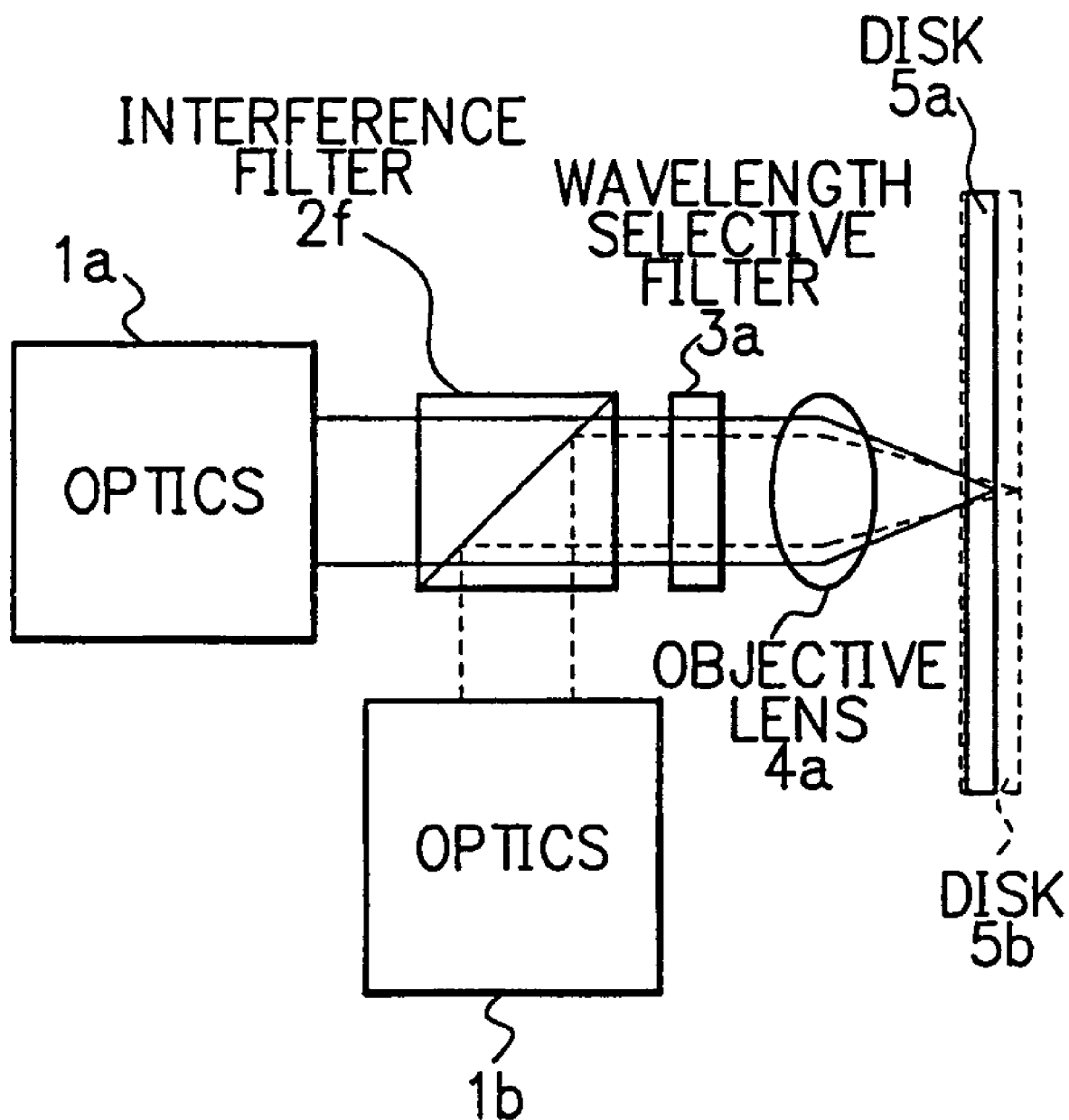
FIG. 8 is a block diagram showing a structure of a first embodiment of an optical head device of the present invention.

FIG. 8 is a block diagram showing a structure of the first embodiment of the optical head device of the present invention.

In FIG. 8, each of optics 1a and 1b provides a semiconductor laser and a photo detector that receives a light reflected from one of disks. The wavelength of the semiconductor laser in the optics 1a is 405 nm, and the wavelength of the semiconductor laser in the optics 1b is 650 nm.

An interference filter 2f works to transmit a light having wavelength of 405 nm and reflect a light having wavelength of 650 nm. A light emitted from the semiconductor laser in the optics 1a transmits the interference filter 2f and a wavelength selective filter 3a. And the transmitted light is inputted to an objective lens 4a as a collimated light and is focused on a disk 5a, whose thickness is 0.1 mm, of a next generation standard. A light reflected from the disk 5a transmits the objective lens 4a, the wavelength selective filter 3a, and the interference filter 2f in the inverse direction, and the photo detector in the optics 1a receives the transmitted light.

A light emitted from the semiconductor laser in the optics 1b is reflected at the interference filter 2f and the reflected light transmits the wavelength selective filter 3a. And the transmitted light is inputted to the objective lens 4a as a diverged light, and is focused on a disk 5b, whose thickness is 0.6 mm, of the DVD standard. A light reflected from the disk 5b transmits the objective lens 4a, the wavelength selective filter 3a in the inverse direction, and is reflected at the interference filter 2f, and the photo detector in the optics 1b receives the transmitted light.

The objective lens 4a has a spherical aberration, which cancels a spherical aberration generated at the time when the light, whose wavelength is 405 nm, transmits through the disk 5a whose thickness is 0.1 mm. The light having wavelength of 405 nm is inputted to the objective lens 4a as the collimated light, therefore, the magnification of the objective lens 4a for the light having wavelength of 405 nm is 0.

At the time when the light having wavelength of 650 nm, inputted to the objective lens 4a as the collimated light, transmits through the disk 5b having thickness of 0.6 mm, a spherical aberration remains. When the light having wavelength of 650 nm is inputted to the objective lens 4a as the diverged light, a new spherical aberration, corresponding to the change of the magnification of the objective lens 4a, is generated, and this new spherical aberration works to decrease the remaining spherical aberration The magnification of the objective lens 4a for the light having wavelength of 650 nm is set to be 0.076.

In this, when an angle, between a paraxial ray, which goes from an object point to a designated height a "r" of the objective lens 4a, and the optical as of the objective lens 4a, is defined as $\theta o$, and an angle, between a paraxial ray, which goes from the designated height "r" of the objective lens 4a to an image point, and the optical axis of the objective lens 4a, is defined as $\theta i$, the magnification of the objective lens 4a is given as $\tan \theta o / \tan \theta i$.

When the length from the object point to the principal point of the object side of the objective lens 4a, is defined as $lo$, and the length, from the principal point of the image side of the objective lens 4a to the image point, is defined as $li$, the $\tan \theta o = r/lo$, and the $\tan \theta i = r/li$. The light having wavelength of 405 nm is inputted to the objective lens 4a as the collimated light, therefore, the $\theta o = 0$, and the $lo = \infty$, and the magnification of the objective lens 4a becomes 0. The light having wavelength of 650 nm is inputted to the objective lens 4a as the diverged light, therefore, the $\theta o \neq 0$, and the $lo$ is finite. At this time, the value of the lo, that is, the position of the object point, is decided so that the magnification of the objective lens 4a becomes 0.076.

FIG. 9 is a diagram showing the wavelength selective filter 3a shown in FIG. 8. In FIG. 9(*a*), the plane view of the wavelength selective filter 3a, looking from the upper side, is shown, in FIG. 9(*b*), the plane view of the wavelength selective filter 3a, looking from the bottom side, is shown, and in FIG. 9(*c*), the sectional view of the wavelength selective filter 3a is shown. As shown in FIG. 9, in the wavelength selective filter 3a, a phase filter pattern 6a having concentric circle shapes is formed on a glass substrate 8a. And multi layered dielectric films 7a and 7b are formed on a glass substrate 8b. The wavelength selective filter 3a has a structure in which a surface, where the phase filter pattern 6a was not formed, of the glass substrate 8a, and a surface, where the multi layered dielectric films 7a and 7b were not formed, of the glass substrate 8b, are adhered by an adhesive.

When the effective diameter of the objective lens 4a, shown as a dotted line in FIGS. 9(*a*) and 9(*b*), is defined as 2a, the phase filter pattern 6a is formed only within a circular region having the diameter 2b, which is smaller than the diameter 2a of the objective lens 4a. As shown in FIG. 9 (*c*), the cross-section of the phase filter pattern 6a has a four level stop shape. The height of each step of the phase filter pattern 6a is set to be a value so that the phase difference of light transmitting between a part with a pattern and a part without a pattern at each step becomes $2\pi$ (equivalent to 0) for the wavelength 405 nm. At this time, this phase difference becomes $1.25\pi$ (equivalent to $-0.75\pi$) for the wavelength 650 nm.

Therefore, the phase filter pattern 6a does not change the phase distribution for the light having wavelength of 405 nm, and changes the phase distribution for the light having wavelength of 650 nm. In case that the wavelength selective filter 3a is not used, a spherical aberration, which remains at the time when the light having wavelength of 650 nm inputted to the objective lens 4a as a collimated light, was transmitted through the substrate having thickness of 0.6 mm, is decreased, by Betting the magnification of the objective lens 4a to be 0.076. The phase filter pattern 6a is designed to further decrease the decreased spherical aberration at the magnification being 0.076 of the objective lens 4a by the change of the phase distribution for the light having wavelength of 650 nm.

The multi layered dielectric film is formed at only the region within the circle of the diameter 2b, and the multi layered dielectric film 7b is formed at only the region outside the circle of the diameter 2b. The multi layered dielectric film 7a transmits all of the light having wavelength of 405 nm and all of the light having wavelength of 650 nm. And the multi layered dielectric film 7b transmits all of the light having wavelength of 405 nm and reflects all of the light having wavelength of 650 nm.

The phase difference between the light transmitting through the multi layered dielectric film 7a and the light transmitting through the multi layered dielectric film 7b is adjusted to be integer times the value of $2\pi$ for the light having wavelength of 405 nm. That is, at the wavelength selective filter 3a, the light having wavelength of 405 nm is all transmitted, and the light having wavelength of 650 nm is all transmitted within the region of the circle of the diameter 2b and is all reflected outside the region of the circle of the diameter 2b. Therefore, when the focal distance of the objective lens 4a is decided as "fa", the effective numerical aperture for the light having wavelength of 405 nm is given as "a/fa", and the effective numerical aperture for the light having wavelength of 650 nm is given as "b/fa". For example, it is set to be that the "a/fa"=0.7, and the "b/fa"=0.6.

Figure 10A:
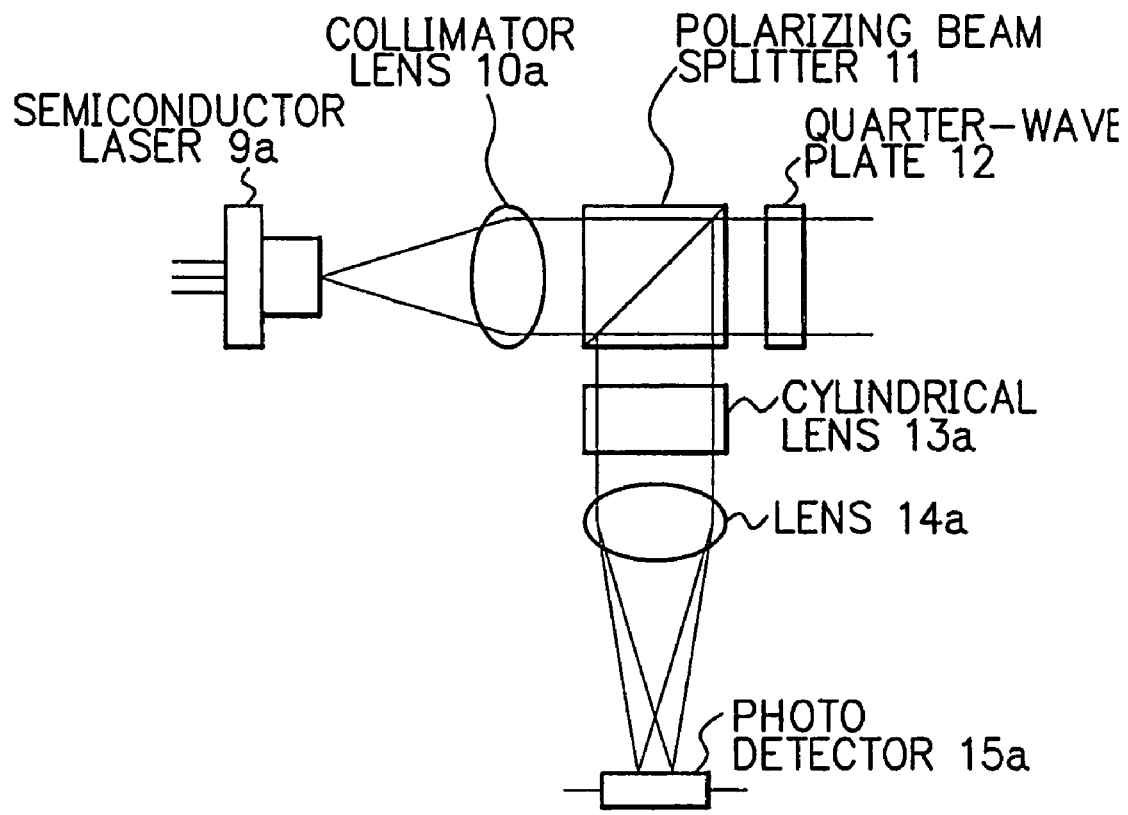
FIG. 10A is a block diagram showing a structure of an optics shown in FIG. 8.

FIG. 10A is a block diagram showing a structure of the optics 1a shown in FIG. 8. And FIG. 10B is a diagram showing a structure of a photo detector in the optics 1a shown in FIG. 10A.

As shown in FIG. 10A, a light having wavelength of 405 nm emitted from a semiconductor laser 9a is collimated at a collimator lens 10a. The collimated light is inputted to a polarizing beam splitter 11 as a P polarized light, and almost 100% of the P polarized light is transmitted through the polarizing beam splitter 11, and is converted from a linearly polarized light to a circularly polarized light at a quarter-wave plate 12, and is transmitted to the disk 5a.

The light reflected from the disk 5a is converted from the circularly polarized light to a linearly polarized light whose polarization direction is orthogonal for the forward direction, by transmitting through the quarter-wave plate 12. The converted light is inputted to the polarizing beam splitter 11 as an S polarized light and almost 100% of the inputted light is reflected The reflected light is received at a photo detector 15a by transmitting through a cylindrical lens 13a and a lens 14a. The photo detector 15a is &posed in the middle of the two focal lines of the cylindrical lens 13a and the lens 14a.

Figure 10B:
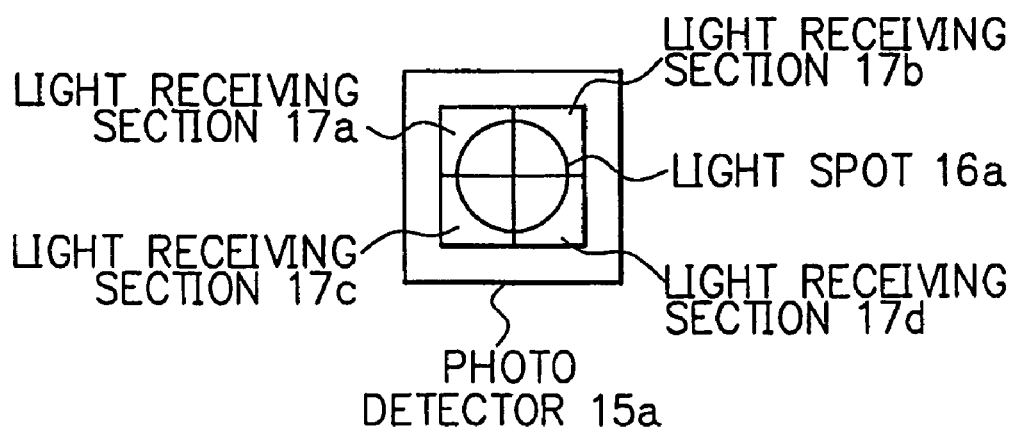
FIG. 10B is a diagram showing a structure of a photo detector in the optics shown in FIG. 10A.

As shown in FIG. 10B, at the photo detector 15a, the light reflected from the disk 5a forms a light spot 16a on light receiving sections 17a to 17d, divided into four parts. When outputs from the light receiving sections 17a to 17d are defined to be V17a to V17d respectively, the focus error signal is calculated by an equation (V17a+V17d)−(V17b+V17c), by the existing astigmatism method. The track error signal is calculated by an equation (V17a+V17b)−(V17c+V17d), by the existing push-pull method. And the RF signal from the disk 5a is calculated by an equation V17a+V17b+V17c+V17d.

FIG. 11A is a diagram showing a structure of the optics 1b shown in FIG. 8. And FIG. 11B is a diagram showing a structure of a photo detector in the optics 1b shown in FIG. 11A.

As shown in FIG. 11A, a light having wavelength of 650 nm emitted from a semiconductor laser 9b is collimated at a collimator lens 10b. About 50% of the collimated light is transmitted through a half mirror 18a, and the transmitted light is converted from the collimated light to a diverged light, by transmitting through a concave lens 19a, and is transmitted to the disk 5b.

The light reflected from the disk 5b is converted from a convergent light to a collimated light, by transmitting through the concave lens 19a. About 50% of the collimated light is reflected at the half mirror 18a and the reflected light is received at a photo detector 15b by transmitting through a cylindrical lens 13b and a lens 14b. The photo detector 15b is disposed in the middle of the two focal lines of the cylindrical lens 13b and the lens 14b.

As shown in FIG. 11B, at the photo detector 15b, the light reflected from the disk 5b forms a light spot 16b on light receiving sections 17e to 17h, divided into four part. When outputs from the light receiving sections 17e to 17h are defined to be V17e to V17h respectively, the focus error signal is calculated by an equation (V17e+V17h)−(V17f+V17g), by the existing astigmatism method The track error signal is obtained by the phase difference between (V17e+V17h) and (V17f+V17g), by the exiting differential phase detection method. And the RF signal from the disk 5b is calculated by an equation V17e+V17f+V17g+V17h.

FIG. 12 is a table showing the designed result of the phase filter pattern 6a in the wavelength selective filter 3a shown in FIG. 8. In FIG. 12, the left row shows the height of a light inputted to the objective lens divided by the focal distance of the objective lens. And the right row shows the number of steps of the phase filter pattern 6a corresponding to the left row.

FIG. 13 is a graph showing the calculated result of the wavefront aberration for the light having wavelength of 650 nm at the first embodiment of the optical head device of the present invention. In FIG. 13(a), a relation between the height of a light inputted to the objective lens 4a divided by the focal distance of the objective lens 4a and the wavefront aberration, at the best image position where the standard deviation of the wavefront aberration becomes minimum, is shown, in a case that the change of the magnification of the objective lens 4a was used and the wavelength selective filter 3a was not used. And in FIG. 13(b), a relation between the height of a light inputted to the objective lens 4a divided by the focal distance of the objective lens 4a and the wavefront aberration, at the best image position where the standard deviation of the wavefront aberration becomes minimum, is shown, in a case that the change of the magnification of the objective lens 4a was used and also the wavelength selective filter 3a was used.

As shown in FIG. 13(b), the standard deviation of the wavefront aberration is decreased to be 0.047λ, by using the change of the magnification of the objective lens 4a and further using the wavelength selective filter 3a. This value is lower than 0.07λ that is the allowable value of the standard deviation of the wavefront aberration, known as Marechel's criterion. And as shown in FIG. 12, the number of regions of concentric circle shapes, of which the phase filter pattern 6a is composed, is as few as 5, therefore the width of each region becomes wide. For example, when the focal distance of the objective lens 4a is decided to be 2.57 mm, the width of the most outside region becomes about 59.1 μm. Therefore, it is very easy to manufacture such a wavelength selective filter having a phase filter pattern whose each region is very wide mentioned above in desiring preciseness.

Each of the multi layered dielectric films 7a and 7b has a structure in which a high refractive index layer made of such a titanium dioxide and a low reactive index layer made of such as silicon dioxide are layered alternately.

Figure 14A:
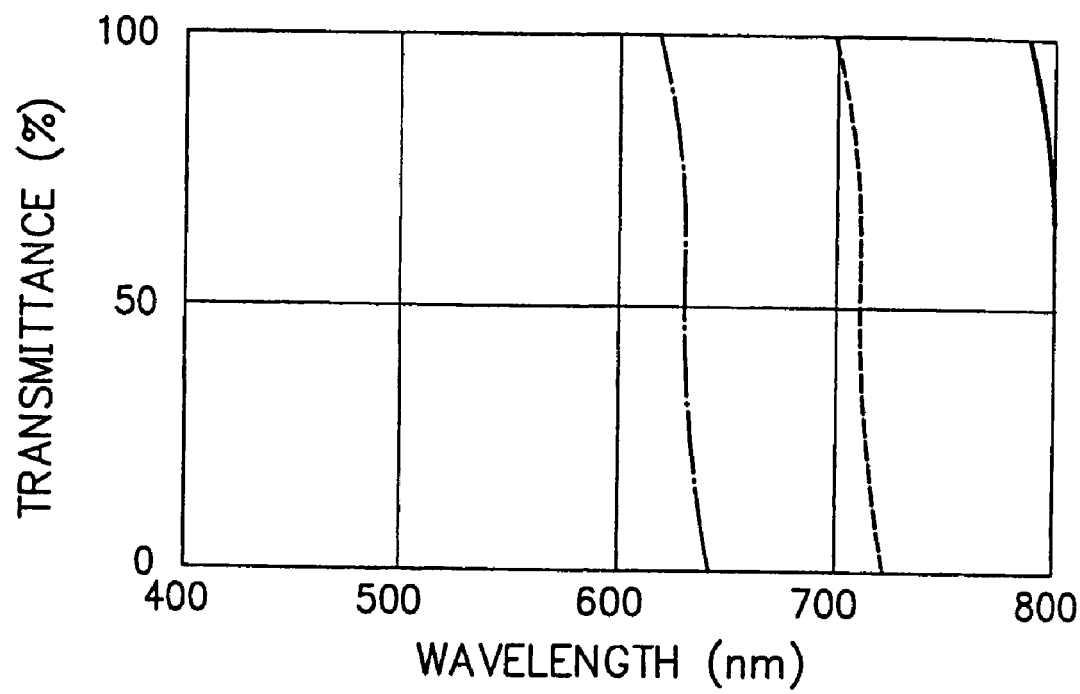
FIG. 14A is a graph showing a designed result of a wavelength dependency of the transmittance for multi layered dielectric films in the wavelength selective filter at the embodiments of the optical head device of the present invention.
Figure 14B:
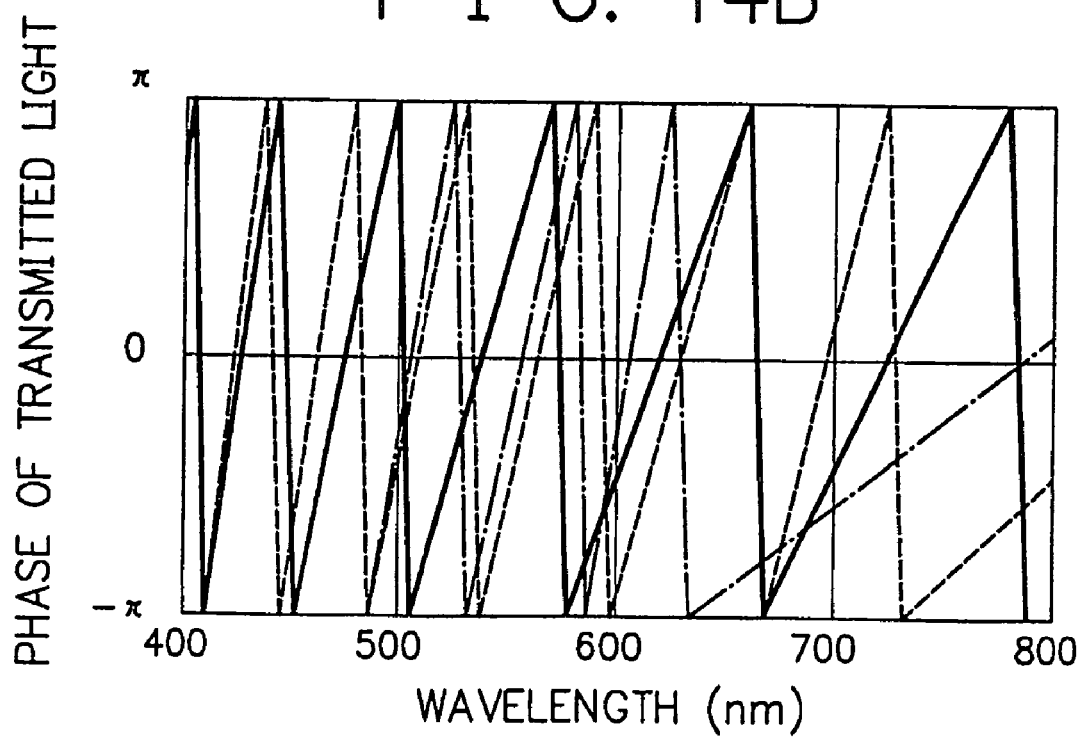
FIG. 14B is a graph showing a designed result of a wavelength dependency of the phase of transmitted light through the multi layered dielectric films in the wavelength selective filter at the embodiments of the optical head device of the present invention.

FIG. 14A is a graph showing a designed result of a wavelength dependency of the transmittance for the multi layered dielectric films in the wavelength selective filter at the embodiments of the optical head device of the present invention. FIG. 14B is a graph showing a designed result of a wavelength dependency of the phase of transmitted light through the multi layered dielectric films in the wavelength selective filter at the embodiments of the optical head device of the present invention.

At the first embodiment of the optical head device of the present invention, in FIGS. 14A and 14B, the dotted line shows the designed result of the multi layered dielectric film 7a, and the chain line shows the designed result of the multi layered dielectric film 7b, in the wavelength selective filter 3a shown in FIG. 9. As shown in FIG. 14A, it is understandable that the multi layered dielectric film 7a transmits all of the light having wavelengths of 405 nm and 650 nm. And also it is understandable that the multi layered dielectric film 7b transmits all of the light having wavelength of 405 nm and reflects all of the light having wavelength of 650 nm.

As shown in FIG. 14B, the phases of light transmitted through the multi layered dielectric films 7a and 7b are matched with each other for the wavelength of 405 nm. Therefore, it is understandable that the phase difference between the transmitted light was adjusted to integer times the value of 2π, for the wavelength of 405 nm. When the thickness of each layer of the multi layered dielectric film is made to be thicker, the curves of the wavelength dependency of the transmittance shown in FIG. 14A are shifted to the right side, and the curves of the wavelength dependency of the phase of transmitted light shown in FIG. 14B are also shifted to the right side.

And when the thickness of each layer of the multi layered dielectric film is made to be thinner the curves of the wavelength dependency of the transmittance shown in FIG. 14A are shifted to the left side, and the curves of the wavelength dependency of the phase of transmitted light shown in FIG. 14B are also shifted to the left side.

Therefore, the thickness of each layer of the multi layered dielectric film 7a can be changed within the range where the transmittances at the wavelengths 405 and 650 nm become about 100%. The thickness of each layer of the multi layered dielectric film 7b can be changed within the range where the transmittance at the wavelength 405 nm becomes about 100% and the transmittance at the wavelength 650 nm becomes about 0%. And the phases of the transmitted light through the multi layered dielectric films 7a and 7b are adjusted to match with each other at the wavelength of 405 nm.

As mentioned above, in the designing of the multi layered dielectric films, at the wavelength of 405 nm, first, the phase of the light transmitting through one of the multi layered dielectric films is made to be a reference, and then the phase of the light transmitting through the other of the multi layered dielectric films is adjusted by using the reference. Therefore, this adjustment can be easily realized, if there is one of the degree of freedom, being the thickness of each layer of the multi layered dielectric films.

In this, FIGS. 14A and 14B are used at the explanation of a second embodiment of the optical head device of the present invention. And there is a continuous line both in FIGS. 14A and 14B, this continuous line is explained later at the second embodiment of the optical head device of the present invention.

Next, referring to the drawings, the second embodiment of the optical head device of the present invention is explained.

FIG. 15 is a block diagram showing a structure at the second embodiment of the optical head device of the present invention. At the second embodiment, in case that each function at the second embodiment is almost equal to each function at the first, embodiment, the same reference number is used for the function.

In FIG. 15, each of optics 1a, 1b, and 1c provides a semiconductor laser and a photo detector that receives a light reflected from one of disks. The wavelength of the semiconductor laser in the optics 1a is 405 nm, the wavelength of the semiconductor laser in the optics 1b is 650 nm, and the wavelength of the semiconductor laser in the optics 1c is 780 nm.

An interference filter 2f works to transmit a light having wavelength of 405 nm and reflect a light having wavelength of 650 nm An interference filter 2g works to transmit lights having wavelengths of 405 nm and 650 nm, and reflect a light having wavelength of 780 nm. A light emitted from the semiconductor laser in the optics 1a transmits the interference filter 2f, the interference filter 2g, and a wavelength selective filter 3b. And the transmitted light is inputted to an objective lens 4a as a collimated light, and is focused on a disk 5a, whose thickness is 0.1 mm, of a next generation standard.

A light reflected from the disk 5a transmits the objective lens 4a, the wavelength selective filter 3b, the interference filter 2g, and the interference filter 2f in the inverse direction, and the photo detector in the optics 1a receives the transmitted light.

A light emitted from the semiconductor laser in the optics 1b is reflected at the interference filter 2f and is transmitted through the interference filter 2g and the wavelength selective filter 3b. And the transmitted light is inputted to the objective lens 4a as a diverged light, and is focused on a disk 5b, whose thickness is 0.6 mm, of the DVD standard. A light-reflected from the disk 5b transmits the objective lens 4a, the wavelength selective filter 3b, and the interference filter 2g, in the inverse direction, and is reflected at the interference filter 2f, and the photo detector in the optics 1b receives the transmitted light.

A light emitted from the semiconductor laser in the optics 1c is reflected at the interference filter 2g and is transmitted through the wavelength selective filter 3b. And the transmitted light is inputted to the objective lens 4a as a diverged light, and is focused on a disk 5c, whose thickness is 1.2 mm, of the CD standard. A light reflected from the disk 5c transmits the objective lens 4a and the wavelength selective filter 3b, in the inverse direction, and is reflected at the interference filter 2g, and the photo detector in the optics 1c receives the transmitted light.

The objective lens 4a has a spherical aberration, which cancels a spherical aberration generated at the time when the light having wavelength of 405 nm, inputted to the objective lens 4a as the collimated light, was transmitted through the disk 5a having thickness of 0.1 mm.

The light having wavelength of 405 nm is inputted to the objective lens 4a as the collimated light, therefore, the magnification of the objective lens 4a for the light having wavelength of 405 nm is 0. However, at the time when the light having wavelength of 650 nm, inputted to the objective lens 4a as the collimated light, transmits through the disk 5b having thickness of 0.6 mm, a spherical aberration remains. And when the light having wavelength of 650 nm is inputted to the objective lens 4a as the diverged light, a new spherical aberration, corresponding to the change of the magnification of the objective lens 4a, is generated, and this new spherical aberration works to decrease the remaining spherical aberration. The magnification of the objective lens 4a for the light having wavelength of 650 nm is set to be 0.076.

And at the time when the light having wavelength of 780 nm, inputted to the objective lens 4a as the collimated light, transmits the disk 5c having thickness of 1.2 mm, a spherical aberration remains. And when the light having wavelength of 780 nm is inputted to the objective lens 4a as the diverged light, a new spherical aberration, corresponding to the change of the magnification of the objective lens 4a, is generated, and this flew spherical aberration works to decrease the remaining spherical aberration. The magnification of the objective lens 4a for the light having wavelength of 780 nm is set to be 0.096.

In this, when an angle, between a paraxial ray, which goes from an object point to a designated height "r" of the objective lens 4a, and the optical axis of the objective lens 4a, is defined as $\theta o$, and an angle, between a paraxial ray, which goes from the designated height "r" of the objective lens 4a to an image point, and the optical axis of the objective lens 4a, is defined as $\theta i$, the magnification of the objective lens 4a is given as $\tan \theta o / \tan \theta i$.

When the length, from the object point to the principal point of the object side of the objective lens 4a, is defined as lo, and the length from the principal point of the image side of the objective lens 4a to the image point, is defined as li, the $\tan \theta o = r/lo$, and the $\tan \theta i = r/li$. The light having wavelength of 405 nm is inputted to the objective lens 4a as the collimated light, therefore, the $\theta o = 0$, and the $lo = \infty$, and the magnification of the objective lens 4a becomes 0.

The light having wavelength of 650 nm is inputted to the objective lens 4a as the diverged light therefore, the $\theta o \neq 0$, and the lo is finite. At this time, the value of the lo, that is, the position of the object point, is decided so that the magnification of the objective lens 4a becomes 0.076. The light having wavelength of 780 nm is inputted to the objective lens 4a as the diverged light, therefore, the $\theta o \neq 0$, and the lo is finite. At this time, the value of the lo, that is, the position of the object point, is decided so that the magnification of the objective lens 4a becomes 0.096.

FIG. 16 is a diagram showing the wavelength selective filter 3b shown in FIG. 15. In FIG. 16(a), the plane view of the wavelength selective filter 3b, looking from the upper side, is shown, in FIG. 16(b), the plane view of the wavelength selective filter 3b, looking from the bottom side, is shown, and in FIG. 16(c), the sectional view of the wavelength selective filter 3b is shown. As shown in FIG. 16, in the wavelength selective filter 3b, a phase filter pattern 6a having concentric circle shapes is formed on a glass substrate 8a. And multi layered dielectric films 7c, 7d, and 7e are formed on a glass substrate 8b. The wavelength selective filter 3b has a structure in which a surface, where the phase filter pattern 6a, was not formed, of the glass substrate 8a, and a surface, where the multi layered dielectric films 7c, 7d, and 7e were not formed, of the glass substrate 8b, are adhered by an adhesive.

When the effective diameter of the objective lens 4a, shown as a dotted line in FIGS. 16(a) and 16(b), is defined as 2a, the phase filter pattern 6a is formed only within a circular region having the diameter 2b, which is smaller them the effective diameter 2a of the objective lens 4a. As shown in FIG. 16(c), the cross-section of the phase filter pattern 8a has a four level step shape. The height of each step of the phase filter pattern 6a i set to be a value so that the phase difference of light transmitting between a part with a pattern and a part without a pattern at each step become $2\pi$ (equivalent to 0) for the wavelength 405 nm. At this time, the phase difference becomes $1.25\pi$ (equivalent to $-0.75\pi$) for the wavelength 650 nm, and the phase difference becomes $1.04\pi$ (equivalent to $-0.96\pi$) for the wavelength 780 nm.

Therefore, the phase filter pattern 6a does not change the phase distribution for the light having wavelength of 405 nm, and change the phase distribution for the light having wavelength of 650 nm and 780 nm. In case that the wavelength selective filter 3b is not used, a spherical aberration, which remains at the time when the light having wavelength of 650 nm, inputted to the objective lens 4a as a collimated light, was transmitted through the substrate having thickness of 0.6 mm, is decreased, by setting the magnification of the objective lens 4a to be 0.076. The phase filter pattern 6a is designed to further decrease the decreased spherical aberration at the magnification being 0.076 of the objective lens 4a by the charge of the phase distribution for the light having wavelength of 650 nm.

The multi layered dielectric film 7c is formed at only within the circular region having the diameter 2c, which is smaller than the diameter 2b. The multi layered dielectric film 7d is formed at only the region outside the circle of the diameter 2c and inside the circle of the diameter 2b. The multi layered dielectric film 7e is formed at only the region outside the circle of the diameter 2b. The multi layered dielectric film 7c works to transmit all of the light having wavelengths of 405 nm, 650 nm, and 780 am. The multi layered dielectric film 7d works to transmit all of the light having wavelengths of 405 nm and 650 nm, and reflect all of the light having wavelength of 780 nm. And the multi layered dielectric film 7e works to transmit all of the light having wavelength of 405 mm, and reflect all of the light having wavelengths of 650 nm and 780 nm.

The phase difference between the light transmitting through the multi layered dielectric film 7c and the light transmitting through the multi layered dielectric film 7d is adjusted to be integer times the value of $2\pi$ or the light having wavelength of 405 nm. And also the phase difference between the light transmitting through the multi layered dielectric film 7d and the light transmitting through the multi layered dielectric film 7e i adjusted to be integer times the value of $2\pi$ for the light having wavelength of 405 nm. And the phase difference between the light transmitting through the multi layered dielectric film 7c and the light transmitting through the multi layered dielectric film 7d is adjusted to be integer times the value of $2\pi$ for the light having wavelength of 650 nm. That is, at the wavelength selective filter 3b, the light having wavelength of 405 nm is all transmitted, and the light having wavelength of 650 nm is all transmitted within the region of the circle of the diameter 2b and is all reflected outside the region of the circle of the diameter 2b. And the light having wavelength of 780 nm is all transmitted within the region of the circle of the diameter 2c and is all reflected outside the region of the circle of the diameter 2c.

Therefore, when the focal distance of the objective lens 4a is decided as "fa", the effective numerical aperture for the light having wavelength of 405 nm is given as "a/fa", the effective numerical aperture for the light having wavelength of 650 nm is given as "b/fa", and the effective numerical aperture for the light having wavelength of 780 nm is given as "c/fa". For example, it is set to be that the "a/fa"=0.7, the a "b/fa"=0.6, and the "c/fa"=0.45.

The structure of the optics 1a is shown in FIG. 10A, and the structure of the photo detector in the optics 1a is shown in FIG. 10B. And the structure of the optics 1b is shown in FIG. 11A, and the structure of the photo detector in the optics 1b is shown in FIG. 11B. That is, the optics 1a and 1b, used at the optical head device of the first embodiment, are also used at the second embodiment.

Figure 17A:
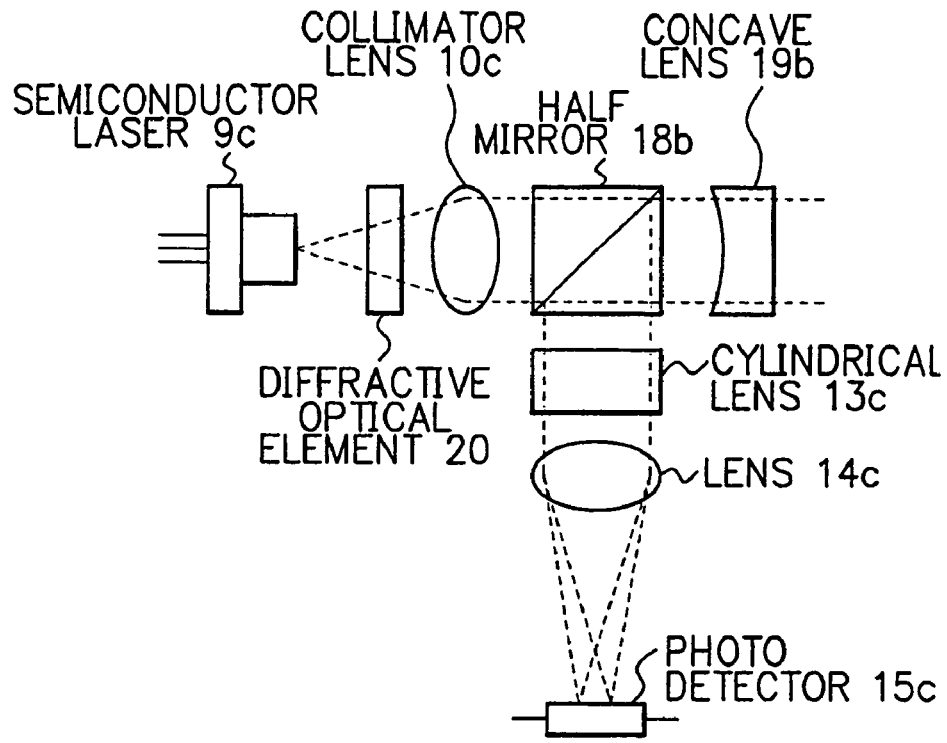
FIG. 17A is a block diagram showing a structure of an optics shown in FIG. 15.

FIG. 17A is a block diagram showing a structure of the optics 1c shown in FIG. 15. And FIG. 17B is a diagram showing a structure of a photo detector in the optics 1c shown in FIG. 17A.

As shown in FIG. 17A, a light having wavelength of 780 nm emitted from a semiconductor laser 9c is divided into three lights being 0 th order light and ±first order diffracted lights at a diffractive optical element 20. The three divided lights become three collimated lights at a collimator lens 10c. About 50% of the three collimated lights is transmitted through a half mirror 18b, and is converted into three diverged lights by transmitting through a concave lens 19b, and is transmitted to the disk 5c. Three lights reflected from the disk 5c are converted from three convergent lights into three collimated lights by transmitting through the concave lens 19b, and about 50% of the collimated lights is reflected at the half mirror 18b. The reflected lights are transmitted through a cylindrical lens 13c and a lens 14c, and a photo detector 15c receives the transmitted lights. The photo detector 15c is disposed in the middle of the two focal lines of the cylindrical lens 13c and the lens 14c.

Figure 17B:
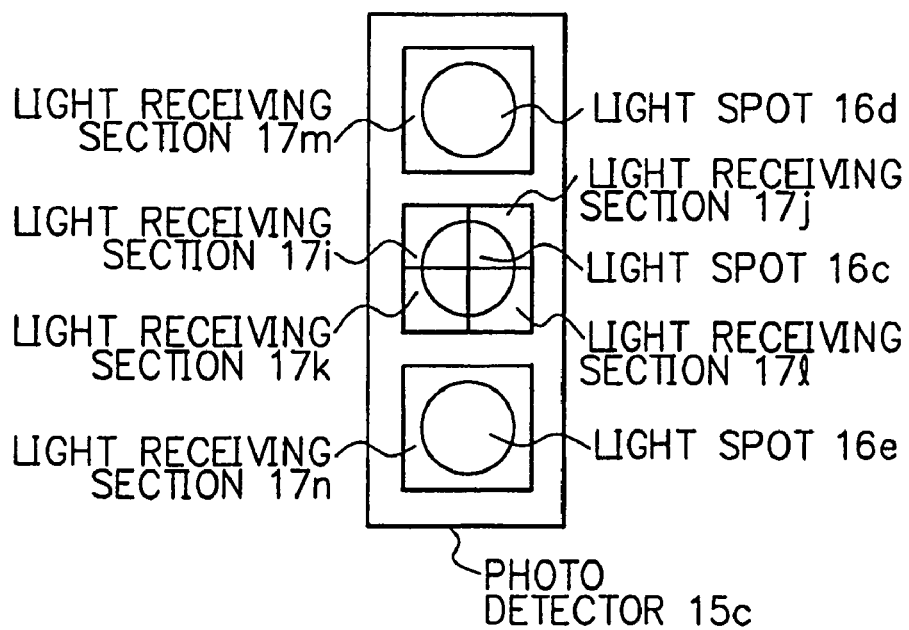
FIG. 17B is a diagram showing a structure of a photo detector in the optics shown in FIG. 17A.

As shown in FIG. 17B, at the photo detector 15c, the 0 th order light from the diffractive optical element 20 in the three reflected lights from the disk 5c forms a light spot 16c on light receiving sections 17i to 17l, divided into four parts. The +first order diffracted light from the diffractive optical element 20 forms a light spot 16d on a light receiving section 17m. The −first order diffracted light from the diffractive optical element 20 forms a light spot 16e on a light receiving section 17n.

When outputs from the light receiving sections 17i to 17n are defined to be V17i to V17n respectively, the focus error signal is calculated by an equation (17i+V17l)−(V17j+V17k), by the existing astigmatism method. The track error signal is calculated by an equation V17m−V17n, by an existing three beam method. And the RF signal from the disk 5c is calculated by an equation V17i+V17j+V17k+V17l.

The designed result of the phase filter pattern 6a in the wavelength selective filter 3b is shown in FIG. 12. And the calculated result of the wavefront aberration, at the best image position where the standard deviation of the wavefront aberration becomes minimum for the is light having wavelength of 650 nm, is shown in FIG. 13. These are the same at the first embodiment.

FIG. 18 is a graph showing the calculated result of the wavefront aberration for the light having wavelength of 780 nm at the second embodiment of the optical head device of the present invention. In FIG. 18(a), a relation between the height of a light-inputted to the objective lens divided by the focal distance of the objective lens and the wavefront aberration, at the best image position where the standard deviation of the wavefront aberration becomes minimum is shown, in a case that the change of the magnification of the objective lens 4a was used but the wavelength selective filter 3b was not used. And in FIG. 18(b), a relation between the height of a light inputted to the objective lens divided by the focal distance of the objective lens and the wavefront aberration, at the best image position where the standard deviation of the wavefront aberration becomes minimum, is shown, in a case that the chant of the magnification of the objective lens 4a was used and further the wavelength selective filter 9b was used.

As shown in FIG. 18(b), the standard deviation of the wavefront aberration is decreased to be 0.021λ, by using the change of the magnification of the objective lens 4a and farther using the wavelength selective filter 3b. This value is lower than 0.07λ that is the allowable value of the standard deviation of the wavefront aberration, known as Marechel's criterion And as shown in FIG. 12, the number of region of concentric circle shapes, of which the phase filter pattern 6a is composed, is a few as 5, therefore the width of each region becomes wide. For example, when the focal distance of the objective lens 4a is decided to be 2.57 mm, the width of the most outside region becomes about 59.1 μm. Therefore, it is very easy to manufacture the wavelength selective filter 3b having the phase filter pattern 6a whose each region is very wide mentioned above in desiring preciseness.

Each of the multi layered dielectric films 7c, 7d, and 7e has a structure in which a high refractive index layer made of such as titanium dioxide and a low refractive index layer made of such as silicon dioxide are layered alternately. As used at the explanation of the first embodiment, by using FIGS. 14A and 14B, the multi layered dielectric films 7c, 7d, and 7e are explained.

At the second embodiment of the optical head device of the present invention, in FIGS. 14A and 14B, the continuous line shown the designed result of the multi layered dielectric film 7c, the dotted line shows the designed result of the multi layered dielectric film 7d, and the chain line shows the designed result of the multi layered dielectric film 7e, in the wavelength selective filter 3b shown in FIG. 16.

As shown in FIG. 14A, it is understandable that the multi layered dielectric film 7c transmits all of the light having wavelengths of 405 nm, 650 nm, and 780 nm. And also it is understandable that the multi layered dielectric film 7d transmits all of the light having wavelengths of 405 nm and 650 nm, and reflects all of the light having wavelength of 780 nm. Further it is understandable that the multi layered dielectric film 7e transmits all of the light having wavelength of 405 nm, and reflects all of the light having wavelengths of 650 nm and 780 nm.

As shown in FIG. 14B, the phases of light transmitted through the multi layered dielectric films 7c, 7d, and 7e are matched with one another for the wavelength of 405 nm, therefore it is understandable that the phase difference among the transmitted light was adjusted to integer times the value of $2\pi$. And also the phases of light transmitted through the multi layered dielectric films 7c, and 7d are matched with each other for the wavelength of 650 nm. Therefore it is understandable that the phase difference between the transmitted light was adjusted to integer times the value of $2\pi$.

When the thickness of each layer of the multi layered dielectric film is made to be thicker, the curves of the wavelength dependency of the transmittance shown in FIG. 14A are shifted to the right side, and the curves of the wavelength dependency of the phase of transmitted light shown in FIG. 14B are also shifted to the right side.

And when the thickness of each layer of the multi layered dielectric film is made to be thinner, the curves of the wavelength dependency of the transmittance shown in FIG. 14A are shifted to the left side, and the curves of the wavelength dependency of the phase of transmitted light shown in FIG. 14B are also shifted to the left side.

And when the number of layers of the multi layered dielectric film is increased, the inclination of the curves of the wavelength dependency of the transmittance shown in FIG. 14A and the inclination of the curves of the wavelength dependency of the phase of transmitted light shown in FIG. 14B are both become steep. On the contrary, when the number of layers of the multi layered dielectric film is decreased, the inclination of the curves of the wavelength dependency of the transmittance shown in FIG. 14A and the inclination of the curves of the wavelength dependency of the phase of transmitted light shown in FIG. 14B are both become gentle.

Therefore, the thickness of each layer and the number of layers of the multi layered dielectric film 7c are made to change within the range where the transmittances at the wavelengths 405, 650 nm, and 780 nm become about 100%. The thickness of each layer and the number of layers of the multi layered dielectric film 7d are made to change within the range where the transmittances at the wavelengths 405 nm and 650 nm become about 100% and the transmittance at the wavelength 780 nm becomes about 0%. The thickness of each layer and the number of layers of the multi layered dielectric film 7e are made to change within the range where the transmittance at the wavelength 405 nm becomes about 100% and the transmittances at the wavelengths 650 nm and 780 nm become about 0%. And the phases of the transmitted light through the multi layered dielectric films 7c, 7d, and 7e are adjusted to match with one another at the wavelength of 405 nm. And the phases of the transmitted light through the multi layered dielectric films 7c and 7d are adjusted to match with each other at the wavelength of 650 nm.

As mentioned above, in the designing of the multi layered dielectric films, at the wavelength of 405 nm, first, the phase of the light transmitting through one of the multi layered dielectric films is made to be a reference, and then the phases of the light transmitting through the remaining two multi layered dielectric films are adjusted by using the reference. Therefore, this adjustment can be easily realized, if there are two of the degree of freedom, being the thickness of each layer and the number of layers of the multi layered dielectric films. And at the wavelength of 650 nm, first, the phase of the light transmitting through one of the multi layered dielectric films is made to be a reference, and then the phase of the light transmitting through the remaining one multi layered dielectric film is adjusted by using the reference. Therefore, this adjustment can be easily realized, if there are one of the degree of freedom, being the thickness of each layer of the multi layered dielectric films.

At the first and second embodiments of the optical head device of the present invention shown in FIGS. 8 and 15, each of the wavelength selective filters 3a and 3b is driven in the focusing direction and the tracking direction with the objective lens 4a by an actuator (not shown). In case that only the objective lens 4a is driven in the focusing direction and the tracking direction by the actuator, the center of the objective lens 4a deviates for the center of each of the phase filter pattern 6a in the wavelength selective filters 3a and 3b in the focusing direction and the tracking direction. Consequently, an aberration is generated at a light, which is inputted to the objective lens 4a as a diverged light and receives the change of the phase distribution at the phase filter pattern 6a. However, each of the wavelength selective filters 3a and 3b is driven in the focusing direction and the tracking direction with the objective lens 4a, therefore this aberration is not generated.

At the first and second embodiments of the optical head device of the present invention, the normal line of each of the wavelength selective filters 3a and 3b slightly inclines for the optical axis of the objective lens 4a. In case that the normal line of each of the wavelength selective filters 3a and 3b is parallel to the optical am of the objective lens 4a, a stray light reflected at each of the wavelength selective filters 3a and 3b is inputted to the photo detectors 15a and 15b in the optics 1a and 1b at the first embodiment, and is inputted to the photo detectors 15a, 15b, and 15c in the optics 1a, 1b, and 1c at the second embodiment. And an offset is generated at the focus error signal and the track error signal by this stray light. However, in case that the normal line of each of the wavelength selective filters 3a and 3b slightly inclines for the optical axis of the objective lens 4a, this offset is not generated.

As shown in FIG. 9, in the wavelength selective filter 3a at the first embodiment of the optical head device of the present invention, the phase filter pattern 6a is formed on the glass substrate 8a, and the multi layered dielectric films 7a and 7b are formed on the glass substrate 8b. And as shown in FIG. 16, in the wavelength selective filter 3b at the second embodiment of the optical head device of the present invention, the phase filter pattern 6a is formed on the glass substrate 8a, and the multi layered dielectric films 7c, 7d, and 7e are formed on the glass substrate 8b. However, at the first and second embodiments of the optical head device of the present invention, the phase filter pattern 6a can be formed by being unified with the glass substrate 8a, or by being unified with a plastic substrate by molding. Further, the phase filter pattern 6a and/or the multi layered dielectric films can be formed on the objective lens 4a.

Next, referring to the drawings, a third embodiment of the optical head device of the present invention is explained.

Figure 19:
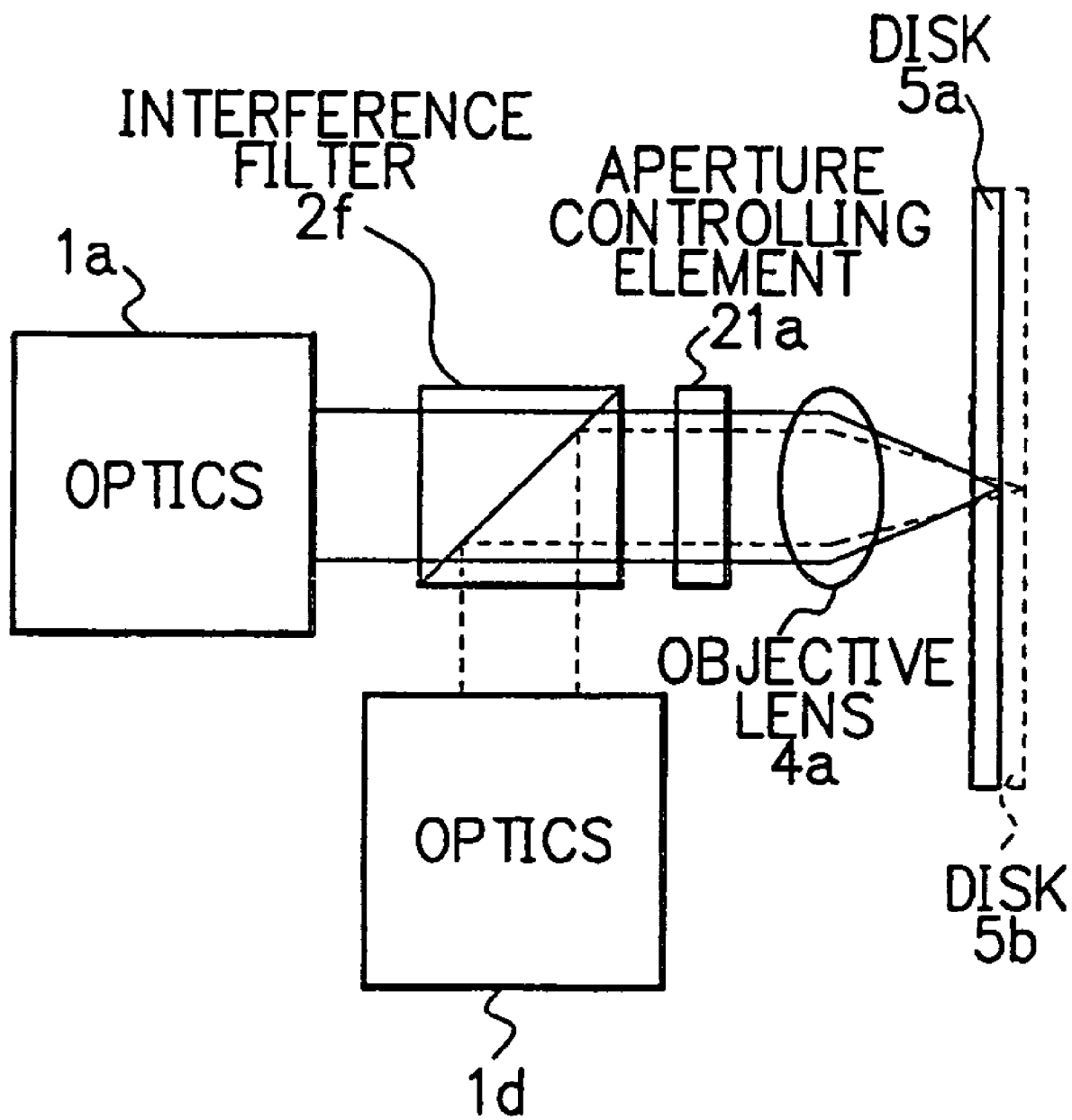
FIG. 19 is a block diagram showing a structure of a third embodiment of the optical head device of the present invention.

FIG. 19 is a block diagram showing a structure of the third embodiment of the optical head device of the present invention. At the third embodiment, in case that each function at the third embodiment is almost equal to each function at the first embodiment, the same reference number is used for the function.

In FIG. 19, each of optics 1a and 1d provides a semiconductor laser and a photo detector that receives a light reflected from one of disks. The wavelength of the semiconductor laser in the optics 1a is 405 nm, and the wavelength of the semiconductor laser in the optics 1d is 650 nm. An interference filter 2f works to transmit a light having wavelength of 405 nm and reflect a light having wavelength of 650 nm.

A light emitted from the semiconductor laser in the optics 1a transmits the interference filter 2f and an aperture controlling element 21a. And the transmitted light is inputted to an objective lens 4a as a collimated light, and is focused on a disk 5a, whose thickness is 0.1 mm, of a next generation standard. A light reflected from the disk 5a transmits the objective lens 4a, the aperture controlling element 21a, and the interference filter 2f in the inverse direction, and the photo detector in the optics 1a receives the transmitted light.

A light emitted from the semiconductor laser in the optics 1d is reflected at the interference filter 2f and is transmitted through the aperture controlling element 21a. And the transmitted light is inputted to the objective lens 4a as a diverged light, and is focused on a disk 5b, whose thickness is 0.6 mm, of the DVD standard. A light reflected from the disk 5b transmits the objective lens 4a, the aperture controlling element 21a in the inverse direction, and is reflected at the interference filter 2f and the photo detector in the optics 1d receives the transmitted light. The objective lens 4a has a spherical aberration, which cancels a spherical aberration generated at the time when the light having wavelength of 405 nm, inputted to the objective lens 4a as the collimated light, was transmitted through the disk 5a having thickness of 0.1 mm.

The light having wavelength of 405 nm is inputted to the objective lone 4a as the collimated light, therefore, the magnification of the objective lens 4a for the light having wavelength of 405 nm is 0. However, at the time when the light having wavelength of 650 nm, inputted to the objective lens 4a as the collimated light, transmits through the disk 5b having thickness of 0.6 mm, a spherical aberration remains. And when the light having wavelength of 650 nm is inputted to the objective lens 4a as the diverged light, a new spherical aberration, corresponding to the change of the magnification of the objective lens 4a, is generated, and this new spherical aberration works to decrease the remaining spherical aberration.

The magnification of the objective lens 4a for the light having wavelength of 650 nm is set to be 0.076. In this, when an angle, between a paraxial ray, which goes from an object point to a designated height a "r" of the objective lens 4a, and the optical axis of the objective lens 4a, is defined as $\theta o$, and an angle, between a paraxial ray, which goes from the designated height "r" of the objective lens 4a to an image point, and the optical axis of the objective lens 4a, is defined as $\theta i$, the magnification of the objective lens 4a s given as $\tan \theta o/\tan \theta i$. And when the length, from the object point to the principal point of the object side of the objective lens 4a, is defined as lo, and the length, from the principal point of the image side of the objective lens 4a to the image point, is defined as li, the $\tan \theta o = r/lo$, and the $\tan \theta i = r/li$.

The light having wavelength of 405 nm is inputted to the objective lens 4a as the collimated light, therefore, the $\theta o = 0$, and the $lo = \infty$, and the magnification of the objective lens 4a becomes 0. The light having wavelength of 650 nm is inputted to the objective lens 4a as the diverged light, therefore, the $\theta o \neq 0$, and the lo is finite. At this time, the value of the lo, that is, the position of the object point, is decided so that the magnification of the objective lens 4a becomes 0.076.

FIG. 20 is a diagram showing the aperture controlling element 21a shown in FIG. 19. In FIG. 20(a), the plane view of the aperture controlling element 21a is shown, and in FIG. 20(b), the sectional view of the aperture controlling element 21a is shown. As shown in FIG. 20, the aperture controlling clement 21a has a structure in which, multi layered dielectric films 7a and 7b are armed on a glass substrate 8b. When the effective diameter of the objective lens 4a, shown as a dotted line in FIG. 20(a), is defined as 2a, the multi layered dielectric film 7a is formed only the region within the circle of the diameter 2b, which is smaller than the diameter 2a of the objective lens 4a. And the multi layered dielectric film 7b is formed at only outside the circle of the diameter 2b.

The multi layered dielectric film 7a transmits all of the light having wavelength of 405 nm and all of the light having wavelength of 650 nm. And the multi layered dielectric film 7b transmits all of the light having wavelength of 405 nm and reflects al of the light having wavelength of 650 nm. And the phase difference between the light transmitting through the multi layered dielectric film 7a and the light transmitting through the multi layered dielectric film 7b is adjusted to be integer times the value of $2\pi$ for the light having wavelength of 405 nm. That is, at the aperture controlling element 21a, the light having wavelength of 405 nm is all transmitted, and the light having wavelength of 650 nm is all transmitted within the region of the circle of the diameter 2b and is all reflected outside the region of the circle of the diameter 2b. Therefore, when the focal distance of the objective lens 4a is decided as "fa", the effective numerical aperture for the light having wavelength of 405 nm is given as "a/fa", and the effective numerical aperture for the light having wavelength of 650 nm is given as "b/fa". For example, it is set to be that the "a/fa"=0.7, and the "b/fa"=06.

In this, the structure of the optics 1a is the same that used at the first embodiment shown in FIG. 10A, and the photo detector 15a in the optics 1a is also the same that used at the first embodiment shown in FIG. 10B.

Figure 21:
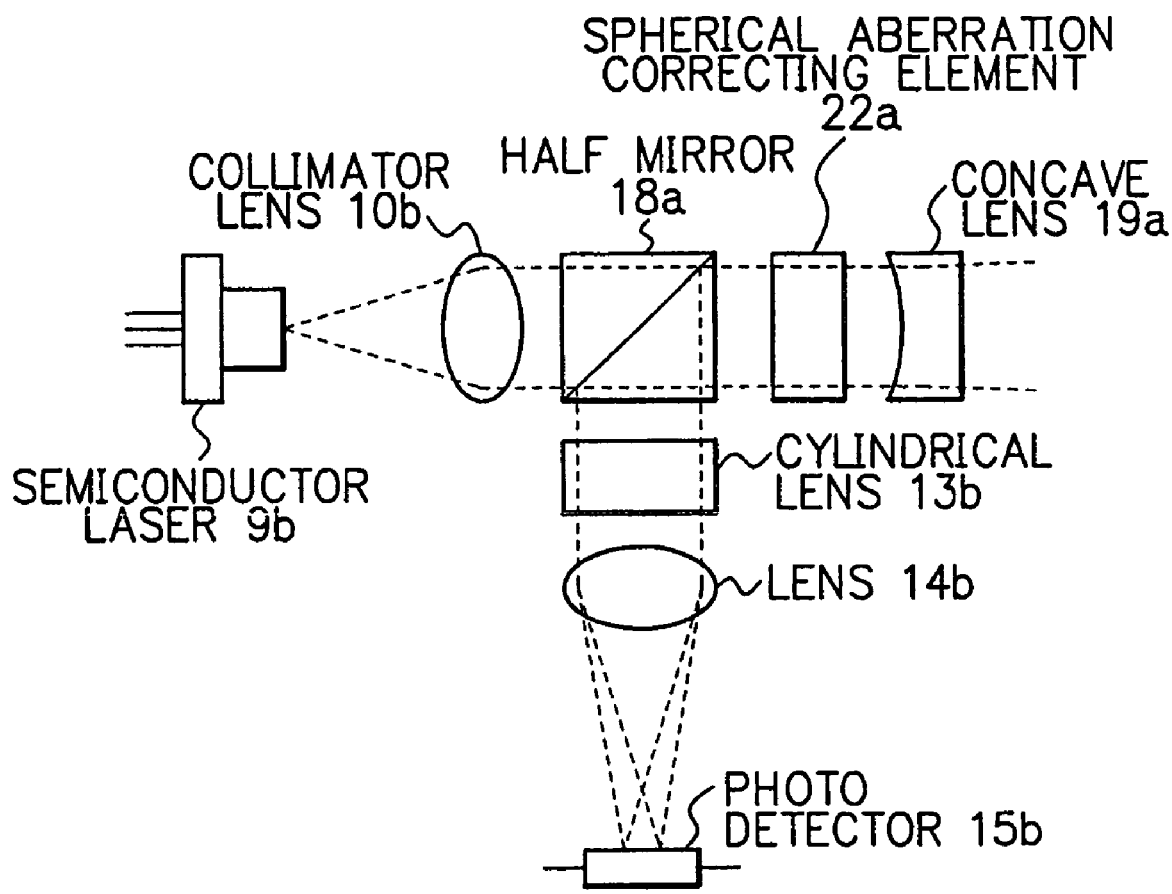
FIG. 21 is a diagram shot a structure of an optics shown in FIG. 19.

FIG. 21 is a diagram showing a structure of the optics 1d shown in FIG. 19. As shown in FIG. 21, a light having wavelength of 650 nm 1d emitted from a semiconductor laser 9b is collimated at a collimator lens 10b. About 50% of the collimated light is transmitted through a half mirror 18a, and the transmitted light is converted from the collimated light to a diverged light, by transmitting through a spherical aberration correcting element 22a and a concave lens 19a, and is transmitted to the disk 5b. The light reflected from the disk 5b is converted from a convergent light to a collimated light, by transmitting through the concave lens 19a and the spherical aberration correcting element 22a. About 50% of the collimated light is reflected at the half mirror 18a and the reflected light is received at a photo detector 15b by transmitting through a cylindrical lens 13b and a lens 14b. The photo detector 11b is disposed in the middle of the two focal lines of the cylindrical lens 13b and the lens 14b. The photo detector 15b in the optics 1d is the same that used at the first embodiment shown in FIG. 11B.

One of the surfaces of the spherical aberration correcting element 22a is a plane, and the other of the surfaces is an aspherical surface. The spherical aberration correcting element 22a changes the phase distribution for the light having wavelength of 650 nm. In case that the spherical aberration correcting element 22a is not used, a spherical aberration, which remains when the light having wavelength of 650 nm, inputted to the objective lens 4a as a collimated light, is transmitted through the disk 5b, whose thickness is 0.6 mm, is decreased, by that the magnification of the objective lens 4a is set to be 0.076. The spherical aberration correcting element 22a is designed so that the change of the phase distribution for the light having wavelength of 650 nm corrects this decreased spherical aberration at the magnification 0.076 of the objective lens 4a almost completely. In this, the spherical aberration correcting element 22a can be unified with the concave lens 19a.

Each of the multi layered dielectric films 7a and 7b in the aperture controlling element 21a has a structure in which a high refractive index layer made of such as titanium dioxide and a low refractive index layer made of such as silicon dioxide are layered alternately. The designed result of the wavelength dependency of the transmittance for each of the multi layered dielectric films 7a and 7b in the aperture controlling element 21a is the same that shown in FIG. 14A in the wavelength selective filter at the embodiments of the optical head device of the present invention. And the designed result of the wavelength dependency of the phase of transmitted light through each of the multi layered dielectric films 7a and 7b in the aperture controlling element 21a is the same that shown in FIG. 14B in the wavelength selective filter at the embodiments of the optical head device of the present invention.

Next, referring to the drawings, a fourth embodiment of the optical head device of the present invention is explained.

FIG. 22 is a block diagram showing a structure of the fourth embodiment of the optical head device of the present invention. At the fourth embodiment, in case that each function at the fourth embodiment is almost equal to each function at the second embodiment, the same reference number is used for the function.

In FIG. 22, each of optics 1a, 1d, and 1e provides a semiconductor laser and a photo detector that receives a light reflected from one of disks. The wavelength of the semiconductor laser in the optics 1a is 405 nm, the wavelength of the semiconductor laser in the optics 1d is 650 nm, and the wavelength of the semiconductor laser in the optics 1e is 780 nm. An interference filter 2f works to transmit a light having wavelength of 405 nm and reflect a light having wavelength of 650 nm. An interference filter 2g works to transmit light having wavelengths of 405 nm and 650 nm, and reflect a light having wavelength of 780 nm.

A light emitted from the semiconductor laser in the optics 1a transmits the interference filter 2f, the interference filter 2g, and an aperture controlling element 21b. And the transmitted light is inputted to an objective lens 4a as a collimated light, and is focused on a disk 5a, whose thickness is 0.1 mm, of a next generation standard. A light reflected from the disk 5a transmits the objective lens 4a, the aperture controlling element 21b, the interference filter 2g, and the interference filter 2f in the inverse direction, and the photo detector in the optics 1a receives the transmitted light.

A light emitted from the semiconductor laser in the optics 1d is reflected at the interference filter 2f and is transmitted through the interference filter 2g and the aperture controlling element 21b. And the transmitted light is inputted to the objective lens 4a as a diverged light, and is focused on a disk 5b, whose thickness is 0.6 mm, of the DVD standard. A light reflected from the disk 5b transmits the objective lens 4a, the aperture controlling element 21b, and the interference filter 2g, in the inverse direction, and is reflected at the interference filter 2f, and the photo detector in the optics 1d receives the transmitted light.

A light emitted from the semiconductor laser in the optics 1e is reflected at the interference filter 2g and is transmitted through the aperture controlling element 21b. And the transmitted light is inputted to the objective lens 4a as a diverged light, and is focused on a disk 5c, whose thickness is 1.2 mm, of the CD standard. A light reflected from the disk 5c transmits the objective lens 4a and the aperture controlling element 21b, in the inverse direction, and is reflected at the interference filter 2g, and the photo detector in the optics 1e receives the transmitted light. The objective lens 4a has a spherical aberration, which cancels a spherical aberration generated at the time when the light having wavelength of 405 nm, inputted to the objective lens 4a as the collimated light, was transmitted through the disk 5a having thickness of 0.1 mm.

The light having wavelength of 405 nm is inputted to the objective lens 4a as the collimated light, therefore, the magnification of the objective lens 4a for the light having wavelength of 405 nm is 0. However, at the time when the light having wavelength of 650 nm, inputted to the objective lens 4a as the collimated light, transmits through the disk 5b having thickness of 0.6 mm, a spherical aberration remains. And when the light having wavelength of 650 nm is inputted to the objective lens 4a as the diverged light, a new spherical aberration, corresponding to the change of the magnification of the objective lens 4a, is generated, and this new spherical aberration works to decrease the remaining spherical aberration. The magnification of the objective lens 4a for the light having wavelength of 650 nm is set to be 0.076.

And at the time when the light having wavelength of 780 nm, inputted to the objective lens 4a as the collimated light, transmits through the disk 5c having thickness of 1.2 mm, a spherical aberration remains. And when the light having wavelength of 780 nm is inputted to the objective lens 4a as the diverged light, a new spherical aberration, corresponding to the change of the magnification of the objective lens 4a, is generated, and this new spherical aberration works to decrease the remaining spherical aberration. The magnification of the objective lens 4a for the light having wavelength of 780 nm is set to be 0.096.

In this, when an angle, between a paraxial ray, which goes from an object point to a designated height "r" of the objective lens 4a, and the optical axis of the objective lens 4a, is defined as $\theta o$, and an angle, between a paraxial ray, which goes from the designated height "r" of the objective lens 4a to an image point, and the optical axis of the objective lens 4a, is defined as $\theta i$ the magnification of the objective lens 4a is given as $\tan \theta o / \tan \theta i$. And when the length, from the object point to the principal point of the object side of the objective lens 4a, is defined as lo, and the length, from the principal point of the image side of the objective lens 4a to the image point, is defined as li, the $\tan \theta o = r/lo$, and the $\tan \theta i = r/li$. The light having wavelength of 405 nm is inputted to the objective lens 4a as the collimated light, therefore, the $\theta o = 0$, and the $lo = \infty$, and the magnification of the objective lens 4a becomes 0.

The light having wavelength of 650 nm is inputted to the objective lens 4a as the diverged light, therefore, the $\theta o \neq 0$, and the lo is finite. At this me, the value of the lo, that is, the position of the object point, is decided so that the magnification of the objective lens 4a becomes 0.076. The light having wavelength of 780 nm is inputted to the objective lens 4a as the diverged light, therefore, the $\theta o \neq 0$, and the lo is finite. At this time, the value of the lo, that is, the position of the object point, is decided so that the magnification of the objective lens 4a becomes 0.096.

FIG. 23 is a diagram showing the aperture controlling element 21b shown in FIG. 22. In FIG. 23(a), the plane view of the aperture controlling element 21b is shown, in k. 23(b), the sectional view of the aperture controlling element 21b is shown. As shown in FIG. 23, the aperture controlling element 21b has a structure in which multi layered dielectric films 7c, 7d, and 7e are formed on a glass substrate 8b. When the effective diameter of the objective lens 4a, shown as a dotted line in FIG. 23(a), is defined as 2a, the multi layered dielectric film 7c is formed only within a circular region having the diameter 2c, which is smaller than the diameter 2b being smaller than the effective diameter 2a of the objective lens 4a. The multi layered dielectric film 7d is formed at only the region outside the circle of the diameter 2c and inside the circle of the diameter 2b, The multi layered dielectric film 7e is formed at only the region outside the circle of the diameter 2b.

The multi layered dielectric film 7c works to transmit all of the light having wavelengths of 405 nm, 650 nm, and 780 nm. The multi layered dielectric film 7d works to transmit all of the light having wavelengths of 405 nm and 650 nm, and reflect all of the light having wavelength of 780 nm. And the multi layered dielectric film 7e works to transmit all of the light having wavelength of 405 nm, and reflect all of the light having wavelengths of 650 nm and 780 nm. The phase difference between the light transmitting through the multi layered dielectric film 7c and the light transmitting through the multi layered dielectric film 7d is adjusted to be integer times the value of $2\pi$ for the light having wavelength of 405 nm. And also the phase difference between the light transmitting through the multi layered dielectric film 7d and the light transmitting through the multi layered dielectric film 7e is adjusted to be integer times the value of $2\pi$ for the light having wavelength of 405 nm. And the phase difference between the light transmitting through the multi layered dielectric film 7c and the light transmitting through the multi layered dielectric film 7d is adjusted to be integer times the value of $2\pi$ for the light having wavelength of 650 nm.

That is, at the aperture controlling element 21b, the light having wavelength of 405 nm is all transmitted, and the light having wavelength of 650 nm is all transmitted within the region of the circle of the diameter 2b and is all reflected outside the region of the circle of the diameter 2b. And the light having wavelength of 780 nm is all transmitted within the region of the circle of the diameter 2c and is all reflected outside the region of the circle of the diameter 2c. Therefore, when the focal distance of the objective lens 4a is decided as "fa", the effective numerical aperture for the light having wavelength of 405 nm is given as "a/fa", the effective numerical aperture for the light having wavelength of 650 nm is given as "b/fa", and the effective numerical aperture for the light having wavelength of 780 m is given as a "c/fa". For example, it is set to be that the "a/fa"=0.7, the "b/fa"=0.6, and the "c/fa"=0.45.

In this, the structure of the optics 1a is the same that used at the first embodiment shown in FIG. 10A, and the photo detector 15a in the optics 1a is also the same that used at the first embodiment shown in FIG. 10B. And the optics 1d is the same that used at the third embodiment shown in FIG. 21, and the photo detector 15b in the optics 1d is the same that used at the first embodiment shown in FIG. 11B.

Figure 24:
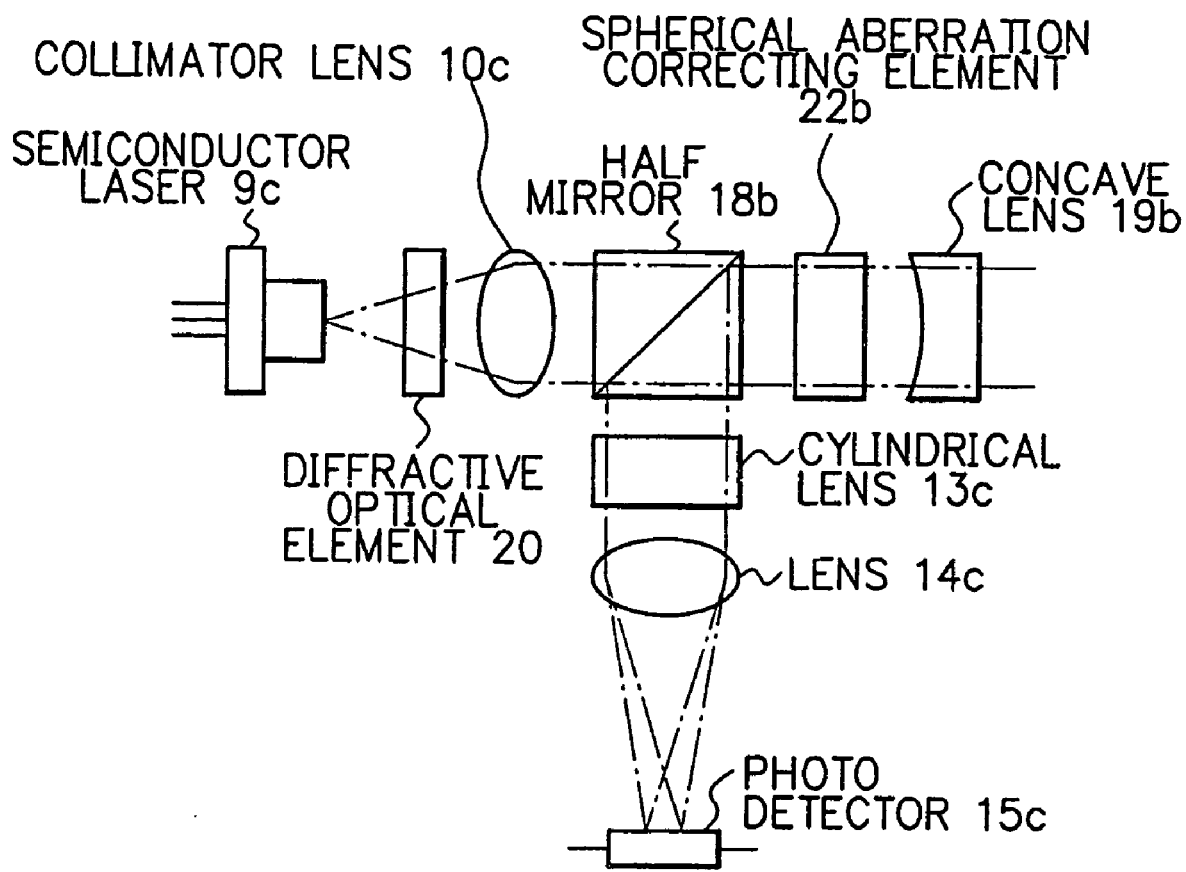
FIG. 24 is a diagram show a structure of an optics shown in FIG. 22.

FIG. 24 is a diagram showing a structure of the optics 1e shown in FIG. 22. A shown in FIG. 24, a light having wavelength of 780 nm emitted from a semiconductor laser 9c is divided into three lights being 0 th order light and ±first order diffracted lights at a diffractive optical element 20. The three divided lights become three collimated lights at a collimator lens 10c. About 50% of the three collimated lights is transmitted through a half mirror 18b, and is converted into three diverged lights by transmitting through a spherical aberration correcting element 22b and a concave lens 19b, and is transmitted to the disk 5c. Three lights reflected from the disk 5c are converted from three convergent lights into three collimated lights by transmitting through the concave lens 19b and the spherical aberration correcting element 22b, and about 60% of the collimated lights is reflected at the half mirror 18b. The reflected lights are transmitted through a cylindrical lens 13c and a lens 14c, and a photo detector 15c receives the transmitted lights. The photo detector 15c is disposed in the middle of the two focal lines of the cylindrical lens 13c and the lens 14c. The structure of the photo detector 15c is the same that used at the second embodiment shown in FIG. 17B.

One of the surfaces of the spherical aberration correcting element 22b is a plane, and the other of the surfaces is an aspherical surface. The spherical aberration correcting element 22b changes the phase distribution for the light having wavelength of 780 nm. In case that the spherical aberration correcting element 22b is not used, a spherical aberration, which remaining when the light having wavelength of 780 nm, inputted to the objective lens 4a as a collimated light, is transmitted through the disk 5c, whose thickness is 1.2 mm, is decreased, by that the magnification of the objective lens 4a is set to be 0.096. The spherical aberration correcting element 22b is designed so that the change of the phase distribution for the light having wavelength of 780 corrects this decreased spherical aberration at the magnification 0.096 of the objective lens 4a almost completely. In this, the spherical aberration correcting element 22b can be unified with the concave lens 19b.

Each of the multi layered dielectric films 7c, 7d, and 7e in the aperture controlling element 21b has a structure in which a high refractive index layer made of such as titanium dioxide and a low refractive index layer made of such as silicon dioxide are layered alternately. The designed result of the wavelength dependency of the transmittance for each of the multi layered dielectric film 7c, 7d, and 7e in the aperture controlling element 21b is the same that shown in FIG. 14A in the wavelength selective filter at the embodiments of the optical head device of the present invention. And the designed result of the wavelength dependency of the phase of transmitted light through each of the multi layered dielectric films 7c, 7d, and 7e in the aperture controlling element 21b is the same that shown in FIG. 14B in the wavelength selective filter at the embodiments of the optical head device of the present invention.

At the third and fourth embodiments of the optical head device of the present invention shown in FIGS. 19 and 22, when the objective lens 4a is driven in the tracking direction by an actuator (not shown), the center of the objective lens 4a and the center of each of the spherical aberration correcting elements 22a and 22b deviate in the tracking direction. Consequently, a coma aberration is generated in a light inputting to the objective lens 4a as a diverged light, by receiving a change of the phase distribution at each of the spherical aberration correcting elements 22a and 22b.

However, this coma aberration can be corrected by that the objective lens 4a is inclined in the radial direction of the disks 5a, 5b, and 5c by the actuator. When the objective lens 4a is inclined in the radial direction of the disks 5a, 5b, and 5c, the coma aberration is generated. In order to solve the above problem, a coma aberration, which cancels the coma aberration caused by the deviation of the centers of the objective lens 4a and each of the spherical aberration correcting elements 22a and 22b, is generated at the objective lens 4a by adjusting the incline of the objective lens 4a in the radial direction. With this, the come aberration caused by the deviation of the centers of the objective lens 4a and each of the spherical aberration correcting elements 22a and 22b is corrected.

Figure 26:
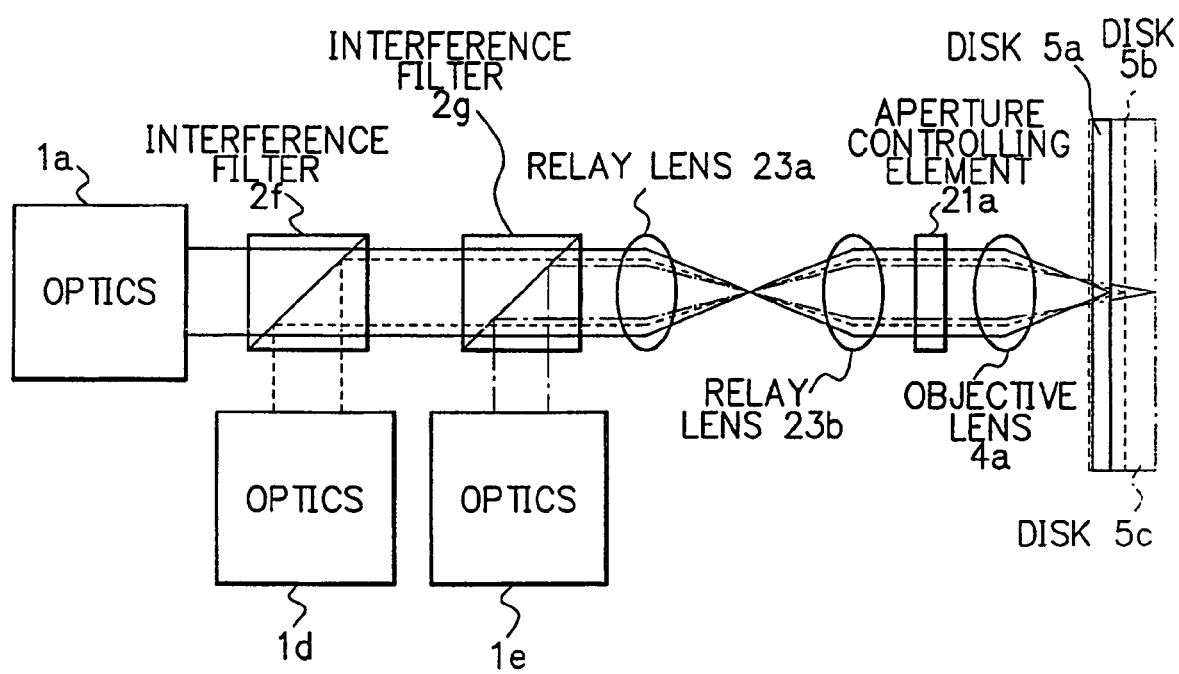
FIG. 26 is a block diagram showing a structure of a sixth embodiment of the optical head device of the present invention.

Next, referring to the drawings, fifth and sixth embodiments of the optical head device of the present invention are explained. FIG. 25 is a block diagram showing a structure of the fifth embodiment of the optical head device of the present invention. At the fifth embodiment, relay lenses 23a and 23b are added between the interference filter 2*f* and the aperture controlling element 21*a* at the third embodiment of the optical head device of the present invention shown in FIG. 19. And FIG. 26 is a block diagram showing a structure of the sixth embodiment of the optical head device of the present invention. At the sixth embodiment, relay lenses 23*a* and 23*b* are added between the interference filter 2*g* and the aperture controlling element 21*b* at the fourth embodiment of the optical head device of the present invention shown in FIG. 22.

Generally, when the thickness of the substrate of the disk deviates from a designed value, the shape of the focused light spot is changed by a spherical aberration, caused by the deviation of the thickness of the substrate, and the recording and reproducing characteristics deteriorate. This spherical aberration is in inverse proportion to the wavelength of the light source, and is in proportion to the fourth power of the numerical aperture of the objective lens. Therefore, the shorter the wavelength of the light source is and the higher the numerical aperture of the objective lens is, the narrower the margin for the deviation of the thickness of the substrate of the disk in the recording and reproducing characteristics is. In case that the wavelength of the semiconductor laser 9*a* being the light source is 405 nm and the numerical aperture of the objective lens 4*a* is 0.7, this margin is not sufficient, therefore, it is necessary to correct the deviation of the thickness of the substrata of the disk 5*a*.

When one of the relay lenses 23*a* and 23*b* is moved in the optical a direction by an actuator (not shown), the magnification of the objective lens 4*a* is changed, and the spherical aberration is changed. Therefore, a spherical aberration, which cancels the spherical aberration caused by the deviation of the thickness of the substrate of the disk 5*a*, is generated at the objective lens 4*a* by adjusting the position of one of the relay lenses 23*a* and 23*b* in the optical axis direction. With this, the deviation of the thickness of the substrate of the disk 5*a* is corrected and a bad effect for the recording and reproducing characteristics becomes almost nothing.

At the fifth and sixth embodiments of the optical head device of the present invention shown in FIGS. 25 and 26, when the objective lens 4*a* is driven by the actuator in the tracking direction, the center of the objective lens 4*a* deviates in the tracking direction for each of the centers of the spherical aberration correcting element 22*a* in the optics 1*d* and the spherical aberration correcting element 22*b* in the optics 1*e*. With this, a coma aberration is generated in a light, which is inputted to the objective lens 4*a* as a diverged light, by receiving a change of the phase distribution at each of the spherical aberration correcting elements 22*a* and 22*b*.

However, this coma aberration can be corrected by inclining or moving one of the relay lenses 23*a* and 23*b* in the radial direction of the disk 5*a*, 5*b*, and se, by the actuator. In this case, one of the relay lenses 23*a* and 23*b* is designed not to satisfy the sine condition. In case that both of the relay lenses 23*a* and 23*b* satisfy the sine condition, the coma aberration is not generated, even when the relay lenses 23*a* and 23*b* are inclined or moved in the radial direction of the disk 5*a*, 5*b*, and 5*c*. However, in case that one of the relay lenses 23*a* and 23*b* does not satisfy the sine condition, the coma aberration is generated, when the relay lenses 23*a* and 23*b* are inclined or moved in the radial direction of the disks 5*a*, 5*b*, and 5*c*.

In order to solve the above problem, by adjusting the incline or the position of one of the relay lenses 23*a* and 23*b* in the radial direction, a coma aberration, which cancels the coma aberration caused by the deviation of the center of the objective lens 4*a* for the center of each of the spherical aberration correcting elements 22*a* and 22*b*, is generated at one of the relay lenses 23*a* and 23*b*. With this, the coma aberration caused by the deviation of the center of the objective lens 4*a* for the center of each of the spherical aberration correcting elements 22*a* and 22*b* is corrected.

At the third, fourth, fifth, and sixth embodiments of the optical head device of the present invention shown in FIGS. 19, 22, 25, and 26, each of the aperture controlling elements 21*a* and 21*b* is driven in the tracking direction with the objective lens 4*a* by the actuator. In case that only the objective lens 4*a* is driven by the actuator in the tracking direction, the center of the objective lens 4*a* deviates in the tracking direction for the center of the multi layered dielectric films 7*a* and 7*b* in the aperture controlling element 21*a* or the center of the multi layered dielectric films 7*c*, 7*d*, and 7*b* in the aperture controlling element 21*b*. Consequently, a part of light having wavelengths of 650 nm and 780 nm, transmitted through the aperture controlling element 21*a* or 21*b* at the forward route, is reflected at the aperture controlling element 21*a* or 21*b* at the backward direction. With this, the effective numerical aperture for the light having wavelengths of 650 nm and 780 nm is lowered.

However, when each of the aperture controlling elements 21*a* and 21*b* and also the objective lens 4*a* are driven in the tracking direction by the actuator, this lowering of the numerical aperture does not occur.

At the third, fourth, fifth, and sixth embodiments of the optical head device of the present invention shown in FIGS. 19, 22, 25, and 26, the normal line of each of the aperture controlling elements 21*a* and 21*b* slightly inclines for the optical axis of the objective lens 4*a*. In case that the normal line of each of the aperture controlling elements 21*a* and 21*b* is parallel to the optical a of the objective lens 4*a*, a stray light reflected at each of the aperture controlling elements 21*a* and 21*b* is inputted to each of the photo detectors 15*a*, 15*b*, and 15 in the optics 1*a*, 1*d*, and 1*e*. And an offset is generated at the focus error signal and the track error signal by this stray light. However, in case that the normal line of each of the aperture controlling elements 21*a* and 21*b* slightly inclines for the optical axis of the objective lens 4*a*, this offset is not generated.

As shown in FIG. 20, the aperture controlling element 21*a* has a structure in which the multi layered dielectric films 7*a* and 7*b* are formed on the glass substrate 8*b*. And as shown in FIG. 23, the aperture controlling element 21*b* has a structure in which the multi layered dielectric films 7*c*, 7*d*, and 7*e* are formed on the glass substrate 8*b*. In this, the multi layered dielectric films can be formed on the objective lens 4*a*.

Next referring to the drawings, embodiments of an optical recording and reproducing apparatus of the present invention are explained.

Figure 27:
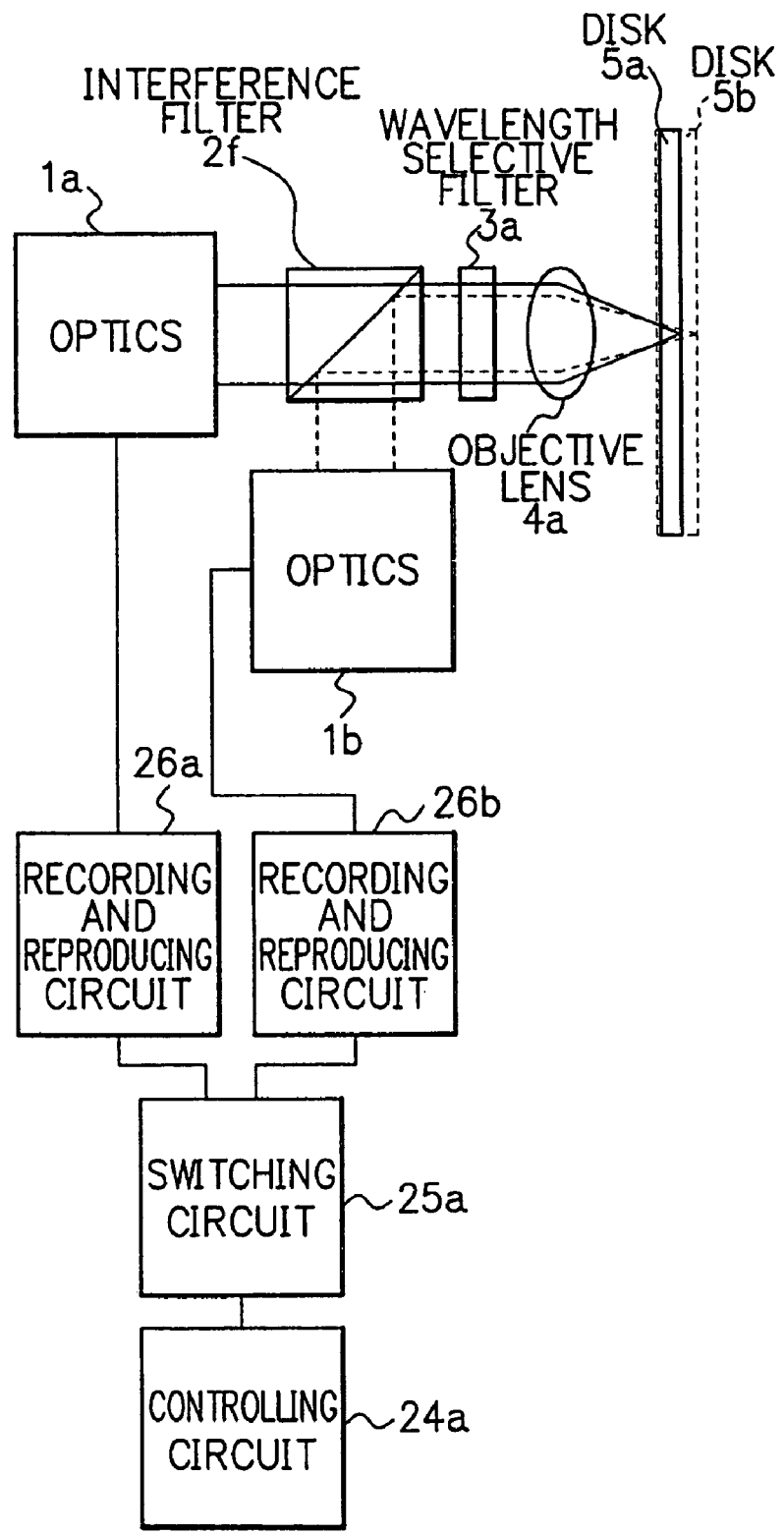
FIG. 27 is a block diagram showing a structure of a first embodiment of an optical recording and reproducing apparatus of the present invention.

FIG. 27 is a block diagram showing a structure of a first embodiment of the optical recording and reproducing apparatus of the present invention. At the first embodiment of the optical recording and reproducing apparatus of the present invention, recording and reproducing circuits 26*a* and 26*b*, a switching circuit 25*a*, and a controlling circuit 24*a* are added to the first embodiment of the optical head device of the present invention shown in FIG. 8. The recording and reproducing circuit 26*a* generates an input signal to the semiconductor laser 9*a* in the optics 1*a* based on a recording signal to the disk 5*a*, and also generates a reproducing signal from the disk 5*a* based on an output signal from the photo detector 15*a* in the optics 1*a*.

The recording and reproducing circuit 26*b* generates an input signal to the semiconductor laser 9*b* in the optics 1*b* based on a recording signal to the disk 5*b*, and also generates a reproducing signal from the disk 5*b* based on an output signal from the photo detector 15*b* in the optics 1*b*. The switching circuit 25a switches transmission routes to one of the transmission routes, which are a transmission route of the input signal to the semiconductor laser 9a from the recording and reproducing circuit 26a and a transmission route of the input signal to the semiconductor laser 9b from the recording and reproducing circuit 26b. The controlling circuit 24a controls the operation of the switching circuit 25a so that the input signal is transmitted from the recording and reproducing circuit 26a to the semiconductor laser 9a in case that the disk 5a was inserted, and so that the input signal is transmitted from the recording and reproducing circuit 26b to the semiconductor laser 9b in case that the disk 5b was inserted.

Figure 28:
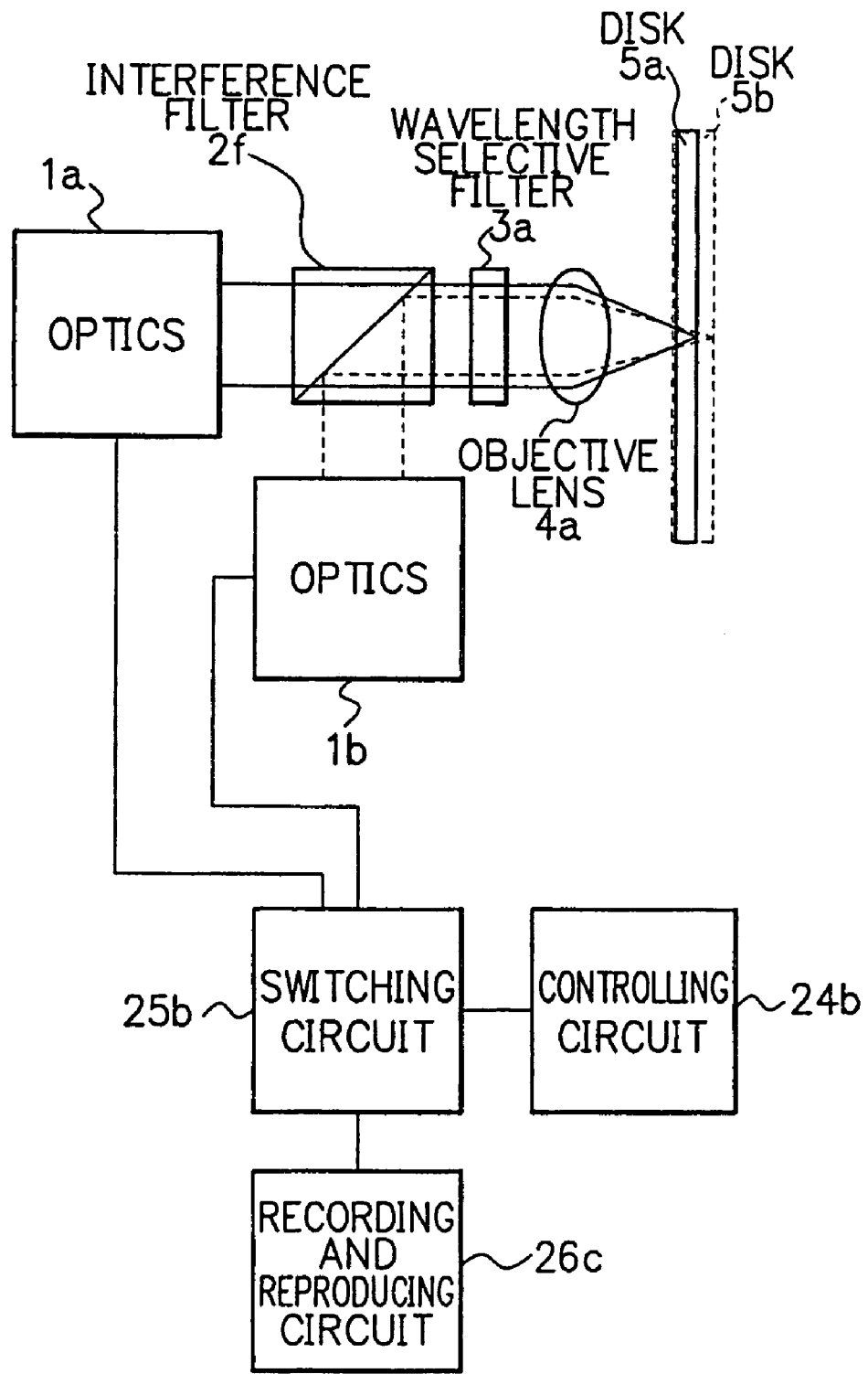
FIG. 28 is a block diagram showing a structure of a second embodiment of the optical recording and reproducing apparatus of the present invention.

FIG. 28 is a block diagram showing a structure of a second embodiment of the optical recording and reproducing apparatus of the present invention. At the second embodiment of the optical recording and reproducing apparatus of the present invention, a recording and reproducing circuit 26c, a switching circuit 25b, and a controlling circuit 24b are added to the first embodiment of the optical head device of the present invention shown in FIG. 8. The recording and reproducing circuit 26c generates an input signal to the semiconductor laser 9a in the optics 1a based on a recording signal to the disk 5a, and also generates an input signal to the semiconductor laser 9b in the optics 1b based on a recording signal to the disk 5b. Further, the recording and reproducing circuit 26c generates a reproducing signal from the disk 5a based on an output signal from the photo detector 15a in the optics 1a, and also generates a reproducing signal from the disk 5b based on an output signal from the photo detector 15b in the optics 1b.

The switching circuit 25b switches transmission routes to one of transmission routes, which are a transmission route of the input signal to the semiconductor laser 9a from the recording and reproducing circuit 26c and a transmission route of the input signal to the semiconductor laser 9b from the recording and reproducing circuit 26c e The controlling circuit 24b controls the operation of the switching circuit 25b so that the input signal is transmitted from the recording and reproducing circuit 26c to the semiconductor laser 9a in case that the disk 5a was inserted, and so that the input signal is transmitted from the recording and reproducing circuit 26c to the semiconductor laser 9b in case that the disk 5b was inserted.

Figure 29:
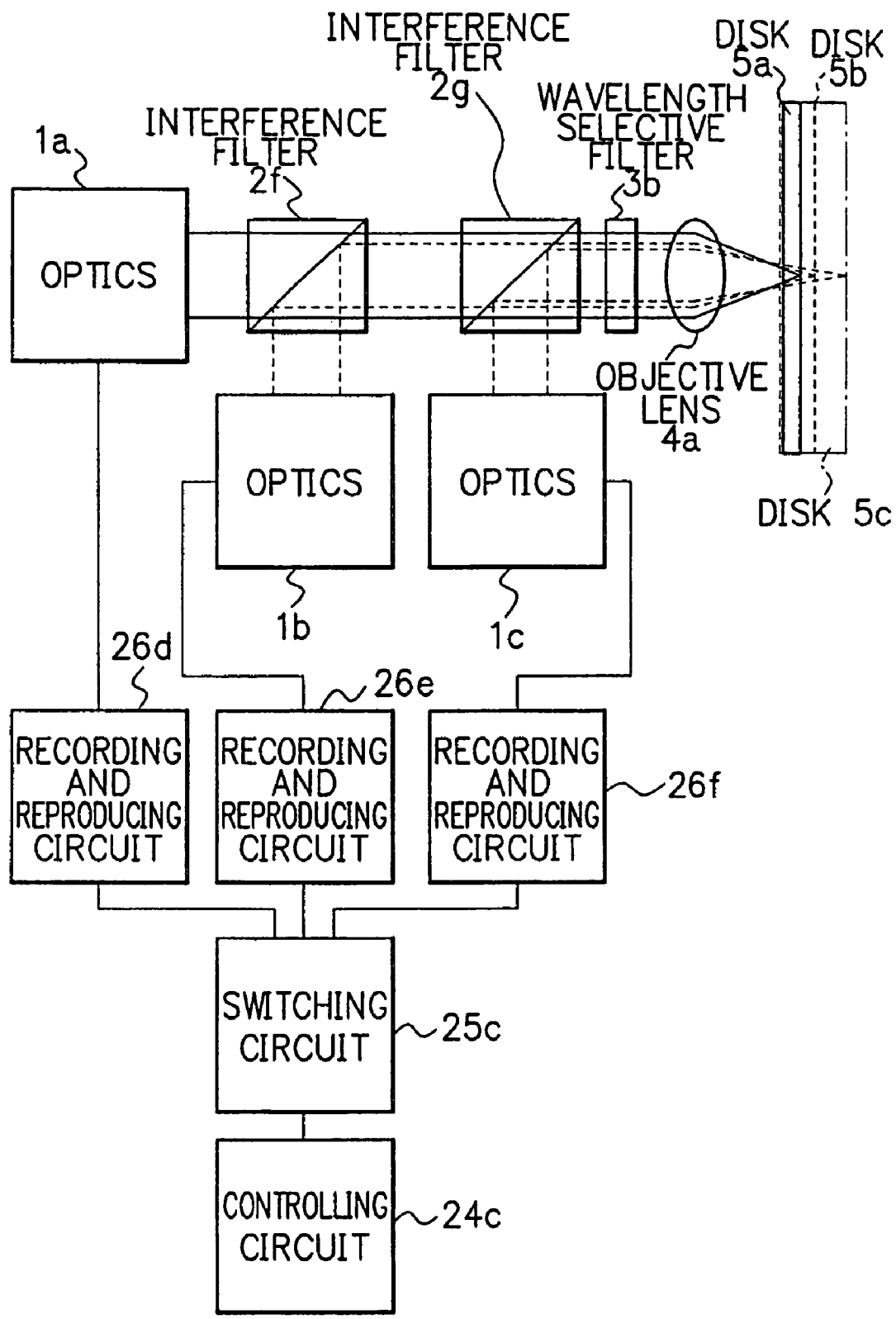
FIG. 29 is a block diagram showing a structure of a third embodiment of the optical recording and reproducing apparatus of the present invention.

FIG. 29 is a block diagram showing a structure of a third embodiment of the optical recording and reproducing apparatus of the present invention. At the third embodiment of the optical recording and reproducing apparatus of the present invention, recording and reproducing circuits 26d, 26e, and 26f, a switching circuit 25c, and a controlling circuit 24c are added to the second embodiment of the optical head device of the present invention shown in FIG. 15. The recording and reproducing circuit 26d generates an input signal to the semiconductor laser 9a in the optics 1a based on a recording signal to the disk 5a, and also generates a reproducing signal from the disk 5a based on an output signal from the photo detector 15a in the optics 1a.

The recording and reproducing circuit 26e generates an input signal to the semiconductor laser 9b in the optics 1b based on a recording signal to the disk 5b, and also generates a reproducing signal from the disk 5b based on an output signal from the photo detector 15b in the optics 1b. The recording and reproducing circuit 26f generates an input signal to the semiconductor laser 9c in the optics 1c based on a recording signal to the disk 5c, and also generates a reproducing signal from the disk 5c based on an output signal from the photo detector 15c in the optic 1c.

The switching circuit 25c switches transmission routes to one of the transmission routes, which are a transmission route of the input signal to the semiconductor laser 9a from the recording and reproducing circuit 26d, a transmission route of the input signal to the semiconductor laser 9b from the recording and reproducing circuit 26e, and a transmission route of the input signal to the semiconductor laser 9c from the recording and reproducing circuit 26f. The controlling circuit 24c controls the operation of the switching circuit 25c so that the input signal is transmitted from the recording and reproducing circuit 26d to the semiconductor laser 9a in case that the disk 5a was inserted, and so that the input signal is transmitted from the recording and reproducing circuit 26e to the semiconductor laser 9b in case that the disk 5b was inserted, and so that the input signal is transmitted from the recording and reproducing circuit 26f to the semiconductor laser 9c in case that the disk 5c was inserted.

Figure 30:
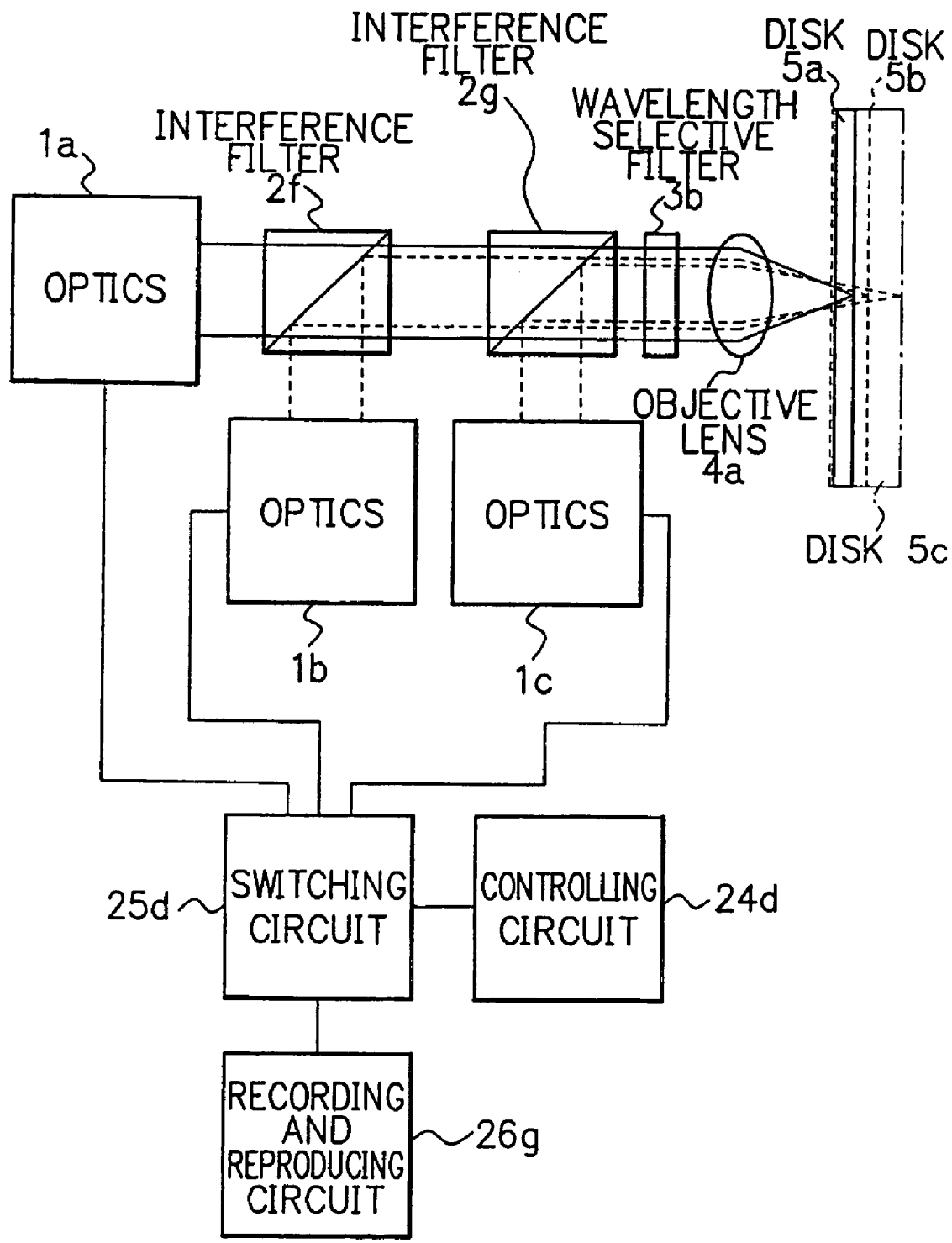
FIG. 30 is a block diagram showing a structure of a fourth embodiment of the optical recording and reproducing apparatus of the present invention.

FIG. 30 is a block diagram showing a structure of a fourth embodiment of the optical recording and reproducing apparatus of the present invention. At the fourth embodiment of the optical recording and reproducing apparatus of the present invention, a recording and reproducing circuit 26g, a switching circuit 25d, and a controlling circuit 24d are added to the second embodiment of the optical head device of the present invention shown in FIG. 15. The recording and reproducing circuit 26g generates an input signal to the semiconductor laser 9a in the optics 1a based on a recording signal to the disk 5a, and generates an input signal to the semiconductor laser 9b in the optics 1b based on a recording signal to the disk 5b, and also generates an input signal to the semiconductor laser 9c in the optics 1c based on a recording signal to the disk 5c. Further, the recording and reproducing circuit 26g generates a reproducing signal from the disk 5a based on an output signal from the photo detector 15a in the optics 1a, and generates a reproducing signal from the disk 5b based on an output signal from the photo detector 15b in the optics 1b, and also generates a reproducing signal from the disk 5c based on an output signal from the photo detector 15c in the optics 1c.

The switching circuit 25d switches transmission routes to one of the transmission routes, which are a transmission route of the input signal to the semiconductor laser 9a from the recording and reproducing circuit 26g, a transmission route of the input signal to the semiconductor laser 9b from the recording and reproducing circuit 26g, and a transmission route of the input signal to the semiconductor laser 9c from the recording and reproducing circuit 26g. The controlling circuit 24d controls the operation of the switching circuit 25d so that the input signal is transmitted from the recording and reproducing circuit 26g to the semiconductor laser 9a in case that the disk 5a was inserted, and so that the input signal is transmitted from the recording and reproducing circuit 26g to the semiconductor laser 9b in case that the disk 5b was 2i inserted, and so that the input signal is transmitted from the recording and reproducing circuit 26g to the semiconductor laser 9c in case that the disk 5c was inserted.

Further, as embodiments of the optical recording and reproducing apparatus of the present invention, the embodiments, in it which a recording and reproducing circuit(s), a controlling circuit, and a switching circuit are added to each of the optical head devices at the third, fourth, fifth, and sixth embodiments, can be realized.

As mentioned above, the optical head device of the present invention provides a first light source for emitting a light having a first wavelength, a second light source for emitting a light having a second wavelength, a photo detector, a wavelength selective filter, an objective lens. A light emitted from the first light source is transmitted to a first optical recording medium containing a first substrate having a first thickness through the wavelength selective filter and the objective lens.

And a light emitted from the second light source is transmitted to a second optical recording medium containing a second substrate having a second thickness through the wavelength selective filter and the objective lens. A light reflected from the first optical recording medium is transmitted to the photo detector through the objective lens and the wavelength selective filter. A light reflected from the second optical recording medium is transmitted to the photo detector through the objective lens and the wavelength selective filter. At the first optical recording medium, information is recorded and the recorded information is reproduced by using the light having the first wavelength. At the second optical recording medium, information is recorded and the recorded information is reproduced by using the light hang the second wavelength. And at the optical head device of the present invention, the magnification of the objective lens for the light having the first wavelength is different from the magnification of the objective lens for the light having the second wavelength. Further, the wavelength selective filter changes the phase distribution so that a spherical aberration, which remains for the light having the first wavelength or the light having the second wavelength at the corresponding magnification of the objective lens, is decreased.

And as mentioned above, the optical recording and reproducing apparatus of the present invention provides the optical head device of the present invention, at least one recording and reproducing circuit, which generates input signals to light sources and also generates reproducing signals from optical recording media, a switching circuit, which switches routes transmitting input signals, and a controlling circuit, which controls the operation of the switching circuit corresponding to the kinds of the optical recording media.

Consequently, the optical head device and the optical recording and reproducing apparatus of the present invention can realize the compatibility between the next generation optical recording medium, in which the wavelength of the light source is made to be shorter, the numerical aperture of the objective lens is made to be higher, and the thickness of the substrate of the optical recording medium is made to be thinner, in order to make the recording density higher, and optical recording media of conventional DVD standard and CD standard.

The reason, why the above mentioned compatibility is realized, is that the remaining spherical aberration is decreased by using the change of the magnification of the objective lens for the light having the first wavelength or the light having the second wavelength, and the decreased spherical aberration at the corresponding magnification of the objective lens is further decreased by using the wavelength selective filter.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical head device, comprising:
   a first light source for emitting a light having a first wavelength;
   a second light source for emitting a light having a second wavelength;
   a photo detector;
   a wavelength selective filter; and
   an objective lens, wherein:
   an optical system is formed by,
   a light emitted from said first light source is transmitted to a first optical recording medium containing a first substrate having a first thickness through said wavelength selective filter and said objective lens,
   a light emitted from said second light source is transmitted to a second optical recording medium containing a second substrate having a second thickness through said wavelength selective filter and said objective lens,
   a light reflected from said first optical recording medium is transmitted to said photo detector through said objective lens and said wavelength selective filter, and
   a light reflected from said second optical recording medium is transmitted to said photo detector through said objective lens and said wavelength selective filter, wherein:
   recording and reproducing information is executed for said first optical recording medium by using said light having said first wavelength, and
   recording and reproducing information is executed for said second optical recording medium by using said light having said second wavelength, wherein:
   the magnification of said objective lens for said light having said first wavelength is different from the magnification of said objective lens for said light having said second wavelength, and
   said wavelength selective filter changes a phase distribution for said light so that a spherical aberration remaining for said light having said first wavelength or said light having said second wavelength at corresponding said magnification of said objective lens is deceased.

2. An optical head device in accordance with claim 1, wherein:
   said first wavelength is shorter than said second wavelength.

3. An optical head device in accordance with claim 1, wherein:
   said first thickness of said first substrate is thinner than said second thickness of said second substrate.

4. An optical head device in accordance with claim 1, wherein:
   said objective lens has a spherical aberration that cancels a spherical aberration generated at the time when said light having said first wavelength, inputted to said objective lens as a collimated light, transmits through said first substrate having said first thickness.

5. An optical head device in accordance with claim 1, wherein:
   said light emitted from said first light source is inputted to said objective lens as an almost collimated light so that the magnification of said objective lens for said light having said first wavelength becomes about 0, and
   said light emitted from said second light source is inputted to said objective lens as a diverged light so that the magnification of said objective lens for said light having said second wavelength becomes a first designated value.

6. An optical head device in accordance with claim 1, wherein:
   said wavelength selective filter provides a phase filter pattern having concentric circle shapes, and first and second multi layered dielectric films.

7. An optical head device in accordance with claim 6, wherein:
   said phase filter pattern hardly changes the phase distribution for said light having said first wavelength, and changes the phase distribution for said light having said second wavelength.

8. An optical head device in accordance with claim 6, wherein:
said phase filter pattern is designed so that the change of the phase distribution for said light having said second wavelength decreases a spherical aberration at the magnification of said first designated value of said objective lens.

9. An optical head device in accordance with claim 6, wherein:
said phase filter pattern is formed only within a circular region having a first diameter that is smaller than the effective diameter of said objective lens.

10. An optical head device in accordance with claim 6, wherein:
the cross-section of said phase filter pattern has a multi level step shape.

11. An optical head device in accordance with claim 10, wherein:
the height of each step of said phase filter pattern is set to be a value so that the phase difference of light transmitting through between a part with a pattern and a part without a pattern at each step becomes about $2\pi$ for said first wavelength.

12. An optical head device in accordance with claim 9, wherein:
said first multi layered dielectric film is formed only within said circular region having said first diameter, and said second multi layered dielectric film is formed only outside said circular region having said first diameter.

13. An optical head device in accordance with claim 12, wherein:
said first multi layered dielectric film transmits almost all said light having said first wavelength and almost all said light having said second wavelength, and
said second multi layered dielectric film transmits almost all said light having said first wavelength and reflects almost all said light having said second wavelength.

14. An optical head device in accordance with claim 12, wherein:
the phase difference of said light having said first wavelength transmitting through between said first multi layered dielectric film and said second multi layered dielectric film is adjusted to be about integer times the value of $2\pi$.

15. An optical head device in accordance with claim 6, wherein:
each of said first and second multi layered dielectric films has a structure in which a high refractive index layer and a low refractive index layer are layered alternately.

16. An optical head device in accordance with claim 15, wherein:
the thickness of each layer of said first multi layered dielectric film is different from the thickness of each layer of said second multi layered dielectric film.

17. An optical head device in accordance with claim 6, wherein:
said phase filter pattern is formed on a first glass substrate, and said first and second multi layered dielectric films are formed on a second glass substrate.

18. An optical head device in accordance with claim 17, wherein:
a surface, where said phase filter pattern was not formed, of said first glass substrate, and a surface, where said first and second multi layered dielectric films were not formed, of said second glass substrate, are adhered by an adhesive.

19. An optical head device in accordance with claim 17, wherein:
said phase filter pattern is formed by being unified with said first glass substrate by glass forming, or by using a plastic for said first glass substrate instead of glass, and said phase filter pattern is formed by being unified with a plastic substrate by plastic molding.

20. An optical head device in accordance with claim 6, wherein:
said phase filter pattern and/or or said first and second multi layered dielectric films are formed on said objective lens.

21. An optical head device in accordance with claim 1, further comprising:
a third light source for emitting a light having a third wavelength, wherein:
further an additional optical system is formed by,
a light emitted from said third light source is transmitted to a third optical recording medium containing a third substrate having a third thickness through said wavelength selective filter and said objective lens, and
a light reflected from said third optical recording medium is transmitted to said photo detector through said objective lens and said wavelength selective filter, wherein:
recording and reproducing information is executed for said third optical recording medium by using said light having said third wavelength, and
the magnification of said objective lens for said light having said third wavelength is different from the magnification of said objective lens for said light having said first wavelength.

22. An optical head device in accordance with claim 21, wherein:
said first wavelength is shorter than said second wavelength, and said second wavelength is shorter than said third wavelength.

23. An optical head device in accordance with claim 21, wherein:
said first thickness of said first substrate is thinner than said second thickness of said second substrate, and said second thickness of said second substrate is thinner than said third thickness of said third substrate.

24. An optical head device in accordance with claim 21, wherein:
said objective lens has a spherical aberration that cancels a spherical aberration generated at the time when said light having said first wavelength, inputted to said objective lens as a collimated light, transmits through said first substrate having said first thickness.

25. An optical head device in accordance with claim 21, wherein:
said light emitted from said first light source is inputted to said objective lens as an almost collimated light so that the magnification of said objective lens for said light having said first wavelength becomes about 0,
said light emitted from said second light source is inputted to said objective lens as a diverged light so that the magnification of said objective lens for said light having said second wavelength becomes a first designated value, and
said light emitted from said third light source is inputted to said objective lens as a diverged light so that the magnification of said objective lens for said light having said third wavelength becomes a second designated value.

26. An optical head device in accordance with claim 21, wherein:

said wavelength selective filter provides a phase filter pattern having concentric circle shapes, and first, second, and third multi layered dielectric films.

27. An optical head device in accordance with claim 26, wherein:
said phase filter pattern hardly changes the phase distribution for said light having said first wavelength, and changes the phase distribution for said light having said second wavelength and said third wavelength.

28. An optical head device in accordance with claim 26, wherein:
said phase filter pattern is designed so that the change of the phase distribution for said light having said second wavelength decreases a spherical aberration at the magnification of said first designated value of said objective lens.

29. An optical head device in accordance with claim 26, wherein:
said phase filter pattern is formed only within a circular region having a first diameter that is smaller than the effective diameter of said objective lens.

30. An optical head device in accordance with claim 26, wherein:
the cross-section of said phase filter pattern has a multi level step shape.

31. An optical head device in accordance with claim 30, wherein:
the height of each step of said phase filter pattern is set to be a value so that the phase difference of light transmitting through between a part with a pattern and a part without a pattern at each step becomes about $2\pi$ for said first wavelength.

32. An optical head device in accordance with claim 29, wherein:
said first multi layered dielectric film is formed only within a circular region having a second diameter which is smaller than said first diameter,
said second multi layered dielectric film is formed only outside said circular region having said second diameter and also within said circular region having said first diameter, and
said third multi layered dielectric film is formed only outside said circular region having said first diameter.

33. An optical head device in accordance with claim 32, wherein:
said first multi layered dielectric film transmits almost all said light having said first wavelength, almost all said light having said second wavelength, and almost all said light having said third wavelength,
said second multi layered dielectric film transmits almost all said light having said first wavelength and almost all said light having said second wavelength, and reflects almost all said light having said third wavelength, and
said third multi layered dielectric film transmits almost all said light having said first wavelength, and reflects almost all said light having said second wavelength and almost all said light having said third wavelength.

34. An optical head device in accordance with claim 32, wherein:
the phase difference of the light having said first wavelength transmitting through between said first multi layered dielectric film and said second multi layered dielectric film is adjusted to be about integer times the value of $2\pi$,
the phase difference of the light having said first wavelength transmitting through between said second multi layered dielectric film and said third multi layered dielectric film is adjusted to be about integer times the value of $2\pi$, and
the phase difference of the light having said second wavelength transmitting through between said first multi layered dielectric film and said second multi layered dielectric film is adjusted to be about integer times the value of $2\pi$.

35. An optical head device in accordance with claim 26, wherein:
each of said first, second, and third multi layered dielectric films has a structure in which a high refractive index layer and a low refractive index layer are layered alternately.

36. An optical head device in accordance with claim 35, wherein:
the thickness of each layer and the number of layers of said first multi layered dielectric film are different from the thickness of each layer and the number of layers of said second multi layered dielectric film, and
the thickness of each layer of said second multi layered dielectric film is different from the thickness of each layer of said third multi layered dielectric film.

37. An optical head device in accordance with claim 26, wherein:
said phase filter pattern is formed on a first glass substrate, and said first, second, and third multi layered dielectric films are formed on a second glass substrate.

38. An optical head device in accordance with claim 37, wherein:
a surface, where said phase filter pattern was not formed, of said first glass substrate, and a surface, where said first, second, and third multi layered dielectric films were not formed, of said second glass substrate, are adhered by an adhesive.

39. An optical head device in accordance with claim 37, wherein:
said phase filter pattern is formed by being unified with said first glass substrate by glass forming, or by using a plastic for said first glass substrate instead of glass, and said phase filter pattern is formed by being unified with a plastic substrate by plastic molding.

40. An optical head device in accordance with claim 26, wherein:
said phase filter pattern, and/or said first, second, and third multi layered dielectric films are formed on said objective lens.

41. An optical head device, comprising:
a first light source for emitting a light having a first wavelength;
a second light source for emitting a light having a second wavelength;
a photo detector;
an aperture controlling element; and
an objective lens, wherein:
an optical system is formed by,
a light emitted from said first light source is transmitted to a first optical recording medium containing a first substrate having a first thickness through said aperture controlling element and said objective lens,
a light emitted from said second light source is transmitted to a second optical recording medium containing a second substrate having a second thickness through said aperture controlling element and said objective lens,
a light reflected from said first optical recording medium is transmitted to said photo detector through said objective lens and said aperture controlling element, and a light reflected from said second optical recording medium is transmitted to said photo detector through said objective lens and said aperture controlling element, wherein:

recording and reproducing information is executed for said first optical recording medium by using said light having said first wavelength, and recording and reproducing information is executed for said second optical recording medium by using said light having said second wavelength, wherein:

the magnification of said objective lens for said light having said first wavelength is different from the magnification of said objective lens for said light having said second wavelength, wherein:

further comprising:

a first spherical aberration correcting element disposed between said objective lens and said first light source or said second light source, wherein:

said first spherical aberration correcting element changes a phase distribution for said light so that a spherical aberration remaining for said light having said first wavelength or said light having said second wavelength at corresponding said magnification of said objective lens is corrected.

42. An optical head device in accordance with claim 41, wherein:

said first wavelength is shorter than said second wavelength.

43. An optical head device in accordance with claim 41, wherein:

said first thickness of said first substrate is thinner than said second thickness of said second substrate.

44. An optical head device in accordance with claim 41, wherein:

said objective lens has a spherical aberration that cancels a spherical aberration generated at the time when said light having said first wavelength, inputted to said objective lens as a collimated light, transmits through said first substrate having said first thickness.

45. An optical head device in accordance with claim 41 wherein:

said light emitted from said first light source is inputted to said objective lens as an almost collimated light so that the magnification of said objective lens for said light having said first wavelength becomes about 0, and said light emitted from said second light source is inputted to said objective lens as a diverged light so that the magnification of said objective lens for said light having said second wavelength becomes a first designated value.

46. An optical head device in accordance with claim 41, wherein:

said aperture controlling element provides first and second multi layered dielectric films.

47. An optical head device in accordance with claim 46, wherein:

said first multi layered dielectric film is formed only within a circular region having a first diameter that is smaller than the effective diameter of said objective lens, and said second multi layered dielectric film is formed only outside said circular region having said first diameter.

48. An optical head device in accordance with claim 47, wherein:

said first multi layered dielectric film transmits almost all said light having said first wavelength and almost all said light having said second wavelength, and said second multi layered dielectric film transmits almost all said light having said first wavelength and reflects almost all said light having said second wavelength.

49. An optical head device in accordance with claim 48, wherein:

the phase difference of said light having said first wavelength transmitting through between said first multi layered dielectric film and said second multi layered dielectric film is adjusted to be about integer times the value of $2\pi$.

50. An optical head device in accordance with claim 46, wherein:

each of said first and second multi layered dielectric films has a structure in which a high refractive index layer and a low refractive index layer are layered alternately.

51. An optical head device in accordance with claim 46, wherein:

said first and second multi layered dielectric films are formed on a glass substrate.

52. An optical head device in accordance with claim 46, wherein:

said first and second multi layered dielectric films are formed on said objective lens.

53. An optical head device in accordance with claim 41, wherein:

said first spherical aberration correcting element is disposed between said aperture controlling element and said second light source, and changes the phase distribution for said light having said second wavelength.

54. An optical head device in accordance with claim 53, wherein:

said first spherical aberration correcting element is designed so that the change of said phase distribution for said light having said second wavelength corrects a spherical aberration at said magnification of said first designated value of said objective lens.

55. An optical head device in accordance with claim 53, wherein:

one or surfaces of said first spherical aberration correcting element is a plane and the other of said surfaces is an aspherical surface.

56. An optical head device in accordance with claim 53, wherein:

said first spherical aberration correcting element is unified with a first lens.

57. An optical head device in accordance with claim 41, wherein:

a coma aberration caused by that the center of said objective lens deviates from the center of said first spherical aberration correcting element is corrected by inclining said objective lens in the radial direction of said second optical recording medium.

58. An optical head device in accordance with claim 41, wherein:

first and second relay lenses are disposed between said first and second light sources and said aperture controlling element.

59. An optical head device in accordance with claim 58, wherein:

a spherical aberration caused by the deviation of said first thickness of said first substrate of said first optical recording medium is corrected by moving one of said first and second relay lenses in the optical axis direction.

60. An optical head device in accordance with claim 58, wherein:

a coma aberration caused by that the center of said objective lens deviates from the center of said first spherical aberration correcting element is corrected by inclining or moving one of said first and second relay lenses in the radial direction of said second optical recording medium.

61. An optical head device in accordance with claim 60, wherein:
one of said first and second relay lenses is designed not to satisfy the sine condition.

62. An optical head device in accordance with claim 41, further comprising:
a third light source for emitting a light having a third wavelength, wherein:
further an additional optical system is formed by,
a light emitted from said third light source is transmitted to a third optical recording medium containing a third substrate having a third thickness through said aperture controlling element and said objective lens, and
a light reflected from said third optical recording medium is transmitted to said photo detector through said objective lens and said aperture controlling element, wherein:
recording and reproducing information is executed for said third optical recording medium by using said light having said third wavelength, wherein:
the magnification of said objective lens for said light having said third wavelength is different from the magnification of said objective lens for said light having said first wavelength, wherein:
further comprising:
a second spherical aberration correcting element disposed between said aperture controlling element and said first light source or said third light source, wherein:
said second spherical aberration correcting element changes the phase distribution so that a spherical aberration remaining for said light having said first wavelength or said light having said third wavelength at corresponding said magnification of said objective lens is corrected.

63. An optical head device in accordance with claim 62, wherein:
said first wavelength is shorter than said second wavelength, and said second wavelength is shorter than said third wavelength.

64. An optical head device in accordance with claim 62, wherein:
said first thickness of said first substrate is thinner than said second thickness of said second substrate, and said second thickness of said second substrate is thinner than said third thickness of said third substrate.

65. An optical head device in accordance with claim 62, wherein:
said objective lens has a spherical aberration that cancels a spherical aberration generated at the time when said light having said first wavelength, inputted to said objective lens as a collimated light, transmits through said first substrate having said first thickness.

66. An optical head device in accordance with claim 62, wherein:
said light emitted from said first light source is inputted to said objective lens as an almost collimated light so that the magnification of said objective lens for said light having said first wavelength becomes about 0,
said light emitted from said second light source is inputted to said objective lens as a diverged light so that the magnification of said objective lens for said light having said second wavelength becomes a first designated value, and
said light emitted from said third light source is inputted to said objective lens as a diverged light so that the magnification of said objective lens for said light having said third wavelength becomes a second designated value.

67. An optical head device in accordance with claim 62, wherein:
said aperture controlling element provides first, second, and third multi layered dielectric films.

68. An optical head device in accordance with claim 67, wherein:
said first multi layered dielectric film is formed only within a circular region having a second diameter which is smaller than a first diameter being smaller than the effective diameter of said objective lens,
said second multi layered dielectric film is formed only outside said circular region having said second diameter and also within said circular region having said first diameter, and
said third multi layered dielectric film is formed only outside said circular region having said first diameter.

69. An optical head device in accordance with claim 67, wherein:
said first multi layered dielectric film transmits almost all said light having said first wavelength, almost all said light having said second wavelength, and almost all said light having said third wavelength,
said second multi layered dielectric film transmits almost all said light having said first wavelength and almost all said light having said second wavelength, and reflects almost all said light having said third wavelength, and
said third multi layered dielectric film transmits almost all said light having said first wavelength, and reflects almost all said light having said second wavelength and almost all said light having said third wavelength.

70. An optical head device in accordance with claim 67, wherein:
the phase difference of the light having said first wavelength transmitting through between said first multi layered dielectric film and said second multi layered dielectric film is adjusted to be about integer times the value of $2\pi$,
the phase difference of the light having said first wavelength transmitting through between said second multi layered dielectric film and said third multi layered dielectric film is adjusted to be about integer times the value of $2\pi$, and
the phase difference of the light having said second wavelength transmitting through between said first multi layered dielectric film and said second multi layered dielectric film is adjusted to be about integer times the value of $2\pi$.

71. An optical head device in accordance with claim 67, wherein:
each of said first, second, and third multi layered dielectric films has a structure in which a high refractive index layer and a low refractive index layer are layered alternately.

72. An optical head device in accordance with claim 67, wherein:
said first, second, and third multi layered dielectric films are formed on a glass substrate.

73. An optical head device in accordance with claim 67, wherein:
said first, second, and third multi layered dielectric films are formed on said objective lens.

74. An optical head device in accordance with claim 66, wherein:

said first spherical aberration correcting element is disposed between said aperture controlling element and said second light source, and changes the phase distribution for said light having said second wavelength, and said second spherical aberration correcting element is disposed between said aperture controlling element and said third light source, and changes the phase distribution for said light having said third wavelength.

75. An optical head device in accordance with claim 74, wherein:

said first spherical aberration correcting element is designed so that the change of said phase distribution for said light having said second wavelength corrects a spherical aberration at said magnification of said first designated value of said objective lens, and said second spherical aberration correcting element is designed so that the change of said phase distribution for said light having said third wavelength corrects a spherical aberration at said magnification of said second designated value of said objective lens.

76. An optical head device in accordance with claim 74, wherein:

one of surfaces of said first and second spherical aberration correcting elements is a plane and the other of said surfaces is an aspherical surface.

77. An optical head device in accordance with claim 74, wherein:

said first spherical aberration correcting element is unified with a first lens, and said second spherical aberration correcting element is unified with a second lens.

78. An optical head device in accordance with claim 62, wherein:

a coma aberration caused by that the center of said objective lens deviates from the center of said first spherical aberration correcting element is corrected by inclining said objective lens in the radial direction of said second optical recording medium, and a coma aberration caused by that the center of said objective lens deviates from the center of said second spherical aberration correcting element is corrected by inclining said objective lens in the radial direction of said third optical recording medium.

79. An optical head device in accordance with claim 62, wherein:

first and second relay lenses are disposed between said first, second, and third light sources and said aperture controlling element.

80. An optical head device in accordance with claim 79, wherein:

a spherical aberration caused by the deviation of said first thickness of said first substrate of said first optical recording medium is corrected by moving one of said first and second relay lenses in the optical axis direction.

81. An optical head device in accordance with claim 79, wherein:

a coma aberration caused by that the center of said objective lens deviates from the center of said first spherical aberration correcting element is corrected by inclining or moving one of said first and second relay lenses in the radial direction of said second optical recording medium, and a coma aberration caused by that the center of said objective lens deviates from the center of said second spherical aberration correcting element is corrected by inclining or moving one of said first and second relay lenses in the radial direction of said third optical recording medium.

82. An optical head device in accordance with claim 81, wherein:

one of said first and second relay lenses is designed not to satisfy the sine condition.

83. An optical recording and reproducing apparatus, comprising:

an optical head device in accordance with claim 1;

a recording and reproducing circuit, which generates input signals to light sources based on recording signals to optical recording media and also generates reproducing signals from said optical recording media based on output signals from a photo detector;

a switching circuit, which switches transmission routes of said input signals to one of said transmission routes; and a controlling circuit, which controls the operation of said switching circuit corresponding to the kinds of optical recording media.

84. An optical recording and reproducing apparatus in accordance with claim 83, wherein:

said recording and reproducing circuit comprises:

a first recording and reproducing circuit, which generates a first input signal to a first light source based on a recording signal to a first optical recording medium and also generates a reproducing signal from said first optical recording medium based on an output signal from a photo detector; and a second recording and reproducing circuit, which generates a second input signal to a second light source based on a recording signal to a second optical recording medium and also generates a reproducing signal from said second optical recording medium based on an output signal from a photo detector, wherein:

said switching circuit switches said transmission routes to one of said transmission routes which are a transmission route of said first input signal from said first recording and reproducing circuit to said first light source and a transmission route of said second input signal from said second recording and reproducing circuit to said second light source, and said controlling circuit controls the operation of said switching circuit so that said first input signal is transmitted from said first recording and reproducing circuit to said first light source when said first optical recording medium was inserted, and said second input signal is transmitted from said second recording and reproducing circuit to said second light source when said second optical recording medium was inserted.

85. An optical recording and reproducing apparatus in accordance with claim 83, wherein:

said recording and reproducing circuit is a single recording and reproducing circuit, said single recording and reproducing circuit generates first and second input signals to first and second light sources based on recording signals to first and second optical recording media respectively, and also generates reproducing signals from said first and second optical recording media based on output signals from a photo detector, said switching circuit switches said transmission routes to one of said transmission routes which are a transmission route of said first input signal from said single recording and reproducing circuit to said first light source and a transmission route of said second input signal from said single recording and reproducing circuit to said second light source, and said controlling circuit controls the operation of said switching circuit so that said first input signal is transmitted from said single recording and reproducing circuit to said first light source when said first optical recording medium was inserted, and said second input signal is transmitted from said single recording and reproducing circuit to said second light source when said second optical recording medium was inserted.

86. An optical recording and reproducing apparatus, comprising:

an optical head device in accordance with claim 21;

a recording and reproducing circuit, which generates input signals to light sources based on recording signals to optical recording media and also generates reproducing signals from said optical recording media based on output signals from a photo detector;

a switching circuit, which switches transmission routes of said input signals to one of said transmission routes; and a controlling circuit, which controls the operation of said switching circuit corresponding to the kinds of optical recording media.

87. An optical recording and reproducing apparatus in accordance with claim 86, wherein:

said recording and reproducing circuit comprises:

a first recording and reproducing circuit, which generates a first input signal to a first light source based on a recording signal to a first optical recording medium and also generates a reproducing signal from said first optical recording medium based on an output signal from a photo detector;

a second recording and reproducing circuit, which generates a second input signal to a second light source based on a recording signal to a second optical recording medium and also generates a reproducing signal from said second optical recording medium based on an output signal from a photo detector; and a third recording and reproducing circuit, which generates a third input signal to a third light source based on a recording signal to a third optical recording medium and also generates a reproducing signal from said third optical recording medium based on an output signal from a photo detector, wherein:

said switching circuit switches said transmission routes to one of said transmission routes which are a transmission route of said first input signal from said first recording and reproducing circuit to said first light source, a transmission route of said second input signal from said second recording and reproducing circuit to said second light source, and a transmission route of said third input signal from said third recording and reproducing circuit to said third light source, said controlling circuit controls the operation of said switching circuit so that said first input signal is transmitted from said first recording and reproducing circuit to said first light source when said first optical recording medium was inserted, and said second input signal is transmitted from said second recording and reproducing circuit to said second light source when said second optical recording medium was inserted, and said third input signal is transmitted from said third recording and reproducing circuit to said third light source when said third optical recording medium was inserted.

88. An optical recording and reproducing apparatus in accordance with claim 86, wherein:

said recording and reproducing circuit is a single recording and reproducing circuit, said single recording and reproducing circuit generates first, second, and third input signals to first, second, and third light sources based on recording signals to first, second, and third optical recording media respectively, and also generates reproducing signals from said first, second, and third optical recording media based on output signals from a photo detector, said switching circuit switches said transmission routes to one of said transmission routes which are a transmission route of said first input signal from said single recording and reproducing circuit to said first light source, a transmission route of said second input signal from said single recording and reproducing circuit to said second light source, and a transmission route of said third input signal from said single recording and reproducing circuit to said third light source, and said controlling circuit controls the operation of said switching circuit so that said first input signal is transmitted from said single recording and reproducing circuit to said first light source when said first optical recording medium was inserted, and said second input signal is transmitted from said single recording and reproducing circuit to said second light source when said second optical recording medium was inserted, and said third input signal is transmitted from said single recording and reproducing circuit to said third light source when said third optical recording medium was inserted.

89. An optical recording and reproducing apparatus, comprising:

an optical head device in accordance with claim 41;

a recording and reproducing circuit, which generates input signals to light sources based on recording signals to optical recording media and also generates reproducing signals from said optical recording media based on output signals from a photo detector;

a switching circuit, which switches transmission routes of said input signals to one of said transmission routes; and a controlling circuit, which controls the operation of said switching circuit corresponding to the kinds of optical recording media.

90. An optical recording and reproducing apparatus in accordance with claim 89, wherein;

said recording and reproducing circuit comprises:

a first recording and reproducing circuit, which generates a first input signal to a first light source based on a recording signal to a first optical recording medium and also generates a reproducing signal from said first optical recording medium based on an output signal from a photo detector; and a second recording and reproducing circuit, which generates a second input signal to a second light source based on a recording signal to a second optical recording medium and also generates a reproducing signal from said second optical recording medium based on an output signal from a photo detector, wherein:

said switching circuit switches said transmission routes to one of said transmission routes which are a transmission route of said first input signal from said first recording and reproducing circuit to said first light source and a transmission route of said second input signal from said second recording and reproducing circuit to said second light source, and said controlling circuit controls the operation of said switching circuit so that said first input signal is transmitted from said first recording and reproducing circuit to said first light source when said first optical recording medium was inserted, and said second input signal is transmitted from said second recording and reproducing circuit to said second light source when said second optical recording medium was inserted.

91. An optical recording and reproducing apparatus in accordance with claim 89, wherein:
   said recording and reproducing circuit is a single recording and reproducing circuit,
   said single recording and reproducing circuit generates first and second input signals to first and second light sources based on recording signals to first and second optical recording media respectively, and also generates reproducing signals from said first and second optical recording media based on output signals from a photo detector,
   said switching circuit switches said transmission routes to one of said transmission routes which are a transmission route of said first input signal from said single recording and reproducing circuit to said first light source and a transmission route of said second input signal from said single recording and reproducing circuit to said second light source, and
   said controlling circuit controls the operation of said switching circuit so that said first input signal is transmitted from said signal recording and reproducing circuit to said first light source when said first optical recording medium was inserted, and said second input signal is transmitted from said single recording and reproducing circuit to said second light source when said second optical recording medium was inserted.

92. An optical recording and reproducing apparatus, comprising:
   an optical head device in accordance with claim 62;
   a recording and reproducing circuit, which generates input signals to light sources based on recording signals to optical recording media and also generates reproducing signals from said optical recording media based on output signals from a photo detector;
   a switching circuit, which switches transmission routes of said input signals to one of said transmission routes; and
   a controlling circuit, which controls the operation of said switching circuit corresponding to the kinds of optical recording media.

93. An optical recording and reproducing apparatus in accordance with claim 92, wherein:
   said recording and reproducing circuit comprises:
   a first recording and reproducing circuit, which generates a first input signal to a first light source based on a recording signal to a first optical recording medium and also generates a reproducing signal from said first optical recording medium based on an output signal from a photo detector;
   a second recording and reproducing circuit, which generates a second input signal to a second light source based on a recording signal to a second optical recording medium and also generates a reproducing signal from said second optical recording medium based on an output signal from a photo detector; and
   a third recording and reproducing circuit, which generates a third input signal to a third light source based on a recording signal to a third optical recording medium and also generates a reproducing signal from said third optical recording medium based on an output signal from a photo detector, wherein:
   said switching circuit switches said transmission routes to one of said transmission routes which are a transmission route of said first input signal from said first recording and reproducing circuit to said first light source, a transmission route of said second input signal from said second recording and reproducing circuit to said second light source, and a transmission route of said third input signal from said third recording and reproducing circuit to said third light source,
   said controlling circuit controls the operation of said switching circuit so that said first input signal is transmitted from said first recording and reproducing circuit to said first light source when said first optical recording medium was inserted, and said second input signal is transmitted from said second recording and reproducing circuit to said second light source when said second optical recording medium was inserted, and said third input signal is transmitted from said third recording and reproducing circuit to said third light source when said third optical recording medium was inserted.

94. An optical recording and reproducing apparatus in accordance with claim 92, wherein:
   said recording and reproducing circuit is a single recording and reproducing circuit,
   said single recording and reproducing circuit generates first, second, and third input signals to first, second, and third light sources based on recording signals to first, second, and third optical recording media respectively, and also generates reproducing signals from said first, second, and third optical recording media based on output signals from a photo detector,
   said switching circuit switches said transmission routes to one of said transmission routes which are a transmission route of said first input signal from said single recording and reproducing circuit to said first light source, a transmission route of said second input signal from said single recording and reproducing circuit to said second light source, and a transmission route of said third input signal from said single recording and reproducing circuit to said third light source, and
   said controlling circuit controls the operation of said switching circuit so that said first input signal is transmitted from said single recording and reproducing circuit to said first light source when said first optical recording medium was inserted, and said second input signal is transmitted from said single recording and reproducing circuit to said second light source when said second optical recording medium was inserted, and said third input signal is transmitted from said single recording and reproducing circuit to said third light source when said third optical recording medium was inserted.

95. An optical head device as claimed in claim 1, wherein one of said wavelengths is 405 nm.

96. An optical head device as claimed in claim 41, wherein one of said wavelengths is 405 nm.

* * * * *